US012735631B2

(12) United States Patent
Lee et al.

(10) Patent No.: US 12,735,631 B2
(45) Date of Patent: Sep. 15, 2026

(54) PEROVSKITE NANOPARTICLES AND LIGHT-EMITTING COMPOSITION COMPRISING AN ORGANIC SILOXANE SOLVENT, AND METHODS FOR PRODUCING THE SAME

(71) Applicants: SEOUL NATIONAL UNIVERSITY R&DB FOUNDATION, Seoul (KR); PEROLED Co., Ltd., Seoul (KR)

(72) Inventors: Tae-Woo Lee, Seoul (KR); Seung-Chul Lee, Seoul (KR); Song-Hee Lee, Seoul (KR); Sinil Choi, Seoul (KR); Jae Il Kim, Yongin-si (KR)

(73) Assignees: SEOUL NATIONAL UNIVERSITY R&DB FOUNDATION, Seoul (KR); PEROLED CO., LTD., Seoul (KR)

( * ) Notice: Subject to any disclaimer, the term of this patent is extended or adjusted under 35 U.S.C. 154(b) by 976 days.

(21) Appl. No.: 17/710,947

(22) Filed: Mar. 31, 2022

(65) Prior Publication Data

US 2022/0389309 A1 Dec. 8, 2022
US 2024/0199947 A9 Jun. 20, 2024

(30) Foreign Application Priority Data

Mar. 31, 2021 (KR) ........................ 10-2021-0042262
Mar. 31, 2022 (KR) ........................ 10-2022-0040801

(51) Int. Cl.
*C09K 11/02* (2006.01)
*C08G 77/04* (2006.01)
*C09K 11/66* (2006.01)

(52) U.S. Cl.
CPC .......... *C09K 11/025* (2013.01); *C08G 77/045* (2013.01); *C09K 11/664* (2013.01)

(58) Field of Classification Search
CPC ............................ C09K 11/025; C09K 11/664
See application file for complete search history.

(56) References Cited

U.S. PATENT DOCUMENTS 7,598,314 B2 10/2009 Lee et al.
10,103,345 B2 10/2018 Yoon et al.
(Continued)

FOREIGN PATENT DOCUMENTS

CN 106967417 * 7/2017
CN 106967417 A 7/2017
(Continued)

OTHER PUBLICATIONS

Bahadur, Ranjit et al., "Surface Tensions in NaCI-Water-Air Systems from MD Simulations", The Journal of Physical Chemistry B, vol. 111, Issue 41, pp. 11989-11996, Sep. 26, 2007.
(Continued)

*Primary Examiner* — C Melissa Koslow
(74) *Attorney, Agent, or Firm* — LEX IP MEISTER, PLLC

(57) ABSTRACT

The present disclosure relates to a perovskite light-emitting composition, and a method for preparing the same. The method for producing the perovskite light-emitting composition of the present disclosure includes an organic siloxane solvent having very high hydrophobicity and low surface tension as a synthesis solvent, thereby having a large surface tension difference from the perovskite light-emitting particles containing an organic ligand. Through these properties, a dense organic ligand can be attached to the surface of the perovskite nanoparticles, and perovskite light-emitting particles having a high ligand density can be prepared. Accordingly, the perovskite light-emitting particles prepared
(Continued)

by the method of the present disclosure have improved dispersion stability, light-emitting properties and long-term storage stability.

11 Claims, 34 Drawing Sheets

(56) References Cited

U.S. PATENT DOCUMENTS

| | | | |
|---|---|---|---|
| 11,205,757 | B2 | 12/2021 | Lee et al. |
| 11,280,953 | B2 | 3/2022 | Kim et al. |
| 11,326,097 | B2 | 5/2022 | Lee et al. |
| 11,390,802 | B2 | 7/2022 | Pan et al. |
| 11,588,079 | B2 | 2/2023 | Lee et al. |
| 12,122,949 | B2 | 10/2024 | Lee et al. |
| 2022/0213381 | A1 | 7/2022 | Krasteva et al. |
| 2023/0374324 | A1 | 11/2023 | Wang et al. |

FOREIGN PATENT DOCUMENTS

| | | | |
|---|---|---|---|
| CN | 115884648 | A | 3/2023 |
| CN | 117801775 | A | 4/2024 |
| CN | 120081413 | A | 6/2025 |
| WO | 2021125412 | A1 | 6/2021 |

OTHER PUBLICATIONS

Guo, Mengdong et al., "Luminescent and Robust Perovskite-Silicone Elastomers Prepared by Light Induced Thiol- Ene Reaction", Macromolecular Rapid Communications, vol. 42, Issue 5, Mar. 2021.

Kim, Young-Hoon et al., "Highly Efficient Light-Emitting Diodes of Colloidal Metal-Halide Perovskite Nanocrystals beyond Quantum Size", ACS Nano, vol. 11, Issue 7, Jun. 6, 2017.

Miyata, Atsuhiko et al., "Direct Measurement of the Exciton Binding Energy and Effective Masses for Charge carriers in an Organic-Inorganic Tri-halide Perovskite", Nature Physics, vol. 11, Jul. 2015.

Sato, Yohei et al., "Characterization of NMR, IR, and Raman spectra for siloxanes and silsesquioxanes: a mini review", Journal of Sol-Gel Science and Technology, vol. 104, pp. 36-52, Aug. 18, 2022.

Wang, Qiang et al., "Quantum confinement effect and exciton binding energy of layered perovskite nanoplatelets", AIP Advances, vol. 8, Issue 2, Feb. 2018.

Wang, Tong et al., "Room temperature nondestructive encapsulation via self-crosslinked fluorosilicone polymer enables damp heat-stable sustainable perovskite solar cells", Nature Communications, 14, 1342, Mar. 11, 2023.

* cited by examiner a. Synthesis in Toluene Solvent
b. Synthesis in D4 solvent (a)

(b)

| | Absorptance(%) | PLQE(%) | Peak(nm) | FWHM(nm) |
|---|---|---|---|---|
| Ref(12/2) | 92.6 | 90.7 | 536 | 23.6 |
| Ref(12/8) | 93.1 | 90.8 | 535 | 23.5 |
| D4(12/2) | 92.5 | 93.6 | 537 | 23.9 |
| D4(12/8) | 93.1 | 91 | 537 | 23.9 |
| 0.65 cs(12/8) | 92.4 | 92.7 | 537 | 23.8 |
| 0.65cs(12/8) | 92.8 | 90.4 | 537 | 23.3 |

(c)

Synthesis conditions: 16˚C, Relative humidity 6˚C

Box plots with 6 set of experiments

Embodiment Example 1 (D4 synthesis)

PEROVSKITE NANOPARTICLES AND LIGHT-EMITTING COMPOSITION COMPRISING AN ORGANIC SILOXANE SOLVENT, AND METHODS FOR PRODUCING THE SAME

TECHNICAL FIELD

The present disclosure relates to perovskite particles synthesized in an organic siloxane solvent, methods for their preparation, and a perovskite light-emitting composition comprising the organic siloxane solvent and the perovskite light-emitting particles.

BACKGROUND ART

Perovskite materials are attracting attention as next-generation materials that can replace organic light-emitting diodes (OLEDs) because of their high photoluminescent efficiency and color purity, simple color control, and low synthesis cost. A typical perovskite structure has an ABX 3 structure, and inorganic metal oxide perovskite and metal halide perovskite are representative. Metal halide perovskite is alternately stacked on an organic plane or an alkali metal plane and an inorganic plane, and it is possible to bind excitons in the inorganic plane. For this reason, there is an advantage that it is possible to realize an ideal light emitter that emits light of very high color purity by the crystal structure itself, not depending on the size of the material. Due to these advantages, metal halide perovskite is attracting attention as a next-generation light-emitting material that can be developed.

Perovskite nanoparticles are ionic crystals with weak ionic bonds, and their properties are easily degraded by being sensitive to external environments. In addition, when the perovskite nanoparticles are electrically driven in devices, their lifetime is very reduced due to the migration of halide ions.

Accordingly, in order to improve the stability and solvent dispersibility of perovskite nanoparticles, a method of covering the surface of the particles with a surfactant containing organic ligands is widely used when synthesizing perovskite particles. In this case, the properties of the perovskite particles are sensitively affected by the physical properties and density of the surface organic ligand used. In particular, the coverage of organic ligands formed on the surface of perovskite particles plays an important role in improving luminescence stability by blocking moisture, chemicals, and photoinitiator decomposition products. However, the toluene solvent widely used in the synthesis of conventional perovskite particles is not only a toxic substance, but also the organic ligand surfactant does not provide effective coverage properties on the surface of the perovskite particles. In addition, there is a disadvantage in that it cannot eliminate contact with moisture and chemical substance.

In addition, when a thermosetting resin is used in the process of mixing the perovskite particles with the polymer resin for manufacturing the light-emitting layer, the light-emitting properties of the perovskite particles lacking heat resistance are rapidly reduced. Accordingly, UV-curable resin is mainly applied. However, there is a problem in that the surface of the perovskite particles is damaged by the chemical substances such as the photoinitiator and its by-products used, and thereby the light-emitting property is deteriorated. Therefore, there is a limit to the mass production of perovskite particles due to the above problems, and it is an obstacle to application to industrialization.

DISCLOSURE

Technical Problem

The first technical problem to be achieved by the present disclosure is to provide perovskite light-emitting particles and compositions having improved luminescence stability The second technical problem to be achieved by the present disclosure is to provide a method for producing the perovskite light-emitting particles and compositions for achieving the first technical problem.

Technical Solution

In order to achieve the first technical problem described above, the present invention can provide a perovskite light-emitting particle and composition.

The perovskite light-emitting composition includes perovskite light-emitting particles comprising comprises the perovskite nanocrystal particles and a plurality of organic ligands that bind to at least any surface of the perovskite nanocrystal particles; and an organic siloxane solvent, siloxane compound for inducing a repulsive force that repels the organic ligand of the perovskite light-emitting particle.

The perovskite nanocrystal particles are $ABX_3$(3D), $A_4BX_6$(0D), $AB_2X_5$(2D), $A_2BX_4$(2D), $A_2BX_6$(0D), $A_2B^+B^{3+}X_6$ (3D), $A_3B_2X_9$(2D) or $A_{n-1}B_nX_{3n+1}$(quasi-2D) structure, where n is an integer from 2 to 6, wherein 3D is 3-dimensional structure, OD is 0-dimensional structure, 2D is 2-dimensional structure, and quasi-2D is an quasi-two-dimensional structure that is intermediate structure of 3D and 2D, and wherein A is organic ammonium, B is a metal material, and X may be a halogen element.

The organic ammonium (A) may be an amidium group organic ion or an organic ammonium ion.

The amidium-based organic ion may be a formamidinium ($NH_2CH{=}NH^+$) ion, an acetamidinium ($NH_2C(CH){=}NH_2+$) ion, or a guanidinium ($NHC(NH){=}NH^+$) ion.

The organic ammonium ion may be methylammonium ion, ethylammonium ion, tert-butylammonium ion, diethylammonium ion, dimethylammonium ion, ethane-1.2.-diammonium, imidazolium ion, normal-propylammonium ion, iso-propylammonium ion, pyrrolidinium ion, $(CH(NH_2)_2+$, $C_xH_{2x+1}(CNH_3)^+$, $(CH_3NH_3)_n^+$, $((C_xH_{2x+1})_nNH_3)_n(CH_3NH_3)_n^+$, $R(NH_2)_2^+$ (where R is an alkyl group), $(C_nH_{2n+1}NH_3)_n+$, $(CF_3NH_3)^+$, $(CF_3NH_3)_n^+$, $((C_xF_{2x+1})_nNH_3)_n(CF_3NH_3)_n^+$, $((C_xF_{2x+1})_nNH_3)_2^+$ or $(C_nF_{2n+1}NH_3)_n^+$ (n and x are independently integers from 1 to 100).

The metal material (B) may be a transition metal, a rare earth metal, an alkaline metal, an alkaline earth metal, Pb, Sn, Ge, Ga, In, Al, Sb, Bi, Po, or a combination thereof, and the rare earth metal may be Eu or Yb, and the alkaline metal may be Li, Na, K, Rb, Cs or Fr, and the alkaline earth metal may be Be, Mg, Ca, Sr, Ba or Ra.

Specifically, the metal material (B) may be a material made of Pb, Mn, Cu, Ga, Ge, In, Al, Sb, Bi, Po, Cu, Ag, Au, Sn, Eu, Yb, Ni, Co, Fe, Cr, Pd, Cd, Ca, Sr or a combination thereof. In one embodiment, the metal material (B) may be Pb, but is not limited thereto.

The halogen element (X) may be F, Cl, Br, I, or a combination thereof.

The diameter of the perovskite nanocrystal particles may be 1 nm to 200 nm, excluding the length of the ligand, and specifically, 3 nm to 100 nm or less. Preferably, the diameter is preferably equal to or greater than the Exciton Bohr Diameter, and more specifically, may be 10 nm to 50 nm. For example, it may be 2, 3, 4, 5, 6, 6.5, 7, 7.5. 8, 8.5, 9, 9.5, 10, 10.5, 11, 11.5, 12, 12.5, 13, 14, 15, 16, 17, 18, 19, 20, 21, 22, 23, 24, 25, 26, 27, 28, 29, 30, 35, 40, 35, 50 nm, and the smaller value among the two numbers selected from the above numbers may be set as the lower limit and the larger value may be set as the upper limit. More specifically, it may be 10 nm to 30 nm, but is not limited thereto.

The band gap energy of the perovskite nanocrystal particles may be 1 eV to 5 eV. For example, it may be 1.0, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.5 or 5 eV, and the smaller value among the two numbers selected from the above numbers may be set as the lower limit value and the larger value may be set as the upper limit value. More specifically, it may have a band gap emitting an emission wavelength of between 1.8 and 3.1 eV for application of a device emitting light in the visible region, but is not limited thereto.

The emission wavelength of the perovskite nanocrystal particles may be 200 nm to 1300 nm.

The organic ligand may have a composition derived from a surfactant in the following synthesis process. Alternatively, it may be derived from a compound added during the synthesis process other than the surfactant.

The siloxane compound may include at least one silicon-carbon bond.

The siloxane compound may be an organosiloxane solvent or polyorganosiloxane.

The organosiloxane solvent may include the following Chemical Formula 1, Chemical Formula 2, Chemical Formula 3, Chemical Formula 4 or a combination thereof.

[Chemical Formula 1]

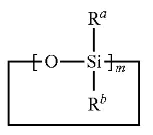

In Chemical Formula 1, $R^a$ and $R^b$ may each independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m may be an integer of 3 to 6.

[Chemical Formula 2]

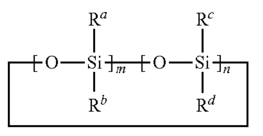

In Chemical Formula 2, $R^a$ to $R^d$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n may independently be an integer of 3 to 10.

[Chemical Formula 3]

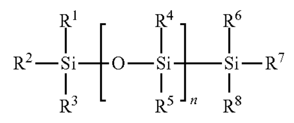

In Chemical Formula 3, $R^1$ to $R^7$[LT1] may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and n may be an integer of 3 to 100.

[Chemical Formula 4]

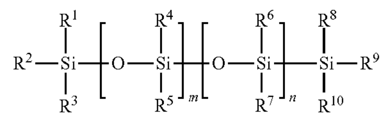

In Chemical Formula 4, $R^1$ to $R^{10}$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n may independently be 3 to 10.

The organic siloxane solvent may be at least one selected from Octamethylcyclotetrasiloxane (D4), Decamethylcyclopentasiloxane (D5), Dodecamethylcyclohexasiloxane (D6), or derivatives thereof.

In addition, the organic siloxane solvent may make a chemical reaction with an organic ligand on the surface of the perovskite light-emitting particle to form polyorganosiloxane.

The chemical reaction above may be a ring-opening reaction of the organic siloxane solvent.

The polyorganosiloxane may be polydimethylsiloxane (PDMS).

The organic siloxane solvent may have a viscosity of 0.5 to 2,000 cps at 25° C. For example, it may be 0.1, 0.2, 0.3, 0.4, 0.5, 0.55, 0.6, 0.7, 0.8, 0.9, 1, 2, 3, 4, 5, 6, 7, 8, 9, 10, 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990 or 2000 (unit cps), and the smaller value among the two numbers selected from the above numbers may be set as the lower limit value and the larger value may be set as the upper limit value, and more specifically, it may be 0.55 to 300 cps, but is not limited thereto.

The refractive index of the organic siloxane solvent may be 1.2 to 1.7. For example, it may be 1.20, 1.25, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69 or 1.70 a smaller value among two numbers selected from among the above numbers may be set as the lower limit value and a larger value may be set as an upper limit value, and more specifically, it may be 1.36 to 1.52, but is not limited thereto.

The perovskite light-emitting composition may further include a photopolymerizable monomer and a photoinitiator.

The photopolymerizable monomer may include at least one of carbon-carbon double bonds and triple bonds.

The photopolymerizable monomer may be a compound composed of an acrylate-based compound, a thiol-based compound, a photoresist, or a combination thereof.

The photoinitiator may be selected from a triazine-based compound, an acetophenone-based compound, a benzophenone-based compound, a thioxanthone-based compound, a benzoin-based compound, an oxime-based compound, a carbazole-based compound, a diketone-based compound, a sulfonium borate-based compound, a diazo-based compound, a biimidazole-based compound or a combination thereof.

The manufacturing method of the perovskite light-emitting composition comprises preparing a first solution containing perovskite precursors and an organic solvent S100; preparing a second solution containing an organic siloxane solvent, a surfactant and an organic solvent S200; forming perovskite light-emitting particles by injecting the first solution into the second solution and then mixing S300; and washing the perovskite light-emitting particles S400.

In addition, the manufacturing method of the perovskite light-emitting composition may further include the mixing by adding a photopolymerizable monomer and a photoinitiator after the above washing.

The organic solvent may be dimethylformamide (DMF), dimethyl sulfoxide (DMSO), gamma butyrolactone, N-methylpyrrolidone (NMP), isopropyl alcohol or a combination thereof.

When synthesizing the perovskite nanocrystal particles, the surfactant is used to easily disperse the materials in the solvent, and to prevent unnecessary agglomeration. In addition, the surfactant may form an organic ligand on the surface of the perovskite nanocrystal particles when synthesizing them.

The surfactant may be at least one selected from an amine surfactant, an organic acid surfactant, and an organic ammonium surfactant. In addition, the surfactant may be a bidendate ligand or a multidendate ligand (that is, a chelating ligand) containing at least two amine (—$NH_2$) groups, acids, or carboxylic acids at the ends. For example, it may be ethylenediamine, phenanthroline, or 2,2'-iminodibenzoic acid (IDA).

The amine surfactant may be at least one selected from hexylamine, octylamine, oleylamine, decylamine, N,N-diisopropylethylamine, ethylenediamine, hexamethylenetetramine, methylamine, N,N,N,N-tetramethyl ethylene Diamine, triethylamine, diethanolamine, 2,2-(ethylenedioxyl)bis-(ethylamine), 2-methyl-1,5-pentanediamine, 3-methoxytriphenyl-amine, 1,4-phenylenediamine, N,N,N,N-pentamethyl diethylenetriamine, triethylenetetramine, rhodamine, and diethylamine. The amine surfactant may form an amine ligand on the surface of the perovskite nanocrystal particles when synthesizing them.

The organic acid surfactant may be a carboxylic acid surfactant or a phosphonic acid surfactant.

The carboxylic acid surfactant may be at least one selected from 4,4'-Azobis (4-cyanovaleric acid), acetic acid, 5-aminosalicylic acid, acrylic acid, L-aspentic acid, 6-bromohexanoic acid, bromoacetic acid, dichloro acetic acid, ethylenediaminetetraacetic acid, isobutyric acid, itaconic acid, maleic acid, r-maleimidobutyric acid, L-malic acid, 4-nitrobenzoic acid, 1-pyrenecarboxylic acid and oleic acid. In addition, the carboxylic acid surfactant may be dihydrolipoic acid (DHLA) containing a —SH (thiol) group and a zwitterionic ligand containing this functional group. The carboxylic acid surfactant may form a carboxylic acid ligand on the surface of the perovskite nanocrystal particles when synthesizing the particles.

The phosphonic acid surfactant may be at least one selected from n-hexylphosphonic acid, n-octylphosphonic acid, n-decylphosphonic acid, n-dodecylphosphonic acid, n-tetradecylphosphonic acid, n-hexadecylphosphonic acid n-octadecyl phosphonic acid, benzyl phosphonic acid, and benzhydryl phosphonic acid. The phosphonic acid surfactant may form a phosphonic acid ligand on the surface of the particle when synthesizing the perovskite nanocrystal particles.

The organic ammonium surfactant may form an organic ammonium ligand on the surface of the particle when synthesizing the perovskite nanocrystal particles.

The organic ammonium surfactant may include an alkyl ammonium halide.

The alkyl structure of the alkyl ammonium halide may be an acyclic alkyl group having a structure of $C_nH_{2n+1}$.

The organic ammonium surfactant comprising the alkyl structure may include an alkyl ammonium halide. For example, it can contain halides while containing alkyl ammonium such as octylammonium (C8), dodecylammonium (C12), and octadecylammonium (C18). In other words, octylammonium bromide (OAB), didodecyldimethyl ammonium bromide (DDAB), dioctyldimethyl ammonium bromide (DOAB), methyltriocyl ammonium bromide (TrOAB), tetraoctyl ammonium bromide (TeOAB), or didecyldimethyl ammonium bromide (DTAB) may be included.

The organic ammonium surfactant may include a zwitterionic ligand. For example, it may be a ligand including lecithin, sulfobetaines, phosphocholines, and γ-amino acids. A specific example of the sulfobetaines may be 3-(N,N-dimethyloctadecylammonio)propanesulfonate, but is not limited thereto.

The washing the perovskite light-emitting particles may include centrifuging the synthesis solution to obtain a precipitate and then drying in vacuum.

After the above washing, the organic siloxane solvent may remain between or on the surface of the perovskite light-emitting particles.

Advantageous Effects

According to the present invention described above, the method for producing the perovskite light-emitting particle and composition of the present invention includes an organic siloxane solvent having very high hydrophobicity and low surface tension as a solvent in the preparation. Through this, since it has a large surface tension difference with the perovskite light-emitting particles containing an organic ligand, it is possible to attach a dense organic ligand to the surface of the perovskite nanoparticles, and the perovskite having a-high ligand density light-emitting particles can be prepared. Accordingly, the perovskite light-emitting particles prepared by the manufacturing method of the present invention exhibits improved dispersion stability, light-emitting properties and long-term storage stability.

MODES OF THE INVENTION

Figure 1:
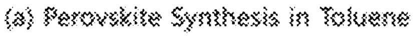
FIGS. 1 (*a*) and (*b*) are schematic diagrams showing the organic ligand formation mechanism of perovskite light-emitting particles according to the use of (a) toluene (T) and (b) an organic siloxane solvent (D4) in the perovskite light-emitting composition according to the present invention.
Figure 1:
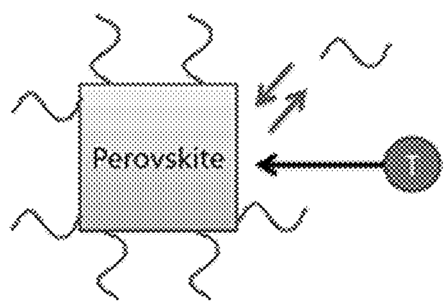
Figure 1:
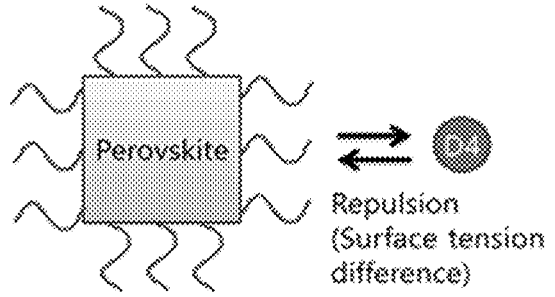

Hereinafter, preferred embodiments of the present invention will be described in more detail with reference to the accompanying drawings. However, this is not intended to limit the present invention to the specific disclosed form, it should be understood to include all modifications, equivalents and substitutes included in the spirit and technical scope of the present invention. Rather, the embodiments introduced herein are provided so that the disclosed subject matter may be thorough and complete, and the spirit of the present invention may be sufficiently conveyed to those skilled in the art.

Unless defined otherwise, all terms used herein, including technical or scientific terms, have the same meaning as commonly understood by one of ordinary skill in the art to which the present invention belongs. Terms such as commonly used dictionary definitions should be interpreted as having meanings consistent with the meanings in the context of the related art, and unless explicitly defined in the present disclosure, they are not to be interpreted in an ideal or excessively formal meaning.

In the disclosure, the singular expression includes the plural expression unless the context clearly dictates otherwise. In addition, terms such as "comprise" or "have" are intended to designate the features, numbers, steps, components, or combinations thereof described in the disclosure, and should not be construed as excluding the possibility of the presence or addition of one or more other features, numbers, steps, elements or combinations thereof.

In addition, in the following description of the present disclosure, if it is determined that a detailed description of a related well-known function or configuration may unnecessarily obscure the gist of the present disclosure, the detailed description thereof will be omitted.

Perovskite Light-Emitting Composition

Perovskite light-emitting composition of the present invention may include perovskite nanocrystal particles; perovskite light-emitting particles comprising a plurality of organic ligands bound to at least any surface of the perovskite nanocrystal particles; and an organic siloxane solvent inducing a repulsive force that pushes the organic ligand of the perovskite light-emitting particle.

In the present disclosure, the term "composition" refers to the synthesized perovskite light-emitting particles along with a solvent, typically forming a solution or dispersion. However, the core aspect of the invention lies in the synthesis of the perovskite light-emitting particles themselves, which are generated through the interaction between perovskite precursors, organic ligands, and the organic siloxane solvent during the synthesis process.

1) Perovskite Light-Emitting Particles 1-1) Perovskite Nanocrystal Particles

The perovskite nanocrystal particles of the present invention may have a three-dimensional (3D) crystal structure, a two-dimensional (2D) crystal structure, or a dimensionless (0D) crystal structure. The perovskite nanocrystal particles of the present invention may include $ABX_3$(3D), $A_4BX_6$ (0D), $AB_2X_5$(2D), $A_2BX_4$ (2D), $A_2BX_6$ (0D), $A_2B^{+}B^{3+}X_6$ (3D), $A_3B_2X_9$ (2D) or the structure of $A_{n-1}B_nX_{3n+1}$(quasi-2D) (where n is an integer of 2 to 6, 3D=3-dimensional structure, 0D=0-dimensional structure, 2D=2 dimensional structure, and quasi-2D is a quasi-two-dimensional structure that is an intermediate structure between 3D and 2D), wherein the A may be an organic ammonium, the B may be a metal material, and the X may be a halogen element.

More specifically, the organic ammonium (A) may be methylammonium, ethylammonium, formamidinium, acetamidinium, guanidinium, tert-butylammonium, diethylammonium, dimethylammonium, ethane-1.2.-diammonium, imidazolium, normal-propylammonium (n-propylammonium), iso-propylammonium, pyrrolidinium, $(CH(NH_2)_2)^+$, $C_xH_{2x+1}(CNH_3)^+$, $(CH_3NH_3)_n^+$, $((C_xH_{2x+1})_nNH_3)_n(CH_3NH_3)_n^+$, $R(NH_2)_2^+$ (where R is an alkyl group), $(C_nH_{2n+1}NH_3)_n^+$, $(CF_3NH_3)^+$, $CF_3NH_3)_n^+$, $((C_xF_{2x+1})NH_3)_n(CF_3NH_3)_n^+$, $((C_xF_{2x+1})_nNH_3)_2^+$ or $(C_nF_{2n+1}NH_3)_n^+$ (where n and x are independent as an integer from 1 to 100). In one embodiment, the organic ammonium (A) may be methylammonium, but is not limited thereto.

The metal material (B) may be a transition metal, a rare earth metal, an alkaline metal, an alkaline earth metal, Sn, Ge, Ga, In, Al, Sb, Bi, Po, or a combination thereof. In this case, the rare earth metal may be Ge, Sn, Pb, Eu or Yb. The alkaline metal may be Li, Na, K, Rb, Cs, or Fr, and the alkaline earth metal may be Be, Mg, Ba, $R^a$, Ca or Sr. More specifically, the metal material (B) may be Pb, Mn, Cu, Ga, Ge, In, Al, Sb, Bi, Po, Cu, Ag, Au, Sn, Eu, Yb, Ni, Co, Fe, Cr, Pd, Cd, Ca, Sr, or a combination thereof. In one embodiment, the metal material (B) may be Pb, but is not limited thereto.

The halogen element (X) may be F, Cl, Br, I, or a combination thereof. In one embodiment, the halogen element (X) may be Br, but is not limited thereto.

Figure 2:
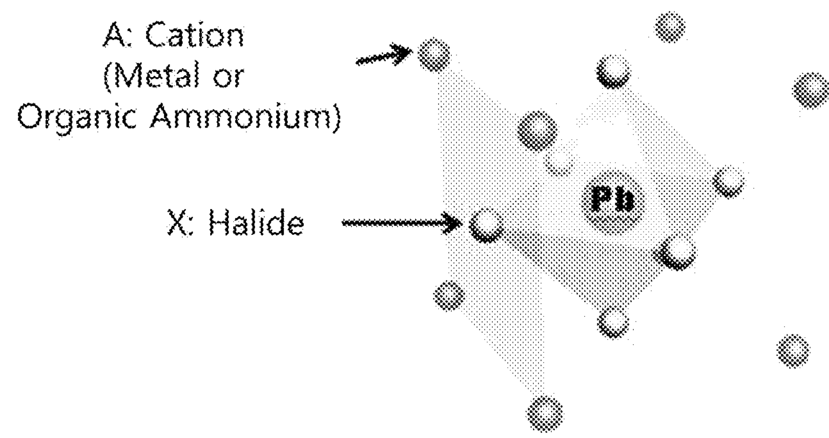
FIG. 2 is a schematic diagram showing the crystal structure of the perovskite nanocrystal particles according to an embodiment of the present invention.

FIG. 2 is a schematic diagram showing the crystal structure of the perovskite nanocrystal particles according to an embodiment of the present invention.

Referring to FIG. 2, the crystal of the perovskite of the present invention forms a central metal (Pb) and a structure in which six inorganic halides (X) are positioned in a face-centered cubic structure (FCC), and eight organic ammoniums are positioned in a body-centered cubic structure (BCC).

Figure 3:
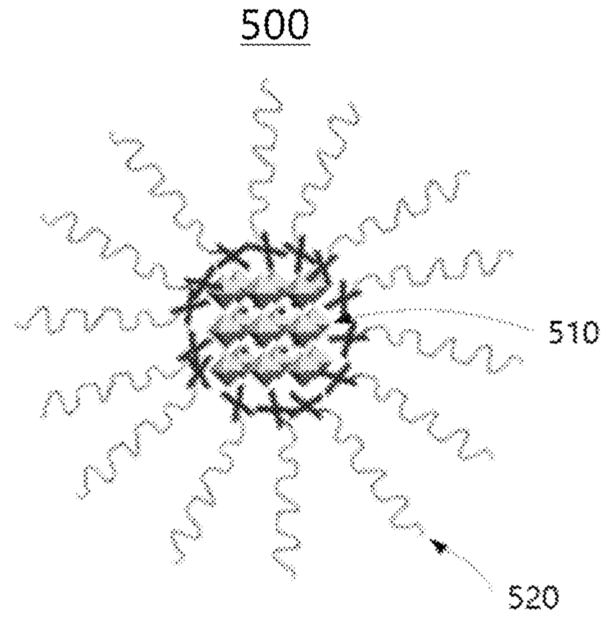
FIG. 3 is a schematic diagram showing a state in which the perovskite light-emitting particles are dispersed in an organic solvent according to an embodiment of the present invention.
Figure 4:
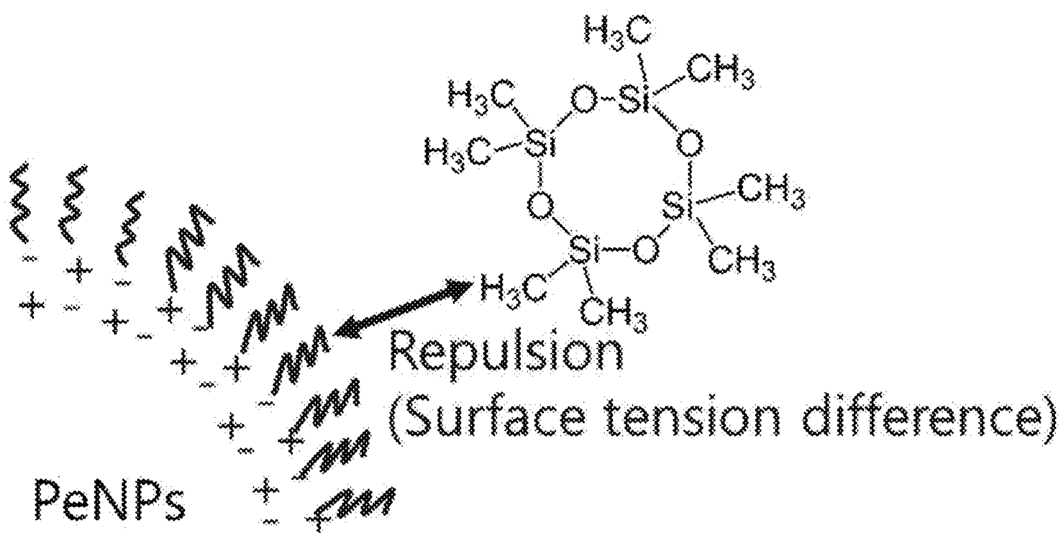
FIG. 4 is a schematic diagram showing the interaction between the organic ligand on the surface of the perovskite light-emitting particle and the organic siloxane solvent in the perovskite light-emitting composition according to an embodiment of the present invention.

FIG. 3 is a schematic diagram showing a state in which the perovskite light-emitting particles are dispersed in an organic solvent according to an embodiment of the present invention.

Referring to FIG. 3, the perovskite light-emitting particles 500 of the present invention are perovskite nanocrystal particles 510 and an organic surfactant are dispersed in an organic solvent, and an organic ligand 520 having a composition derived from a surfactant may cover the surface of the perovskite nanocrystal particles 510.

The shape of the perovskite nanocrystal particles 510 may be spherical, cylindrical, elliptical, two-dimensional plate, one-dimensional linear or polygonal column, and specifically, may be spherical, but is not limited thereto.

The diameter of the perovskite nanocrystal particles 510 may be 1 nm to 200 nm, specifically 3 nm to 100 nm. Preferably, it may be the exciton Bohr diameter or more and more specifically, it may be 10 nm to 50 nm.

For example, it may be 2, 3, 4, 5, 6, 6.5, 7, 7.5. 8, 8.5, 9, 9.5, 10, 10.5, 11, 11.5, 12, 12.5, 13, 14, 15, 16, 17, 18, 19, 20, 21, 22, 23, 24, 25, 26, 27, 28, 29, 30, 35, 40, 45 or 50 nm, and a smaller value among two numbers selected from the above numbers may be set as a lower limit and a larger value may be set as an upper limit, more specifically 10 nm to 30 nm is most preferred. Here, the diameter of the perovskite nanocrystal particles 510 refers to a size that does not consider the length of the organic ligand to be described later, that is, the size of the perovskite nanocrystal particles 510 itself excluding the ligand.

The diameter of the perovskite nanocrystal particles 510 may be larger than the Exciton Bohr diameter, and thus may have a size of a region that is not affected by the quantum confinement effect. In other words, as the diameter of the perovskite nanocrystal particles 510 becomes smaller than the exciton Bohr diameter (about 10 nm, depending on the composition of the particles, generally having a value between 7-15 nm), the quantum confinement effect becomes stronger. However, due to a large number of defects on the surface, the efficiency is lowered and the emission spectrum is further broadened, so that the advantages of the inherent perovskite emitter cannot be exhibited. In addition, when the size of the particle becomes larger than 30 nm, the intrinsic color is maintained, but as the size increases, the efficiency gradually decreases as the thermal ionization phenomenon increases at room temperature. Therefore, it is preferably larger than the exciton Bohr diameter (about 10 nm) and smaller than 30 nm, and more preferably smaller than 20 nm. When the diameter of the perovskite nanocrystal particle is larger than the exciton Bohr diameter and smaller than 30 nm, there is no strong quantum confinement effect that determines whether a quantum dot or not. In addition, unlike quantum dots, there is little change in emission spectrum and full width at half maximum (FWHM), so that a narrow FWHM can still be maintained even when a particle size distribution exists. In one embodiment, the size of the perovskite nanocrystal particles 510 may be 10 nm to 30 nm, but is not limited thereto.

In this case, the exciton Bohr diameter of the nanoparticles (about 10 nm based on $MAPbBr_3$, about 7 nm based on $CsPbBr_3$) may be greater than or equal to 7 nm and less than or equal to 30 nm. For example, it may be 7 nm, 7.5 nm, 8 nm, 8.3 nm, 8.5 nm, 8.7 nm, 9 nm, 9.3 nm, 9.5 nm, 9.7 nm, 10 nm, 10.3 nm, 10.5 nm, 10.7 nm, 11 nm, 11.3 nm, 11.5 nm, 11.7 nm, 12 nm, 12.3 nm, 12.5 nm, 12.7 nm, 13 nm, 13.3 nm, 13.5 nm, 13.7 nm, 14 nm, 14.3 nm, 14.5 nm, 14.7 nm, 15 nm, 15.3 nm, 15.5 nm, 15.7 nm, 16 nm, 16.5 nm 17 nm, 17.5 nm, 18 nm, 18.5 nm, 19 nm, 19.5 nm, 20 nm, 21 nm, 22 nm, 23 nm, 24 nm, 25 nm, 26 nm, 27 nm, 28 nm, 29 nm, or 30 nm, and the smaller value among the two numbers selected from the above numbers may be set as the lower limit and the larger value may be set as the upper limit. In addition, specifically, it may be 7 to 25 nm, more preferably 10 nm or more and 20 nm or less, and more preferably, 10 nm or more and 15 nm or less, but is not limited thereto.

Furthermore, the exciton Bohr diameter may vary depending on the composition (about 10 nm based on $MAPbBr_3$, about 7 nm based on $CsPbBr_3$, about 8 nm based on $FAPbBr_3$ (Scientific Reports volume 6, Article number: 36733 (2016))), It may generally have a diameter of 7 to 15 nm. If the diameter of the perovskite nanocrystal particles 110 is smaller than the exciton Bohr diameter, that is, less than 7 nm, the quantum confinement effect becomes stronger, but defects on the particle surface increase. Accordingly, the photoluminescence efficiency is lowered so that a phenomenon, which the emission spectrum is broadened, occurs, that is, an intrinsic color may not be maintained. On the other hand, when the diameter of the perovskite nanocrystal particles 110 increases to larger than 30 nm, thermal ionization at room temperature increases, so that photoluminescence efficiency may decrease. However, when the diameter of the perovskite nanocrystal particles 110 is equal to or greater than the exciton Bohr diameter, that is, 7 to 30 nm, specifically 7 to 20 nm, more specifically 7 to 15 nm, there is no strong quantum confinement effect. Additionally, unlike quantum dots, there is almost no change in emission spectrum and no change in Full Width at Half Maximum (FWHM), so even if the particle size distribution exists, it is still possible to maintain a narrow the FWHM. In one embodiment, the diameter of the perovskite nanoparticles 110 may be 7 to 15 nm, but is not limited thereto. Here, the diameter of the perovskite nanoparticles 110 may mean a size that does not consider the length of the organic ligand to be described later, that is, the size of the perovskite nanoparticles 110 itself excluding the ligand.

In order to determine the size of colloidal particles, the value measured by transmission electron microscopy (TEM) may be taken. Since the measurement method by the Light Scattering method cannot distinguish it from the aggregated particle aggregates and thus may not be an accurate measurement method.

For a method of deriving the exciton Bohr diameter can be referred to the paper [ACS Nano, 2017, 11 (7), pp 6586-6593, AIP Advances, 2018, 8, 025108], supporting information, and references described in this paper [in particular, Nature Physics, 2015, 11, 582; Energy & Environmental Science, 2016, 9, 962; J. Phys. Chem. Lett., 2017, 8, 1851]. As an example, in the case of $MAPbBr_3$, the exciton Bohr diameter may be about 10 nm. However, depending on the material used, it may be smaller than 10 nm or higher. When calculating the parameters to be used in these measurements, it can be obtained within the range considered by those skilled in the art. According to recent papers [Advanced Energy Materials, 2017, 7, 1700600; APL Materials, 2019, 7, 010901; Advanced Materials, 2019, 31, 1806671] on the dielectric constant with a function of frequency, the dielectric constant ($F_r$) should not use a value in the dynamic dielectric constant regime higher than the high frequency (>1,000,000 Hz), and should be determined by considering the static dielectric constant ($\varepsilon_0$) of $10^6$ Hz or less. It is a regime where an optical response occurs at a high frequency (about $10^{15}$ Hz), and $\varepsilon_\infty$ can be defined in this section. For the dielectric constant used to calculate the exciton Bohr diameter, a value between $\varepsilon_\infty$ and $\varepsilon_0$ should be used. In general, considering the dielectric constant of 3-5 for the organic semiconductor material, in the case of the metal halide perovskite material that is ionic crystal, the static dielectric constant should be significantly greater than this value. In addition, the dielectric constant of the ionic metal halide perovskite material has a value of 10 or more and 50 or less when measured at room temperature, more preferably 20 or more and 35 or less at room temperature, and may vary depending on the temperature, but usually represents a value of 20 to 100 depending on the change in temperature. On the other hand, the $CsPbBr_3$ material has a dielectric constant almost independent of temperature, but the organic-inorganic hybrid metal halide perovskite has a temperature dependence. In addition, the measurement should be carried out with a pure metal halide perovskite thin film without ligand, and the value measured at normal room temperature should be included as an input in the formula. In a typical metal halide perovskite semiconductor in the range of 1 eV to 3.5 eV, it is reasonable for the dielectric constant of the metal halide perovskite to have a value more than twice that of an organic material. The dielectric constant can be measured through a conventional LCR meter, and can be obtained by measuring with an Impedance spectroscopy and fitting with an equivalent circuit. In addition, as shown in Nature Physics, 2015, 11, 582; Energy & Environmental Science, 2016, 9, 962; J. Phys. Chem. Lett., 2017, 8, 1851, effective mass and exciton binding energy are obtained, and then $R^*=R_0\mu\mu/m_0\varepsilon_r^2$ ($R^*$=exciton binding energy, $R_0$=atomic Rydberg constant, $m_0$=free electron mass, $\mu$=reduced effective mass defined by $1/\mu=1/\mu h+1/\mu_e$, $\mu_h$=effective mass of hole, $\mu_e$=effective mass of electron) can be used to obtain it. Obtained in this way, the effective dielectric constant reported in AIP Advances, 2018, 8, 025108 is 11.4. In this case, a value of $\mu$=0.117 m was used. At this time, the obtained exciton Bohr radius is 5.16 nm and the exciton Bohr diameter is 10.32 nm. (In the paper, the exciton Bohr radius is 4.7 nm, so the exciton Bohr diameter is 9.4 nm, but the difference is considered a calculation error.)

Such an exciton Bohr diameter can be obtained by the value for the effective mass of the metal halide perovskite and Equation 1 below.

$$r = a_0 \varepsilon_r \frac{m_0}{\mu} \quad \text{[Equation 1]}$$

Wherein r is the Bohr exciton radius, $a_0$ is the Bohr diameter[LT2] of hydrogen (0.053 nm), $\varepsilon_r$ is the dielectric constant, $\mu=m_e \times m_h/(m_e+m_h)$, $m_e$ is the effective electron mass and $m_h$ may be an effective hole mass. Here, the Bohr diameter is twice the exciton Bohr radius.

In addition, the ITO/PEDOT:PSS/perovskite film/electron injection layer/cathode structure device is manufactured and the capacitance (C) value of the perovskite thin film at 1000 Hz is measured through Impedance spectroscopy. Thereafter, $\varepsilon_r$ can be measured through $C=\varepsilon_r\varepsilon_0 A/d$ (where the A is the device area and the d is the thickness). For $MAPbBr_3$, the exciton Bohr diameter can be calculated as 12.4 nm using the reduced effective mass value ($\mu=0.117\ m_0$) from Energy & Environmental Science, 2016, 9, 962 paper.

Here, the dielectric constant should be measured at room temperature and measured using a pure metal halide perovskite thin film without a ligand. In addition, the dielectric constant may vary depending on the material, and generally has a value of 7 to 30, and more preferably has a value between 7 and 20. However, if a value less than 7 appears, it is possible due to a measurement error, so special care is required. In the case of $MAPbBr_3$, it seems that it may vary depending on the crystal size or the quality of the thin film, but a value between 7 and 20 is a preferable range. In addition, if a different value is obtained depending on the quality of the thin film, the measured value using the thin film made when the thin film has the largest grain size should be followed.

In addition, another way to experimentally determine the exciton Bohr diameter is to measure the size of the point where the Photoluminescence peak wavelength starts to change rapidly depending on the size of the nanoparticles, which may be very close to the exciton Bohr diameter. Alternatively, it may be the particle size at the point where the Full Width at Half Maximum (FWHM) of the photoluminescence spectrum starts to increase. The quantum confinement effect starts below the exciton Bohr diameter, and particles below this point are called quantum dots. If the particle size becomes smaller and uniform in the quantum dot region, photoluminescence peak shifts to blue as this size decreases. In addition, since the color is changed according to the size change, when the light emission spectrum of all particles are collected, the FWHM can be increased. The particle size is most preferably measured with a transmission electron microscope. When measured by the light scattering method, the particle size error is large. If the particles are agglomerated, it is difficult to analyze the size of one particle, and the size of the aggregated particles is overestimated.

The quantum confinement effect refers to a phenomenon observed when an energy band is affected by a change in the atomic structure of a particle, and the exciton Bohr diameter refers to a point where the quantum confinement effect occurs (size of semiconductor particles). That is, when the particle size of the semiconductor is a quantum dot that is less than or equal to the exciton Bohr diameter, as the particle size decreases, a quantum confinement effect is obtained, and accordingly, the “bandgap” and the corresponding “emission wavelength (photoluminescence (PL) spectrum) is changed. Therefore, in order to obtain the actual numerical value of the exciton Bohr diameter, it is necessary to find a region where the quantum confinement effect starts, that is, a “point at which the emission wavelength changes according to the size” of the semiconductor particle.

However, even when the size of the particle is larger than the exciton Bohr diameter, since electron-hole interaction in the semiconductor is changed, the band gap and the emission wavelength of the semiconductor particle may be changed. However, since the amount of change in this part is very insignificant, it is usually called “weak confinement regime”. On the other hand, the quantum confinement regime, in which the band gap varies greatly depending on the size of the quantum dot particle, is called the “strong confinement regime”. Therefore, in order to obtain the exciton Bohr diameter, it is necessary to find the boundary between the weak confinement regime and the strong confinement regime. Therefore, experimentally, when the particle size obtained through the point where the value of the PL peak or FWHM changes rapidly (the point where the straight line or oblique assymptotic line drawn along the slope meets when it has two sharply different slopes) and the value obtained by the above formula agree within a slight error range (about 10%), the exciton Bohr diameter obtained by the equation can be said to be a physically meaningful value.

When judging the exciton Bohr diameter used to determine whether such quantum dots are or not, it can be determined not only based on the theoretical calculation value, but by whether the observed value matches the theoretical calculated value. The observed value is a value obtained by observing at least any one or more of a change in the wavelength (PL Peak) at which the highest value in the light emission spectrum is located, a change in the Full Width at Half Maximum (FWHM), and a change in the valence band maximum (VBM) of the material (measured by ultraviolet photoelectron spectroscopy). Below this exciton Bohr diameter, as the particle size decreases, the change in the wavelength at which the maximum value of photoluminescence intensity is located increases (shift larger toward blue), the Full Width at Half Maximum increases (wider), and the VBM also changes more in the downward and deep direction than above the exciton Bohr diameter.

The band gap energy of the perovskite nanocrystal particles 510 depends on the perovskite crystal structure, which may be 1 to 5 eV. For example, it may be 1.0, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.5, or 5 eV, and the smaller value among the two numbers selected from among the above numbers may be set as the lower limit and the larger value may be set as the upper limit. Specifically, for the application to an device emitting light in the visible region, the band gap energy of the perovskite light-emitting particle 100 may be 1.8 to 3.1 eV, but is not limited thereto.

The perovskite nanocrystal particles 510 may emit light having a wavelength of 200 nm to 1300 nm. In one embodiment, the perovskite nanocrystal particles 510 may emit light of a wavelength of 500 nm to 800 nm, but is not limited thereto.

1-2) Organic Ligands the perovskite light-emitting particle 500 may include a form in which the surface of the perovskite nanocrystal particles 510 is surrounded by a plurality of organic ligands 520 having a composition derived from an organic surfactant.

The organic surfactant may include at least one of an amine surfactant, an organic acid surfactant and an organic ammonium surfactant. The organic surfactant may form an organic ligand on the surface of the perovskite nanocrystal particles when synthesizing them. In addition, the organic ligand may be derived from a compound added during the synthesis process in addition to the surfactant. Because the presence of surfactant improves dispersion stability, the sedimentation after dispersion becomes much slower than when there is no organic surfactant. For example, in the absence of a surfactant, precipitation occurs within minutes to several hours, but in the case of particles surrounded by a plurality of surfactants, it is possible to maintain a stable dispersion state without precipitation for at least 10 hours or more, preferably for several days to several months or more.

The surfactant may act as a ligand surrounding the particles to induce dispersion of the colloidal state in the solvent and maintain the solution for a longer period without precipitation than in the absence of the ligand. Generally, in the case in which there is no ligand, the particle is not called a colloidal nanoparticle. Preparation of particles without a ligand is undesirable because the size of the particles cannot be controlled and the growth of the particles cannot be controlled. In the absence of ligands, precipitation occurs in the solution after several tens of minutes.

The amine surfactant forms amine-based ligand on the surface of the particle when synthesizing perovskite nanocrystal particles. The amine ligand is attached to the perovskite nanocrystals to control the crystallization rate, thereby controlling the size of the perovskite nanocrystals. In addition, polyorganosiloxane may be formed on the surface of the perovskite light-emitting particle by chemical reaction with a siloxane solvent to be described later.

The amine surfactant may be hexylamine, octylamine, decylamine, oleylamine, N,N-diisopropylethylamine, ethylenediamine, hexamethylenetetraamine, methylamine, N,N, N,N-tetramethyleneethylenediamine, triethylamine, diethanolamine, 2,2-(ethylenedioxyl)bis-(ethylamine), 2-methyl-1,5-pentanediamine, 3-methoxytriphenyl-amine, 1,4-phenyl rendiamine, N,N,N,N-pentamethyl diethylenetriamine, triethylenetetramine, rhodamine, diethylamine or ethylindiamine. In one embodiment, the amine ligand surfactant may be at least one selected from hexylamine, octylamine, decylamine, and oleylamine, but is not limited thereto.

The organic acid surfactant may include a carboxylic acid ligand or a phosphonic acid ligand.

The carboxylic acid surfactant may be 4,4'-azobis (4-cyanovaleric acid), acetic acid, 5-aminosalicylic acid, acrylic acid, L-aspentic acid, 6-bromohexanoic acid, bromoacetic acid, dichloro acetic acid acid, ethylenediaminetetraacetic acid, isobutyric acid, itaconic acid, maleic acid, r-maleimidobutyric acid, L-malic acid, 4-nitrobenzoic acid, 1-pyrenecarboxylic acid, or oleic acid. In one embodiment, the carboxylic acid ligand surfactant may be oleic acid, but is not limited thereto.

The phosphonic acid surfactant may be n-hexylphosphonic acid, n-octylphosphonic acid, n-decylphosphonic acid, n-dodecylphosphonic acid, n-tetradecylphosphonic acid, n-hexadecylphosphonic acid, n-octadecylphosphonic acid, benzylphosphonic acid, or orbenzhydrylphosphonic acid.

The organic ammonium surfactant may include an alkyl halide. The alkyl structure of the alkyl ammonium halide may be an acyclic alkyl group having a structure of $C_nH_{2n+1}$. For example, it may be hexadecyl amine, 9-octadecenylamine, or 1-amino-9-octadacene ($C_{18}H_{37}N$), but is not limited thereto.

Additionally, the surfactant may further include an alkylammonium thiocyanate, an alkylammonium cyanate, an alkyl phosphine, an alkyl phosphine oxide, an alkyl phosphonic acid, an alkyl aphosphinic acid, a zwitterionic ligand, a multi-dentate ligand, or a combination thereof.

The zwitterionic ligand may be electrically neutral because the number of cations and the number of anions in the molecular structure are the same. For example, the zwitterionic ligand may be, 3-(N,N-dimethyloctadecylammonio)propanesulfonate, N-hexadecylphosphocholine, N,N-dimethyldodecylammoniumbutyrate, or bethanechol chloride, but is not limited thereto.

The multi-dentate ligand has two or more functional groups capable of bonding to the nanocrystal surface in the molecular structure. The multi-dentate ligand may be, for example, at least one selected from ethanedioic acid, propanedioic acid, butanedioic acid, pentanedioic acid, hexanedioic acid, heptanedioic acid, octanedioic acid, nonanedioic acid, decanedioic acid, undecanedioic acid, dodecanedioic acid, tridecanedioic acid, hexadecanedioic acid, heneicosadioic acid, 2-hydroxypropane-1,2,3-tricarboxylic acid, 1-hydroxypropane-1,2,3-tricarboxylic acid, Prop-1-ene-1,2,3-tricarboxylic acid, propane-1,2,3-tricarboxylic acid, 2-hydroxynonadecane-1,2,3-tricarboxylic acid, or benzene-1,3,5-tricarboxylic acid. However, it is not limited to a molecular structure with —COOH. It may include phosphonate, phosphinate, sulfonate, sulfinate, thiolate, primary ammonium, secondary ammonium, tertiary ammonium, quaternary ammonium, imidazolium, pyridinium, organometallic salts, thiol, amine, phosphine, phosphine oxide, phosphonic acid, phosphinic acid, or a combination of functional groups thereof.

The perovskite light-emitting material may include an NMR fingerprint in an NMR signal measured by dissolving the perovskite light-emitting material in a $CDCl_3$ solvent.

The NMR fingerprint may include a $^{29}$Si peak at a position of a chemical shift value of −17 to −25 ppm in the $^{29}$Si NMR signal. For example, it may be −17.0, −17.1, −17.2, −17.3, −17.4, −17.5, −17.6, −17.7, −17.8, −17.9, −18.0, −18.1, −18.2, −18.3, −18.4, −18.5, −18.6, −18.7, −18.8, −18.9, −19.0, −19.1, −19.2, −19.3, −19.4, −19.5, −19.6, −19.7, −19.8, −19.9, −20.0, −20.1, −20.2, −20.3, −20.4, −20.5, −20.6, −20.7, −20.8, −20.9, −21.0, −21.1, −21.2, −21.3, −21.4, −21.5, −21.6, −21.7, −21.8, −21.9, −22.0, −22.1, −22.2, −22.3, −22.4, −22.5, −22.6, −22.7, −22.8, 22.9, −23.0, −23.1, −23.2, −23.3, −23.4, −23.5, −23.6, −23.7, −23.8, −23.9, −24.0, −24.1, −24.2, −24.3, −24.4, −24.5, −24.6, −24.7, −24.8, −24.9, or −25.0 (unit chemical shift, ppm), and the smaller value among the two numbers selected from the above numbers can be set as the lower limit and the larger value can be set as the upper limit, and more specifically, −19 ppm to −23 ppm is preferable. $^{29}$Si NMR data can be measured using Nuclear Magnetic Resonance Spectrometer analysis equipment. If the measurement object, that is, the perovskite light-emitting particles 100, is not uniformly dispersed in the NMR solution, the reproducibility of the measurement is deteriorated and an accurate value cannot be obtained. Therefore, it is necessary to pay attention to the dispersion of the perovskite light-emitting material in the NMR analysis solvent, such as $CDCl_3$, before measurement. Accordingly, in the $^{29}$Si NMR data according to an embodiment of the present invention, the perovskite light-emitting material may be completely dispersed without aggregation into the analysis solvent.

In addition, the NMR fingerprint may further include a $^1$H peak representing C═C at a chemical shift value of 5.2 to 5.6 ppm in the $^1$H-NMR signal. For example, it may be 5.20, 5.21, 5.22, 5.23, 5.24, 5.25, 5.26, 5.27, 5.28, 5.29, 5.30, 5.31, 5.32, 5.33, 5.34, 5.35, 5.36, 5.37, 5.38, 5.39, 5.40, 5.41, 5.42, 5.43, 5.44, 5.45, 5.46, 5.47, 5.48, 5.49, 5.50, 5.51, 5.52, 5.53, 5.54, 5.55, 5.56, 5.57, 5.58, 5.59, or 5.60 (unit chemical shift, ppm), and the smaller value among the two numbers selected from the above numbers may be set as the lower limit value and the larger value may be set as the upper limit value. More specifically, the case of 5.25 to 5.55 ppm is preferable.

$^1$H-NMR data can be measured using Nuclear Magnetic Resonance Spectrometer analysis equipment. As in the case of $^{29}$Si NMR measurement, if the measurement object is not uniformly dispersed in the solution, the reproducibility of the measurement is deteriorated and an accurate value cannot be obtained. Therefore, before measurement, it is necessary to pay attention to the dispersion of the perovskite light-emitting material in the NMR solvent (here, $CDCl_3$).

2) Organic Siloxane Solvent

The siloxane solvent of the present invention is included in the producing process of the perovskite light-emitting particles. It is possible to prepare perovskite light-emitting particles having a high ligand density by inducing a repulsive force with an organic ligand covering at least any surface of the perovskite nanocrystal particles.

The organic siloxane solvent—may include the following Chemical Formula 1, Chemical Formula 2, Chemical Formula 3, Chemical Formula 4, or a combination or derivative thereof.

[Chemical Formula 1]

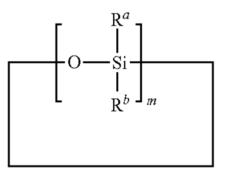

In Chemical Formula 1, $R^a$ and $R^b$ may each independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m may be an integer of 3 to 6.

The Chemical Formula 1 may be, for example, at least one selected from hexamethylcyclotrisiloxane (D3), octamethylcyclotetrasiloxane (D4), decamethylcyclopentasiloxane (D5), dodecamethylcyclohexasiloxane (D6), 1,3,5,7-Tetramethylcyclotetrasiloxane, phenylhydrocyclosiloxanes, hexaphenylcyclotrisiloxane, 1,3,5,7-tetramethyl-1,3,5,7-tetramethoxycyclotetrasiloxane, 1,3,5,7-tetravinyl-1,3,5,7-tetramethylcyclotetrasiloxane and cyclopentasilane, but is not limited thereto.

[Chemical Formula 2]

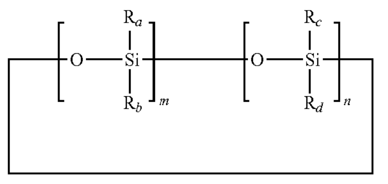

In Chemical Formula 2, $R^a$ to $R^d$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n may independently be an integer of 3 to 10.

[Chemical Formula 3]

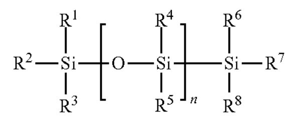

In Chemical Formula 3, $R^1$ to $R^8$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and n may be an integer of 3 to 100.

[Chemical Formula 4]

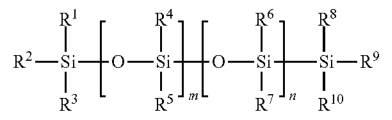

In Chemical Formula 4, $R^1$ to $R^{10}$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n may independently be 3 to 10.

Other examples may include at least one selected from hexamethyldisiloxane (HMDS), caprylyl methicone, 2,2,5,5-Tetramethyl-2,5-disila-1-oxacyclopentane, and derivatives thereof may be used, but it is not limited thereto.

[Chemical Formula 4]

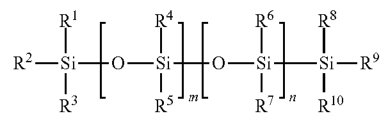

In Chemical Formula 4, $R^1$ to $R^{10}$ may independently be hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n may independently be 3 to 10.

The names and molecular structures of the abbreviations of organosiloxane solvents according to an embodiment are summarized in Table A below.

TABLE 4

| Abbreviation | Name | Structures of compound |
|---|---|---|
| D4 | Octamethylcyclotetrasiloxane | 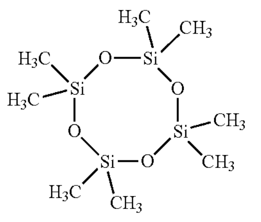 |
| D5 | Decamethylcyclopentasiloxane | 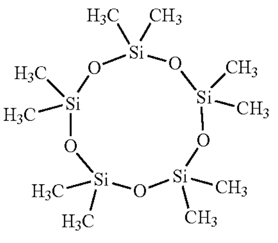 |
| D6 | Dodecamethylcyclohexasiloxane | 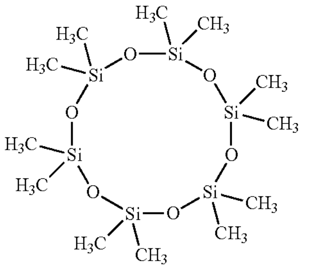 |
| 034 | Caprylyl methicone | 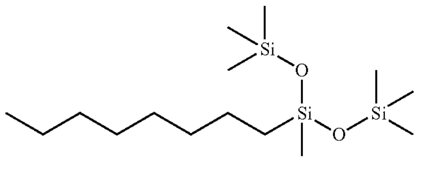 [SMILES: CCCCCCCC[Si](C)(O[Si](C)(C)C)O[Si](C)(C)C] |
| 065cs | Hexamethyldisiloxane | 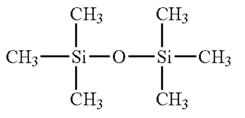 |

In addition, when the siloxane solvent is included in the solvent in the producing process of the perovskite light-emitting particles, the siloxane solvent may have an excellent role in dissolving the organic surfactant and transporting (i.e, pushing) it to the crystal plane of the perovskite nanoparticles. Alternatively, the wetting with the ligand on the crystal plane of the perovskite nanocrystal particles may deteriorate. Conventionally used an organic solvent for dispersing perovskite nanoparticles, such as toluene, is not superior to the siloxane solvent in the ability to transport (or push) the organic surfactant more closely to the nanocrystal plane. The crystal plane of the perovskite nanoparticles is composed of a metal salt, and it is known to have a very high surface tension (170 dyne/cm, analogous to the case of NaCl-air *J. Phys. Chem. B* 2007, 111 (41),11989-11996). When the solvent is in contact with this surface, the siloxane solvent (20 dyne/cm) having a lower surface tension can be spread more efficiently than toluene (27.7 dyne/cm). Accordingly, the distribution on the crystal surface of the perovskite nanoparticles 100 with respect to the organic ligand 120 due to the surfactant contained in the solvent can be improved. Accordingly, the particles can be dispersed in the solvent without agglomeration, and the organic ligand can be more distributed on the crystal surface of the perovskite nanocrystal particles with respect to the organic ligand derived from the surfactant contained in the solvent.

The surfactant, specifically, a fatty acid (fatty compound), such as oleic acid, oleylamine, and the like, generally exhibits a surface tension of about 30 dyne/cm. When comparing the difference in surface tension, the fatty acid-siloxane solvent exhibits a larger difference in surface tension than the fatty acid-toluene. Therefore, toluene penetrates to the surface of the perovskite nanocrystal particles during the synthesis process, and the organic ligands that binds to the nanocrystal particles can be detached from the particles. On the other hand, due to the repulsive force between the organic siloxane solvent and organic ligand, the organic ligand can be well bound to the surface of the perovskite nanocrystal particles during the synthesis process. Accordingly, when the siloxane solvent is included as a solvent for the synthesis solution, better ligands coverage of organic and better ligand density than general organic solvents can be achieved. Accordingly, when the siloxane solvent is used as a solvent for preparing the perovskite light-emitting particles, the prepared perovskite light-emitting particles can achieve excellent dispersion stability and light emission stability as a result.

FIGS. 1 (*a*) and (*b*) are schematic diagrams showing the organic ligand formation mechanism of perovskite light-emitting particles according to the use of (a) toluene (T) and (b) an organic siloxane solvent (D4) in the perovskite light-emitting composition according to the present invention.

Referring to FIGS. 1 (*a*) and (*b*), In the case of synthesizing using toluene, the ligand and toluene make dynamic ligand binding (a phenomenon in which ligands are detached and attached repeatedly) more favorable because toluene reaching the particle surface can detach the ligand well. However, in the case of synthesizing using an organic siloxane solvent (D4), the ligand can be pushed to the particle surface better than toluene (TOL) because the difference in surface energy with the ligand is larger. Accordingly, the ligand coverage and ligand density are improved, so that it may become more difficult for the organic siloxane solvent to reach the surface of the perovskite light-emitting particles. Therefore, the synthesis of perovskite light-emitting particles using an organic siloxane solvent can reduce the occurrence of dynamic ligand binding and allow the organic ligands to be stably located on the surface of the light-emitting particles. Furthermore, the light-emitting composition containing such perovskite light-emitting particles can obtain excellent dispersion stability and light-emitting stability.

Table 1 below summarizes the surface tension values for various commonly used organic solvents.

TABLE 1

| Chemical | Surface Tension (dyne/cm) |
|---|---|
| Pentane | 15.48(25° C.) |
| Ethyl Ether | 17.06 |
| D4 | 17.8 (25° C.) |
| Hexane | 17.91(25° C.) |
| D5 | 18.0 (25° C.) |
| Iso-Octane | 18.77 |
| Acetonitrile | 19.1 |
| Methyl t-Butyl Ether | 19.4 (24° C.) |
| Heptane | 20.3 |
| Isopropyl Alcohol | 21.79(15° C.) |
| Ethyl Alcohol | 22.32 |
| Cyclopentane | 22.42 |
| Methanol | 22.55 |
| Isobutyl Alcohol | 22.98 |
| Acetone | 23.32 |
| Methyl Isobutyl Ketone | 23.64 |
| n-Propyl Alcohol | 23.7 |
| n-Butyl Chloride | 23.75 |
| Ethyl Acetate | 23.75 |
| Methyl Ethyl Ketone | 24.0 (25° C.) |
| n-Butyl Alcohol | 24.57 |
| Cyclohexane | 24.98 |
| n-Butyl Acetate | 25.09 |
| Methyl n-Propyl Ketone | 25.09 |
| Tetrahydrofuran | 26.4 (25° C.) |
| o-Dichlorobenzene | 26.84 |
| Chloroform | 27.16 |
| Dichloromethane | 28.12 |
| Toluene | 28.53 |
| o-Xylene | 30.03 |
| 2-Methoxyethanol | 31.8 (15° C.) |
| Ethylene Dichloride | 32.23 |
| Dimethyl Acetamide | 32.43(30° C.) |
| Chlorobenzene | 33.28 |
| 1,4-Dioxane | 34.45(15° C.) |
| N,N-Dimethylformamide | 36.76 |
| Pyridine | 36.88 |
| Propylene Carbonate | 41.93 |
| Water | 72.8 |

Referring to Table 1, it can be seen that most organic solvents have a higher surface energy than the siloxane solvent (about 17-25 dyne/cm). And it can be confirmed that the organic solvent of Pentane, Ethyl Ether, Hexane, Iso-Octane, Acetonitrile, Methyl t-Butyl Ether, or Heptane has a surface energy similar to or lower than that of the siloxane solvent. Such an organic solvent may be suitable for use during synthesis or as a dispersion solvent or storage solvent after synthesis. Therefore, in addition to the siloxane solvents, Pentane, Ethyl Ether, Hexane, Iso-Octane, Acetonitrile, Methyl t-Butyl Ether or Heptane solvents can be classified into "solvents that induce repulsion (or repulsion-inducing solvents)" against organic ligands. Although not indicated in Table 1, an organic solvent having a surface energy of 25 dyne/cm or less (e.g., 15, 16, 17, 18, 19, 20, 21, 22, 23, 24, or 25 dyne/cm), More preferably, an organic solvent of less than 23 dyne/cm may be used as a "repulsion-inducing solvent". However, since alcohol can dissolve the perovskite particles, it can be used as an additive to the solvent, but cannot be used in large amount as the main solvent.

Therefore, the "repulsion-inducing solvent" in the case of perovskite materials does not solubilize perovskite nanocrystal particles, but solubilize organic ligands, and has a surface energy of 25 dyne/cm or less. On the other hand, since inorganic quantum dots other than perovskites are not decomposed by being dissolved in any solvent, the "repulsing-inducing solvent" must be able to dissolve organic ligands and have a surface energy of 25 dyne/cm or less.

In addition, the organic solvent may include the siloxane solvent.

The formation of a high-density ligand layer on the perovskite light-emitting particles may be affected by the strong interaction between the particle and the ligand and the difference in the surface tension of the ligand-organic solvent. The greater the ligand-organic solvent surface tension difference, the higher the density layer can be produced.

It can be understood that the repulsive force between the perovskite light-emitting particle and the organic ligand is proportional to the difference (defined as the "repulsive force index") between the surface tension of the organic ligand and the solvent existing on the surface of the particle. If this is expressed as an equation, it is as in Equation 2 below.

Repulsive force (repulsion index) of perovskite light-emitting particles against organic ligands=surface tension of organic ligand−surface tension of organic solvent    Equation 2

Since the surface tension of the perovskite organic ligand is 30 dyne/cm for oleic acid/oleylamine and 28.53 dyne/cm for toluene, the difference is about 1.5 dyne/cm. However, when D4, which is an organic siloxane, is used, the difference is 12.8 dyne/cm because the surface tension of D4 is 17.8 dyne/cm.

In addition to the difference in surface tension, the dispersibility and long-term dispersion stability of perovskite particles in a material (long-term dispersion stability refers to the performance of maintaining 50% or more of the photoluminescence efficiency compared to the initial measured value by checking the photoluminescence quantum efficiency under the light exposure and storage conditions at room temperature for 15 days) should also be considered.

TABLE 2

| Material | Surface tension (ST) (25° C.) dyne/cm | Surface tension difference (ST(Perovskite) − ST(Organic Solvent) dyne/cm) | Repulsion index against perovskite light-emitting particles (dyne/cm) (Repulsion Index = ST(Organic Ligand) − ST(Organic Solvent)) Ref: Organic ligand-30 dyne/cm | Dispersibility of Perovskite particles (Bare-eye Observation) | Long-term dispersion stability (Photoluminescence Quantum Efficiencies (PLQE) for 15 days) PASS: PLQE higher than 50% (vs initial 100%) after 15 days measurement |
|---|---|---|---|---|---|
| Halide Perovskite | ~170 | 0 | — | — | — |
| Paraffin wax | 45.1 | 124.9 | −15.1 | dispersible | FAIL |
| Sunflower oil | 34 | 136 | −4 | dispersible | FAIL |
| Biodiesel | 31.7 | 138.3 | −1.7 | dispersible | FAIL |
| Oleic acid | ~30 | ~140 | ~0 | dispersible | FAIL |
| Oleylamine | ~30 | ~140 | ~0 | dispersible | FAIL |
| Diesel | 28 | 142 | 2 | dispersible | FAIL |
| Toluene | 28.53 | 141.47 | 1.47 | dispersible | FAIL |
| Siloxane oil | 15-23 | 147-155 | 7.15 | dispersible | PASS |
| D4 | 17.8 | 158.2 | 12.2 | dispersible | PASS |
| Fluorocarbon | 15-20 | 150-155 | 10.15 | indispersible | FAIL |
| Hexane | 17.91 | 152.09 | 12.09 | dispersible | FAIL |
| Pentane | 15.48 | 154.52 | 14.52 | dispersible | FAIL |

Table 2 is a table indicating the organic solvent, surface tension, repulsion index, dispersibility and long-term dispersion stability used in the synthesis of perovskite light-emitting particles. The organic solvent may include an organic siloxane solvent.

Referring to Table 2, the material for improving and/or maintaining the dispersibility of perovskite particles may be one having a surface tension of 15 to 45 dyne/cm in an organic solvent that enables perovskite particle dispersion, preferably, it may be 15 to 27 dyne/cm. For example, it may be 15, 16, 17, 18, 19, 20, 21, 22, 23, 24, 25, 26, or 27 dyne/cm, more preferably, it may be 15 to 23 dyne/cm. On the other hand, the difference in surface tension between the perovskite light-emitting particles and the organic solvent is 124 to 150 dyne/cm, preferably it may be 145 to 160 dyne/cm. In addition, the difference in surface tension between the organic ligand and the organic solvent (i.e., the repulsive force index of the perovskite light-emitting particles and/or the light-emitting composition) is 0 to 15 dyne/cm (for example, 0, 1, 2, 3, 4, 5, 6, 7, 8, 9, 10, 11, 12, 13, 14, or 15 dyne/cm), preferably it may be 7 to 15 dyne/cm. In the process of synthesizing, it is possible to obtain a perovskite particle solution or composition dispersible in all of the above ranges. Therefore, in a situation where long-term stability is not considered, the range of the organic solvent that can implement the present invention may be a wider range. The organic solvent satisfying the above desirable conditions including long-term dispersion stability may be a siloxane oil (a siloxane compound having a Si—O bond). More specifically, in the case of D4 (octamethylcyclotetrasiloxane), the surface tension is 17.8 dyne/cm, the difference in surface tension is 170-17.8=158.2 dyne/cm, and the repulsive force index (here, repulsive force index=organic ligand surface tension−organic solvent surface tension) with perovskite light-emitting particles is 30−17.8=12.2. In addition, the perovskite particle dispersibility is 'dispersible' (dispersed), and long-term dispersion stability is 'PASS'(pass).

TABLE 3

| number of purifications | Si concentration (ppm) |
|---|---|
| 1 | 100-10000 |
| 2 | 1-100 |
| 3 | <1 |

Table 3 is a table showing the Si concentration according to the number of purifications of the perovskite light-emitting composition of the present invention.

Referring to Table 3, judging from the decrease of the Si concentration measured by the Inductively Coupled Plasma Optical Emission Spectroscopy (ICP-OES), as the number of purifications increases during the purification of the perovskites using a centrifuge, the organic siloxane solvent used for the synthesis decreases due to continuous solvent removal. It can be seen that the Si concentration is around 100-1000 ppm after one time purification and it is reduced to approximately 1/100 per the number of purifications. After the first centrifugation of the perovskite nanoparticle solution, the precipitate is dispersed in hexane, followed by centrifugation again, and then the supernatant is recovered, of which the solution is called 'a first solution'. Then, the first solution is centrifuged again and the precipitate is dispersed in hexane, called 'a second solution'. And after centrifuging the second solution again, the precipitate is dispersed in hexane, called 'a third solution'

In addition, since the siloxane solvent has low $H_2O$ solubility, the amount of dissolved water therein may be extremely small. Therefore, by using the siloxane solvent as a preparation solvent, the hydrophobic organic ligand is more densely attached to the crystal surface of the perovskite nanocrystal particles. As a result, access to moisture is suppressed, so that the influence of moisture by external environmental factors can be blocked during or after synthesis. Therefore, when the siloxane solvent is used as a solvent for preparing the perovskite light-emitting particles, the effect of reducing the effect of moisture on the prepared perovskite light-emitting particles can be obtained.

FIG. 3 is a schematic diagram showing a state in which the perovskite light-emitting particles are dispersed in an organic solvent according to an embodiment of the present invention.

Referring to FIG. 3, the perovskite light-emitting particles having an alkyl chain ligand on the particle surface have very high hydrophobicity and a large surface tension difference from the organic siloxane solvent having low surface tension. For this reason, the perovskite light-emitting particles and the organic siloxane solvent may exhibit a repulsive force. Accordingly, the organic ligands on the surface of the perovskite nanocrystal particles may have more dense ligand coverage properties, and may contain a large amount of organic ligands. When D4 is used as the organic siloxane solvent, a difference in surface tension occurs between the organic ligand and D4, so that the organic ligand falls off the surface of the perovskite light-emitting particle, making it difficult to dissolve into the solution. Accordingly, when synthesizing perovskite light-emitting particles in an organic siloxane solvent, more ligands are present on the surface of the perovskite light-emitting particles than when synthesized in toluene (TOL). As a result, it is advantageous in terms of dispersibility and long-term storage stability in organic solvents (e.g., toluene, hexane, etc.). In addition, when synthesizing perovskite nanocrystal particles in an organic siloxane solvent, the dispersibility of the perovskite light-emitting particles can be greatly improved due to the charge stabilization effect between the particle surface-ligand and the ligand-ligand.

The organic siloxane solvent remains between the synthesized perovskite light-emitting particles, and may be physically or chemically bonded to the particle surface. Alternatively, the organic siloxane solvent may chemically react with an amine, that is, a base, contained in an organic ligand on the surface of the perovskite light-emitting particle to form a siloxane compound on the surface of the perovskite light-emitting particle. Specifically, the chemical reaction may be a ring-opening reaction, and the siloxane compound may include the organosiloxane solvent or polyorganosiloxane. For example, the polyorganosiloxane may be polydimethylsiloxane (PDMS), but is not limited thereto. Therefore, when manufacturing a light-emitting film to be applied as a light-emitting layer in the future, there is an effect that it is easily mixed with a photopolymerizable polymer (resin).

The siloxane solvent may have a viscosity of 0.5 to 2000 cps at 25° C. For example, it can be 0.1, 0.2, 0.3, 0.4, 0.5, 0.55, 0.6, 0.7, 0.8, 0.9, 1, 2, 3, 4, 5, 6, 7, 8, 9, 10, 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990, or 2000 (unit cps), and the smaller value among the two numbers selected from the above numbers can be set as the lower limit and the larger value can be set as the upper limit, more specifically, the case of 0.55 to 300 cps is preferable. The viscosity of the organic siloxane solvent may be a value measured using a Brookfield viscometer. If the viscosity of the organic siloxane solvent exceeds 2000 cps, the viscosity of the solution becomes too high, and diffusion of the mixed materials in the solution becomes poor. Due to this, the synthesis of the perovskite particles may not be possible, or the synthesis may take a lot of time. In one embodiment, the siloxane solvent may have a viscosity of 30 to 1000 cps at 25° C., but is not limited thereto.

The siloxane solvent may have a refractive index of 1.2 to 1.7. For example, it can be 1.20, 1.25, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, or 1.70, and the smaller value among the two numbers selected from the above numbers can be set as the lower limit and the larger value can be set as the upper limit, more specifically, the case of 1.36 to 1.52 is preferable. The refractive index of the organic siloxane solvent may be a value measured using an Abbe refractometer. When an aromatic ring is introduced in the silicone compound, an increase in refractive index occurs and the viscosity of the solution increases significantly. Through this, the synthesis of perovskite particles may be limited or not easy. In one embodiment, the organic siloxane solvent may have a refractive index of 1.3 to 1.5, but is not limited thereto.

The organic siloxane solvent may have a moisture content of 0.001 to 1,000 ppm For example, it can be 0.001, 0.002, 0.003, 0.004, 0.005, 0.006, 0.007, 0.008, 0.009, 0.01, 0.011, 0.021, 0.031, 0.041, 0.051, 0.061, 0.071, 0.081, 0.091, 0.1, 0.11, 0.21, 0.31, 0.41, 0.51, 0.61, 0.71, 0.81, 0.91, 1.0, 1, 2, 3, 4, 5, 6, 7, 8, 9, 10, 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 (unit ppm), and the smaller value among the two numbers selected from the above numbers can be set as the lower limit and the larger value can be set as the upper limit, more specifically, the case of 0.001 to 10 ppm is preferable. The moisture content may be a value measured using a Karl Fischer moisture meter. If the organic siloxane solvent contains a large amount of water in an amount of 1,000 ppm or more, a problem of reproducibility and a decrease in the luminescent effect may occur in the perovskite synthesis process.

The organic siloxane solvent is a non-polar solvent, and may be used alone. However, if the solubility problem of the metal salt used for perovskite occurs, the organic solvent may be included in the range of 30 to 95% based on the total weight of the organic siloxane solvent. The organic solvent may be, but is not limited to, at least one selected from methanol, ethanol, n-butanol, sec-butanol, tert-butanol, acetone, acetonitrile, benzene, toluene, xylene, styrene, hexane, cyclohexane, cyclohexene, dichloromethylene, dichloroethylene, trichloroethylene, chloroform, chlorobenzene, dichlorobenzene, and combinations thereof. In one embodiment, the organic solvent may be toluene, n-hexane, or tert-butanol, but is not limited thereto.

The organic siloxane solvent may have a surface tension of 15 to 23 dyne/cm For example, it can be 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, or 23.0 (unit dyne/cm), and the smaller value among the two numbers selected from the above numbers can be set as the lower limit and the larger value can be set as the upper limit, more specifically, the case of 19 to 21 dyne/cm is preferable. It is not possible to have a value of less than 15 dyne/cm with only pure siloxane material, and when it has a value of more than 23 dyne/cm, diffusion of the siloxane solvent to the surface of the nanoparticles is poor. Accordingly, the ligand, which is dissolved in the solvent and transported, cannot uniformly adhere to the surface of the nanocrystal, creating a kind of defect site, resulting in decreased luminescence. The surface tension may be measured using a surface tensionmeter.

The perovskite light-emitting composition may further include a photopolymerizable monomer and a photoinitiator. The above materials may be required to form the light-emitting composition of the present invention in a solid phase. The perovskite light-emitting composition may be in the form of an independent film or coated and attached film to a substrate, and may be in a state of a colloidal solution in which the perovskite light-emitting composition is dispersed in a solvent. For example, the light-emitting composition may be mixed with a photopolymerizable monomer and a photoinitiator and formed into a light-emitting film or thin film, but is not limited thereto.

The photopolymerizable monomer includes at least any one of a double bond and a triple bond between carbon-carbon, and is not particularly limited as long as it is polymerizable by light. The photopolymerizable monomer may be a monofunctional or polyfunctional ester of acrylic acid having at least one ethylenic double bond.

The photopolymerizable monomer may be a compound composed of an acrylate-based compound, a thiol-based compound, a photoresist, or a combination thereof.

The acrylate-based compound may be a compound composed of a diacrylate compound, a triacrylate compound, a tetraacrylate compound, a pentaacrylate compound, a hexaacrylate compound, or a combination thereof. For example, It may be ethylene glycol diacrylate, triethylene glycol diacrylate, diethylene glycol diacrylate, 1,4-butanediol diacrylate, 1,6-hexanediol diacrylate, neopentyl glycol diacrylate, pentaerythritol diacrylate, pentaerythritol triacrylate, pentaerythritol tetraacrylate, dipentaerythritol diacrylate, dipentaerythritol triacrylate, dipentaerythritol pentaacrylate, pentaerythritol hexaacrylate, bisphenol A epoxy acrylate, bisphenol A diacrylate, trimethylol propane triacrylate, novolac epoxy acrylate, ethylene glycol monomethyl ether acrylate, trisacryloyloxyethyl phosphate, diethylene glycol diacrylate, triethylene glycol diacrylate or propylene glycol diacrylate, but is not limited thereto.

The cured product of the photopolymerizable monomer may be a cured product of a photopolymerizable monomer including at least one of a carbon-carbon double bond and a triple bond and a thiol compound having at least two thiol groups.

In addition, the photopolymerizable monomer may be a photoresist material. The photoresist material may be a silicone or epoxy material.

The photoresist material may be a commercial photoresist. The commercial photoresist materials may be AZ 5214E PR, AZ 9260 PR, AZ AD Promoter-K (HMDS), AZ nLOF 2000 Series, AZ LOR-28PR, AZ 10×TPR, AZ5206-E, AZ GXR-601, AZ 04629 manufactured by AZ Electronics Materials; SU-8, 950 PMMA, 495 PMMA manufactured by MICROCHEM; S1800 manufactured by MICROPOSIT®; DNR-L300, DSAM, DPR, DNR-H200, DPR-G manufactured by Dongjin Semichem; or a CTPR-502 manufactured by Kotem, but is not limited thereto.

A photoinitiator may be used to cure the photopolymerizable monomer, and the photoinitiator may be included in the perovskite light-emitting composition. The type of the photoinitiator is not particularly limited and may be appropriately selected. For example, the usable photoinitiator may be selected from a triazine-based compound, an acetophenone-based compound, a benzophenone-based compound, a thioxanthone-based compound, a benzoin-based compound, an oxime-based compound, a carbazole-based compound, a diketone-based compound, sulfonium borate compound, a diazo-based compound, a biimidazole-based compound, or a combination thereof, but is not limited thereto.

Examples of the triazine-based compound may include 2,4,6-trichloro-s-triazine, 2-phenyl-4,6-bis(trichloromethyl)-s-triazine,2-(3',4'-dimethoxy styryl)-4,6-bis(trichloromethyl)-s-triazine, 2-(4'-methoxy naphthyl)-4,6-bis (trichloromethyl)-s-triazine, 2-(p-methoxyphenyl)-4,6-bis (trichloromethyl)-s-triazine, 2-(p-tolyl)-4,6-bis (trichloromethyl)-s-triazine, 2-Biphenyl-4,6-bis (trichloromethyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis (trichloromethyl)-s-triazine, 2,4-trichloromethyl (piperonyl)-6-triazine, or 2,4-(trichloromethyl(4'-methoxy styryl)-6-triazine, but not limited thereto.

The acetophenone-based compound may be, for example, 2,2'-diethoxy acetophenone, 2,2'-dibutoxy acetophenone, 2-hydroxy-2-methyl propiophenone, p-t-butyl trichloro acetophenone, p-t-Butyl dichloro acetophenone, 4-chloro acetophenone, 2,2'-dichloro-4-phenoxy acetophenone, 2-methyl-1-(4-(methylthio) phenyl)-2-morpholino propane-1-one or 2-benzyl-2-dimethyl amino-1-(4-morpholino phenyl)-butan-1-one, but is not limited thereto.

The benzophenone-based compound may be, for example, selected from benzophenone, benzoyl benzoate, methyl benzoyl benzoate, 4-phenyl benzophenone, hydroxybenzophenone, acrylated benzophenone, 4,4'-bis (dimethyl amino) benzophenone, 4, 4'-dichloro benzophenone or 3,3'-dimethyl-2-methoxy benzophenone, but is not limited thereto.

The thioxanthone-based compound may be selected from thioxanthone, 2-methyl thioxanthone, isopropyl thioxanthone, 2,4-diethyl thioxanthone, 2,4-diisopropyl thioxanthone or 2-chloro thioxanthone, but is not limited thereto.

The benzoin-based compound may be, for example, selected from benzoin, benzoin methyl ether, benzoin ethyl ether, benzoin isopropyl ether, benzoin isobutyl ether, or benzyl dimethyl ketal, but is not limited thereto.

The oxime-based compound may be, for example, selected from 2-(o-benzoyloxime)-1-[4-(phenylthio)phenyl]-1,2-octanedione or 1-(o-acetyloxime)-1-[9-ethyl-6-(2-methylbenzoyl)-9H-carbazol-3-yl]ethanone, but is not limited thereto.

Producing Method of Perovskite Light-Emitting Composition

Hereinafter, the manufacturing method of the perovskite light-emitting composition according to the present invention will be described in detail step by step.

Figure 5:
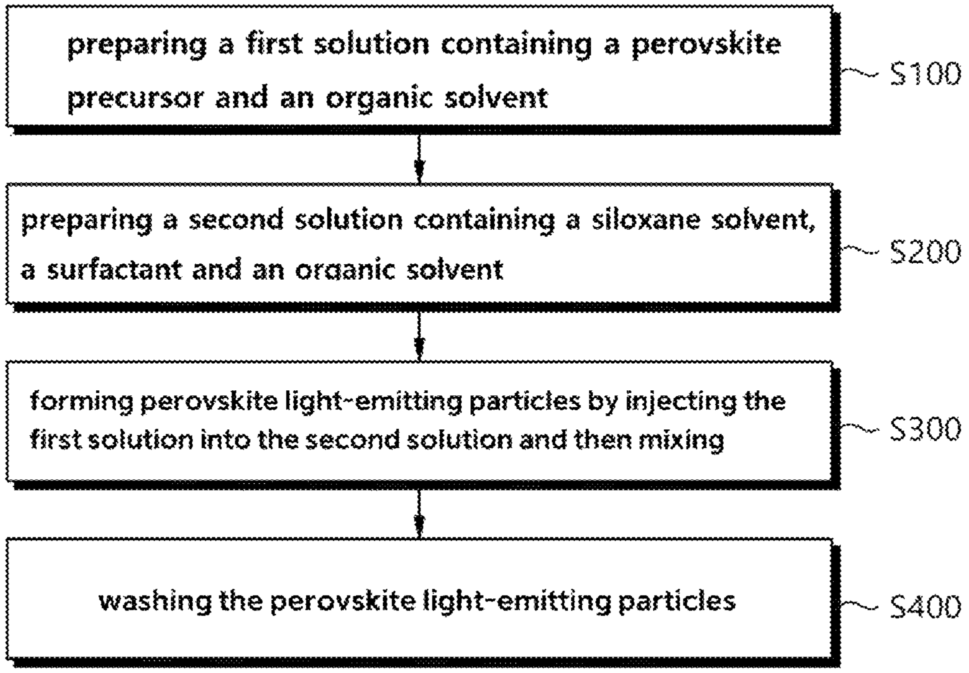
FIG. 5 is a flowchart illustrating a method of producing perovskite light-emitting composition.

FIG. 5 is a flowchart illustrating a method of producing perovskite light-emitting composition.

Referring to FIG. 5, in order to prepare the perovskite light-emitting composition of the present invention, preparing a first solution in which the metal halide perovskite is dissolved in an organic solvent (S100); preparing a second solution in which a surfactant is dissolved in an organic siloxane solvent (S200); synthesizing perovskite nanocrystal particles by dropping the first solution into the second solution and mixing, and forming perovskite light-emitting particles (S300); and washing the perovskite light-emitting particles (S400).

In addition, the method for producing the perovskite light-emitting composition may further include mixing after the washing, adding a photopolymerizable monomer and a photoinitiator.

Here, the method of producing the perovskite nanocrystal particles may be used, a recrystallization (LARP; Ligand-assisted reprecipitation) method, an emulsion method, an inverse-nanoemulsion method, or a Hot-injection method.

The mixing the first solution with the second solution to form nanocrystal particles may be performed using spraying the first solution to the second solution, dripping finely drop by drop, or dropping it at a time.

First, preparing a first solution in which the metal halide perovskite is dissolved in an organic solvent (S100) may be provided.

The first solution may be prepared by dissolving the metal halide perovskite in the organic solvent, and the metal halide perovskite may be prepared by mixing AX and $BX_2$ in a 1:1 ratio to prepare $ABX_3$. In one embodiment, $CH_3NH_3Br$ and $PbBr_2$ may be dissolved in a dimethylformamide (DMF) solvent to prepare $CH_3NH_3PbBr_3$, but is not limited thereto.

In addition, the metal halide perovskite may be prepared by mixing AX and $BX_2$ in a 2:1 ratio to prepare $ABX_3$. In one embodiment, $FAPbBr_3$ may be prepared by dissolving FABr and $PbBr_2$ in a dimethylformamide (DMF) solvent, but is not limited thereto.

The organic solvent is for dissolving and dispersing the perovskite precursor, and is not limited, and at least one selected from a non-polar solvent and a polar solvent generally used in the art may be used. Such organic solvents may be, for example, at least one selected from dichloroethylene, trichloroethylene, chloroform, chlorobenzene, dichlorobenzene, dimethylformamide, dimethylsulfoxide, xylene, toluene, hexane, 1-octadecene, cyclohexene, isopropyl alcohol and 1-butanol.

Meanwhile, the organic solvent used in step S100 may be the same as or different from the organic solvent used in step S200 to be described later.

Thereafter, a step of preparing a second solution in which a surfactant is dissolved in an organic siloxane solvent (S200) may be provided.

The organic siloxane solvent may be prepared by a generally known manufacturing method, or may be used as it is, or purified as desired.

Specific description of the organic siloxane solvent is the same as described in the section of 1-2) organic siloxane solvent.

In particular, the siloxane solvent has very high hydrophobicity and low surface tension, and thus has a large surface tension difference from the organic ligand attached to the surface of the perovskite nanocrystal particles, thereby exhibiting repulsive force to each other. Due to this repulsive force, the siloxane solvent and the perovskite light-emitting particle may be aggregated, respectively, and may exhibit a repulsive force with each other. Therefore, the organic ligand contained in the perovskite light-emitting particles with increased cohesion may have a dense ligand coverage and also have a high ligand density. As a result, perovskite light-emitting particles having a higher ligand density can have increased dispersibility, and improved light-emitting properties and storage stability. In addition, when synthesizing the perovskite nanocrystal particles using a solvent containing the siloxane solvent, due to the charge stabilization effect between the surface-ligand and the ligand-ligand of the perovskite nanocrystal particles, the perovskite light-emitting particles of dispersibility can be greatly improved.

The detailed description of the surfactant is the same as described in the section of 1-2) organic ligand. The surfactant may be prepared by a generally known producing method, or a commercially available one may be used as it is or purified as desired.

The surfactant can be used to easily disperse the perovskite light-emitting particles in a solution and prevent unnecessary agglomeration. In addition, the surfactant may form an organic ligand on the surface of the particle when synthesizing the perovskite nanoparticles.

The organic solvent used in step S200 is for dissolving and dispersing the siloxane solvent and the surfactant, and is not limited, and at least one selected from a non-polar solvent and a polar solvent generally used in the art may be used. Such organic solvents may be, for example, at least one selected from dichloroethylene, trichloroethylene, chloroform, chlorobenzene, dichlorobenzene, dimethylformamide, dimethylsulfoxide, xylene, toluene, hexane, 1-octadecene, cyclohexene, isopropyl alcohol and 1-butanol. In one embodiment, 1-butanol may be used as the organic solvent, but is not limited thereto.

Meanwhile, the organic solvent used in step S200 may be the same as or different from the organic solvent used in step S100 described above.

In step S200, the process temperature may be performed at a low temperature lower than room temperature, and in detail, may be performed while maintaining a temperature range of −10 to +15° C. Preferably, the process may be carried out while maintaining a temperature range of 0 to +10° C.

Then, forming perovskite nanocrystal particles by injecting the first solution into the second solution and mixing (S300) may be performed. The method of injecting the first solution into the second solution may be spraying, dripping finely drop by drop, dropping at once, while the second solution is being stirred.

Due to the difference in solubility between the first solution and the second solution, the perovskite nanocrystal particles are precipitated. At this time, the organic ligand mixed in the second solution adheres to the perovskite nanocrystals and reduces the difference in solubility to limit rapid precipitation of perovskite, so that nano-sized perovskite nanocrystals can be synthesized. Accordingly, perovskite light-emitting particles in which organic ligands are formed on the perovskite nanocrystal particles can be prepared.

In particular, by including the organic siloxane solvent in the second solution, a perovskite light-emitting composition having a higher ligand coverage than a conventional manufacturing method using a toluene solvent can be prepared. The organosiloxane solvent is a material having a low surface tension, and due to the difference in repulsive force with the organic ligand, the organic ligand quickly and densely wets (or adheres) to the surface of the perovskite salt. Accordingly, a denser organic ligand can be contained on the surface of the perovskite nanocrystal particles, and thus, a perovskite light-emitting composition having improved ligand coverage can be prepared. In particular, due to the siloxane solvent contained in the second solution, it is possible to prepare perovskite light-emitting particles having a ligand density, that is, ligand coverage, higher than that of a method using a toluene solvent generally used in the prior art. The ligand density may be derived through Equation 3 below.

$$\text{Ligand density}=(\text{Concentration of organic ligand})/\{6\times\text{Concentration of Metal Material (B)}\times(\text{Size of Perovskite Nanocrystal Particles (PNPs)})^2\} \quad \text{Equation 3}$$

In Equation 3, the organic ligand may be, for example, oleic acid (OA). Accordingly, in the present invention, the organic ligand concentration may be expressed as an OA concentration.

First, the size of perovskite nanocrystal particles (PNPs: Perovskite Nanoparticles) can be derived through TEM (Transmission Electron Microscope) analysis, and the diameter value of the perovskite light-emitting particles measured through this can be used as the nanocrystal particle size. And, assuming that the perovskite light-emitting particles have a cube shape (since it is a hexahedron, the number 6 is multiplied by the denominator), the number of unit cells in the particle can be used as a value obtained by dividing the total volume of the light-emitting particle by the volume of the unit cell. The molecular weight of the light-emitting particle can be calculated by multiplying the number of unit cells derived here by the molecular weight of $FAPbBr_3$ (491.94 g/mol), and the mass of one perovskite light-emitting particle can be calculated by dividing the molecular weight of the derived particle by Avogadro's number. However, in this case, the ligand weight may not be considered.

Then, the OA concentration may be derived from the $^1$H-NMR analysis result from the OA ligand peak appearing from the C═C double bond of the organic ligand, oleic acid (OA), specifically, the peak intensity in the range of 5 to 5.5 ppm. Also, through this, the concentration of OA ligand per surface area of perovskite light-emitting particles can be derived by dividing the OA peak intensity in $^1$H-NMR analysis by the total particle surface area. The method of deriving the total particle surface area is described in detail. First, the total mass of the light-emitting particles contained in the analysis solution can be calculated through ICP-OES analysis. From the Pb concentration measured by ICP-OES analysis, the average $FAPbBr_3$ concentration can be calculated, thereby calculating the total mass of $FAPbBr_3$ particles in the assay solution. It is possible to calculate the number of particles of the perovskite light-emitting particles contained in the analysis solution by dividing this by the mass of one light-emitting particle derived above. Furthermore, the total particle surface area of the perovskite light-emitting particles can be derived as a value obtained by multiplying the number of the derived light-emitting particles by the surface area of one light-emitting particle. At this time, assuming that the perovskite light-emitting particles have a cube shape, the surface area of one light-emitting particle can be derived as a value obtained by multiplying the square value of the diameter of the perovskite light-emitting particles by 6. Therefore, the OA concentration can be derived by dividing the OA peak intensity in $^1$H-NMR analysis by the total particle surface area.

Next, the concentration of Pb can be derived from ICP-OES analysis.

Then, the OA concentration can be derived from the OA ligand peak appearing from the C═C double bond of the organic ligand oleic acid (OA) in the $^1$H-NMR analysis result, specifically, the peak intensity in the range of 5 to 5.5 ppm. Also, through this, the concentration of OA ligand per surface area of perovskite light-emitting particles can be derived by dividing the OA peak intensity in $^1$H-NMR analysis by the total particle surface area. The method of deriving the total particle surface area is described in detail. First, the total mass of the light-emitting particles contained in the analysis solution can be calculated through ICP-OES analysis. From the Pb concentration measured by ICP-OES analysis, the average $FAPbBr_3$ concentration can be calculated, thereby calculating the total mass of $FAPbBr_3$ particles in the assay solution. It is possible to calculate the number of particles of the perovskite light-emitting particles contained in the analysis solution by dividing this by the mass of one light-emitting particle derived above. Furthermore, the total particle surface area of the perovskite light-emitting particles can be derived as a value obtained by multiplying the number of the derived light-emitting particles by the surface area of one light-emitting particle. At this time, assuming that the perovskite light-emitting particles have a cube shape, the surface area of one light-emitting particle can be derived as a value obtained by multiplying the square value of the diameter of the perovskite light-emitting particles by 6. Therefore, the OA concentration can be derived by dividing the OA peak intensity in $^1$H-NMR analysis by the total particle surface area.

The ligand density can be calculated by substituting the above-mentioned variables in Equation 3, and the ligand density derived through this can have a value of 1.5 to 20 a.u./nm$^2$ (a.u. is an arbitrary unit). For example, it may be 1.5, 1.6, 1.7, 1.8, 1.9, 2, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, or 20 (unit a.u./nm$^2$), and the smaller value among the two numbers selected from the above numbers may be set as the lower limit and the larger value may be set as the upper limit. In particular, the perovskite light-emitting particles prepared through the production method of the present invention have a higher ligand density than the conventional method using a toluene solvent due to the siloxane solvent contained in the second solution. may have, and specifically, the ligand density may be 1 to 25 a.u./nm$^2$. In one embodiment, the ligand density may be 1.5 to 20.0 a.u./nm$^2$, but is not limited thereto.

The ligand density may have a range of 1.5 to 10.0 (requires an upper limit) a.u./nm$^2$ but is not limited thereto.

The siloxane solvent is a material having a low surface tension compared to the organic solvent or organic ligand material. As the siloxane solvent used in one embodiment, for example, the surface tension of the D4 material is 17.9 mN/m (or 17.9 dyne/cm), which is significantly lower than that of toluene 28.5 mN/m (or 28.5 dyne/cm) and oleic acid 31.8 mN/m (or 31.8 dyne/cm). Accordingly, the second solution containing the siloxane solvent may exhibit strong repulsion against the organic ligand. This phenomenon has the effect of helping the organic ligand to quickly and densely wet the surface of the perovskite salt.

Therefore, the siloxane solvent contained in the second solution has an advantage in that the organic ligands can be denser and present in a greater amount on the surface of the perovskite nanoparticles.

However, in the stage of dropping and mixing the first solution into the second solution, when the solubility difference between the solutions is high, a demulsifier may be additionally added. The demulsifier may include a primary butanol (n-BuOH), a secondary butanol (sec-BuOH), a tertiary butanol (tert-butanol), or a combination thereof, but is not limited thereto.

The perovskite light-emitting composition of the present invention including the organic siloxane solvent does not sensitively change particle size and light characteristics with changes in temperature and humidity, thereby having a wide synthesis temperature during synthesis. For example, the synthesis temperature of the perovskite light-emitting composition may be −10 to 300° C. Specifically, the synthesis temperature of the perovskite light-emitting composition may be 0 to 180° C. More specifically, the synthesis temperature of the perovskite light-emitting composition may be 15 to 150° C., but is not limited thereto.

Thereafter, a step of cleaning the perovskite light-emitting particles may be provided (S400). The washing step may include a step of centrifuging the synthesized perovskite solution and obtaining a perovskite nanocrystal particle precipitate. A step of vacuum-drying the obtained perovskite nanocrystal particles may be further included.

Even after the washing step using centrifugation, the organic siloxane solvent may be physically or chemically bonded to the surfaces or between of the perovskite light-emitting particles, and then may remain. The organic siloxane solvent may chemically react with an organic ligand on the surface of the perovskite light-emitting particle to form polyorganosiloxane.

The perovskite light-emitting particles synthesized by the preparation method may be used as they are prepared or may be used by diluting with an organic dilution solvent such as toluene.

Also, the manufacturing method of the perovskite light-emitting particles may include more steps of adding and mixing a photopolymerizable monomer and a photoinitiator after the washing (or purification) step.

In order to facilitate the use of the perovskite light-emitting particles in the process, it may be prepared in a light-emitting composition including the same, and in this case, it may further include a photopolymerizable monomer and a photoinitiator. The photopolymerizable monomer and the photoinitiator may be required to form a perovskite light-emitting composition in a solid phase. The perovskite light-emitting composition may be in the form of an independent film or coated on a substrate, and may be in a state of a colloidal solution in which the perovskite light-emitting particles are dispersed in a solvent. For example, the perovskite light-emitting particles may be mixed with a photopolymerizable monomer and a photoinitiator and prepared in the form of a film or a thin film, but are not limited thereto.

Hereinafter, a preferred example and an experimental example are presented to aid understanding of the present invention. However, the following Production Examples and Experimental Examples are only intended to help the understanding of the present invention, and the present invention is not limited by the following Production Examples.

Production Example 1

Metal halide perovskite $CH_3NH_3PbBr_3$ was prepared by mixing $CH_3NH_3Br$ and $PbBr_2$ in a ratio of 0.4 mmol to 1:1.

The first solution was then produced by dissolving the metal halide perovskite $CH_3NH_3PbBr_3$ in dimethylformamide (DMF) as a polar solvent. Then, TSF-404 (D4) (Momentive®) as an organic siloxane solvent, hexylamine as an amine ligand surfactant, and oleic acid as a carboxylic acid surfactant were mixed to prepare a second solution. The first solution was slowly dropped and added one drop by drop to the second solution being stirred with a magnetic bar to synthesize perovskite light-emitting particles.

Thereafter, purification of the solution containing the synthesized perovskite light-emitting particles was conducted by centrifugation at 7,000 rpm for 30 min, and a precipitate was obtained and dissolved in a toluene solvent to prepare a solution of mixed perovskite light-emitting particles. In this case, the absorbance of the mixed solution measured with a UV-vis spectrophotometer was 0.5. The mixed solution was spin-coated on a glass substrate to form a perovskite thin film. In this case, the size distribution of the formed perovskite light-emitting particles was 10 to 30 nm.

Production Example 2

Perovskite light-emitting particles were synthesized and purified using the same method as in Preparation Example 1, except that TSF-404 (D5) (Momentive®) was used as an organic siloxane solvent instead of TSF-404 (D4) (Momentive®), and octylamine was used as an amine ligand surfactant instead of hexylamine, and additionally, tert-butanol was added to the second solution. In this case, the size distribution of the formed perovskite light-emitting particles was 10 to 30 nm, the peak wavelength position (PWL) was 538 nm, the photoluminescence full width at half maximum (FWHM) was 21.0 nm, and the photoluminescence quantum efficiency (PLQE) was 94%.

Production Example 3

Perovskite light-emitting particles were synthesized and purified in the same manner as in Preparation Example 1, except that SILSOFT 065 was used instead of TSF-404 (D4) of Momentive® as an organic siloxane solvent. In this case, the size distribution of the formed perovskite light-emitting particles was 10 to 30 nm, the peak wavelength position (PWL) was 538 nm, the photoluminescence full width at half maximum (FWHM) was 21.0 nm, and the photoluminescence quantum efficiency (PLQE) was 94%.

Production Example 4

Perovskite light-emitting particles were synthesized and purified in the same manner as in Preparation Example 1, except that SILSOFT 065cs was used instead of TSF-404 (D4) of Momentive® as an organic siloxane solvent. In this case, the size distribution of the formed perovskite light-emitting particles was 10 to 30 nm, the peak wavelength position (PWL) was 538 nm, the photoluminescence full width at half maximum (FWHM) was 21.0 nm, and the photoluminescence quantum efficiency (PLQE) was 94%.

Production Example 5

The perovskite nanocrystal material was synthesized and purified in the same manner as in Preparation Example 1, except that SILSOFT 034 was used instead of TSF-404 (D4) of Momentive® as an organic siloxane solvent. In this case, the size distribution of the formed perovskite light-emitting particles was 10 to 30 nm, the peak wavelength position (PWL) was 538 nm, the photoluminescence full width at half maximum (FWHM) was 21.0 nm, and the photoluminescence quantum efficiency (PLQE) was 94%.

Production Example 6

Perovskite light-emitting particles were synthesized and purified in the same manner as in Preparation Example 1, except that a mixed solution in which 50 wt % of toluene and 50 wt % of TSF-404 (D4) were mixed was used instead of TSF-404(D4) of Momentive® as an organic siloxane solvent. In this case, the size distribution of the formed perovskite light-emitting particles was 10 to 30 nm, the peak wavelength position (PWL) was 538 nm, the photoluminescence full width at half maximum (FWHM) was 21.0 nm, and the photoluminescence quantum efficiency (PLQE) was 94%.

Production Example 7

Perovskite light-emitting particles were synthesized and purified in the same manner as in Preparation Example 2, except that a mixed solution in which 50 wt % of n-hexane and 50 wt % of TSF-404(D4) of Momentive® was used as an organic siloxane solvent. In this case, the size distribution of the formed perovskite light-emitting particles was 10 to 30 nm.

Production Example 8-25

Perovskite light-emitting particles were synthesized and purified in the same manner as in Preparation Example 1, except that silicon oil shown in the following Table 5 was used instead of TSF-404 (D4) of Momentive® as an organic siloxane solvent. If the viscosity of the silicon solvent was 3000 cps or more, particles were not formed.

TABLE 5

| | Name of silicone oil | Viscosity (cps) | Refractive index (nD, 25° C.) | Peak Wavelength (PWL, nm) | PLQE (%) | FWHM (nm) | Synthetic Approach |
|---|---|---|---|---|---|---|---|
| Example 8 | TSF451-0.65 | 1 | 1.375 | 538 | 95 | 20.1 | LARP, |
| Example 9 | Element14 PDMS 5-JC | 5 | 1.397 | 538 | 95 | 20.1 | Emulsion |
| Example 10 | Element14 PDMS 10-JC | 10 | 1.399 | 538 | 95 | 20.3 | |
| Example 11 | Element14 PDMS 20 | 20 | 1.401 | 538 | 96 | 20.3 | |
| Example 12 | TSF451-30 | 30 | 1.401 | 538 | 99 | 21 | |
| Example 13 | Element14 PDMS 50-J | 50 | 1.402 | 538 | 99 | 21.2 | |
| Example 14 | Element14 PDMS 100-J | 100 | 1.403 | 538 | 99 | 21.2 | |
| Example 15 | Element14 PDMS 200-J | 200 | 1.403 | 538 | 99 | 21.2 | |
| Example 16 | TSF451-200 | 200 | 1.403 | 538 | 99 | 21.2 | |
| Example 17 | Element14 PDMS 350-J | 350 | 1.403 | 538 | 99 | 21.2 | |
| Example 18 | Element14 PDMS 500-J | 500 | 1.404 | 538 | 99 | 21.2 | |
| Example 19 | Element14 PDMS 1000-J | 1,000 | 1.404 | 537 | 97 | 22 | |
| Example 20 | TSF451-2000 | 2,000 | 1.404 | 535 | 96 | 22.3 | |
| Example 21 | TSF451-3000 | 3,000 | 1.404 | | No particle | | |
| Example 22 | Element14 PDMS 5K-J | 5,000 | 1.404 | | | | |
| Example 23 | Element14 PDMS 10K-J | 10,000 | 1.404 | | | | |
| Example 24 | Element14 PDMS 30K-J | 30,000 | 1.404 | | | | |
| Example 25 | Element14 PDMS 60K-J | 60,000 | 1.404 | | | | |

Comparative Example 1

Perovskite light-emitting particles were synthesized and purified in the same manner as in Preparation Example 1, except that toluene was used instead of TSF-404 (D4) of Momentive® as an organic siloxane solvent. In this case, the size distribution of the formed perovskite light-emitting particles was 10 to 50 nm.

Comparative Example 2

Perovskite light-emitting particles were synthesized and purified in the same manner as in Preparation Example 2, except that n-hexane was used instead of TSF-404 (D5) of Momentive® as an organic siloxane solvent. In this case, the size distribution of the formed perovskite light-emitting particles was 10 to 50 nm.

The conditions used in one embodiment and comparative example of the present invention are summarized and shown in Table 6 below.

TABLE 6

| | Polar solvent | Perovskite | Siloxane solvent | Amine ligand surfactant | Carboxylic acid surfactant | etc |
|---|---|---|---|---|---|---|
| Example 1 | DMF | $CH_3NH_3PbBr_3$ | TSF-404 (D4) | hexylamine | oleic acid | |
| Example 2 | | | TSF-404 (D5) | hexylamine | | tert-BuOH addition |
| Example 3 | | | SILSOFT065 | hexylamine | | |
| Example 4 | | | SILSOFT065cs | hexylamine | | |
| Example 5 | | | SILSOFT034 | hexylamine | | |
| Example 6 | | | Toluene 50 wt % + TSF-404 (D4) 50 wt % | hexylamine | | |
| Example 7 | | | n-hexane 50 wt % + TSF-404 (D4) 50 wt % | octylamine | | tert-BuOH addition |
| Example 8-25 | | | silicone oil | hexylamine | | |
| Comparative Example 1 | | | toluene | hexylamine | | |
| Comparative Example 2 | | | n-hexane | octylamine | | tert-BuOH addition |

Figure 6:
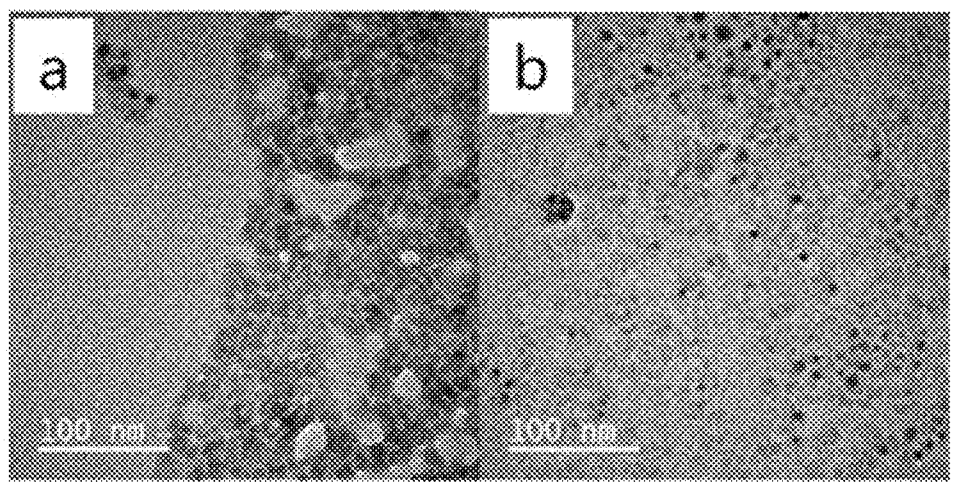
FIGS. 6 *a* and *b* show transmission electron microscope (TEM) images of the perovskite light-emitting composition synthesized according to an embodiment of the present invention.

FIGS. 6*a* and 6*b* show transmission electron microscope (TEM) images of perovskite light-emitting particles synthesized according to an embodiment of the present invention. Referring to FIG. 6, it may be seen that the perovskite light-emitting particles (6*b*) synthesized using an organic siloxane solvent are more evenly dispersed than those synthesized using a toluene solvent (6*a*). That is, the perovskite light-emitting particles synthesized using an organic siloxane solvent can quickly attach a large amount of organic ligands to the surface of the particles during the synthesis process, so that particles of uniform size can be evenly dispersed in the solvent.

Figure 7:
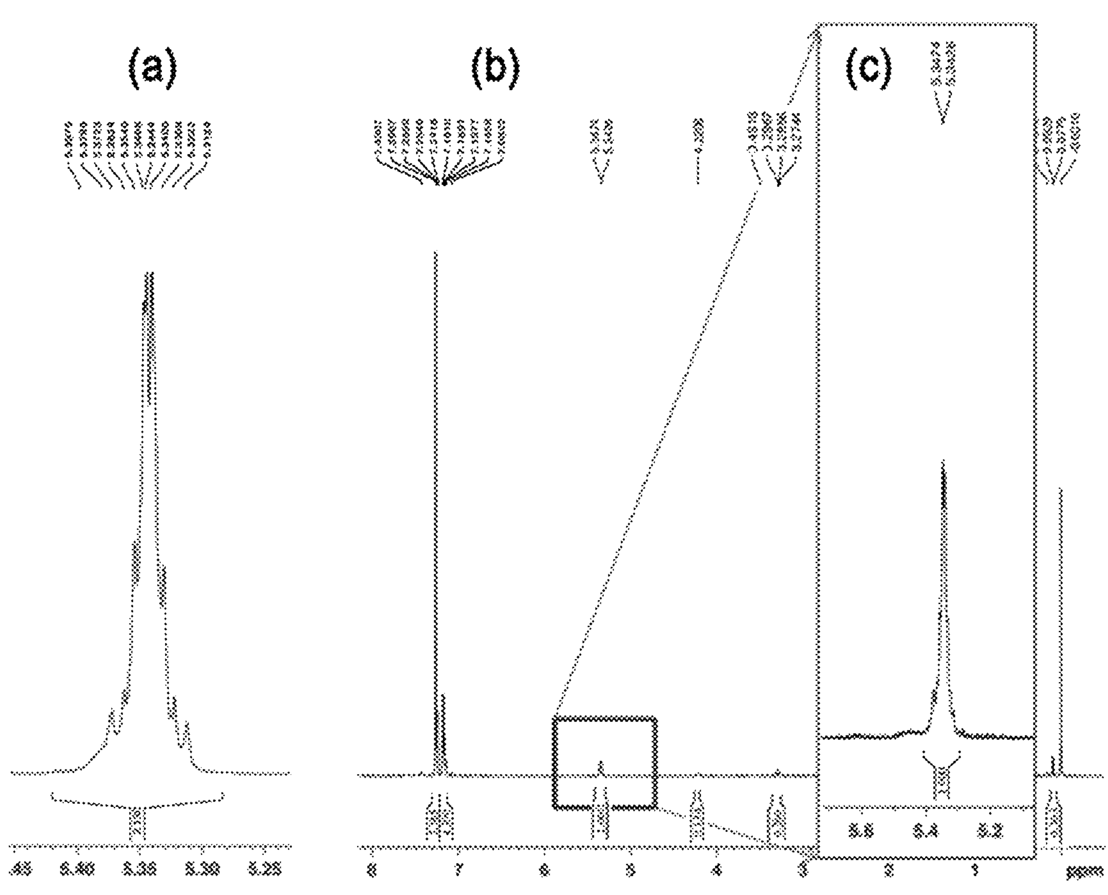
FIG. 7 is a $^{1}$H-NMR analysis result of a perovskite light-emitting composition synthesized based on oleic acid according to an embodiment of the present invention.

FIG. 7 is a result of $^1$H-NMR analysis of perovskite light-emitting particles synthesized based on oleic acid according to an embodiment of the present invention. The synthesized perovskite light-emitting particles were dissolved in a deuterated chloroform ($CDCl_3$) solvent and $^1$H-NMR spectrometer was measured. Referring to FIG. 7, as a $^1$H peak derived from a C═C double bond of oleic acid is observed at a similar position, it may be seen that the structure and chemical properties of the material are not changed even when oleic acid is attached to the surface of the perovskite light-emitting particle.

FIGS. 8*a*, 8*b* and 8*c* are $^{29}$Si-NMR results for a solvent used for synthesis according to an embodiment of the present invention and $^{29}$Si-NMR results for perovskite light-emitting particles purified after synthesis. The synthesized perovskite light-emitting particles were dissolved in a deuterated chloroform ($CDCl_3$) solvent and measured with a $^{29}$Si-NMR spectrometer.

Figure 8:
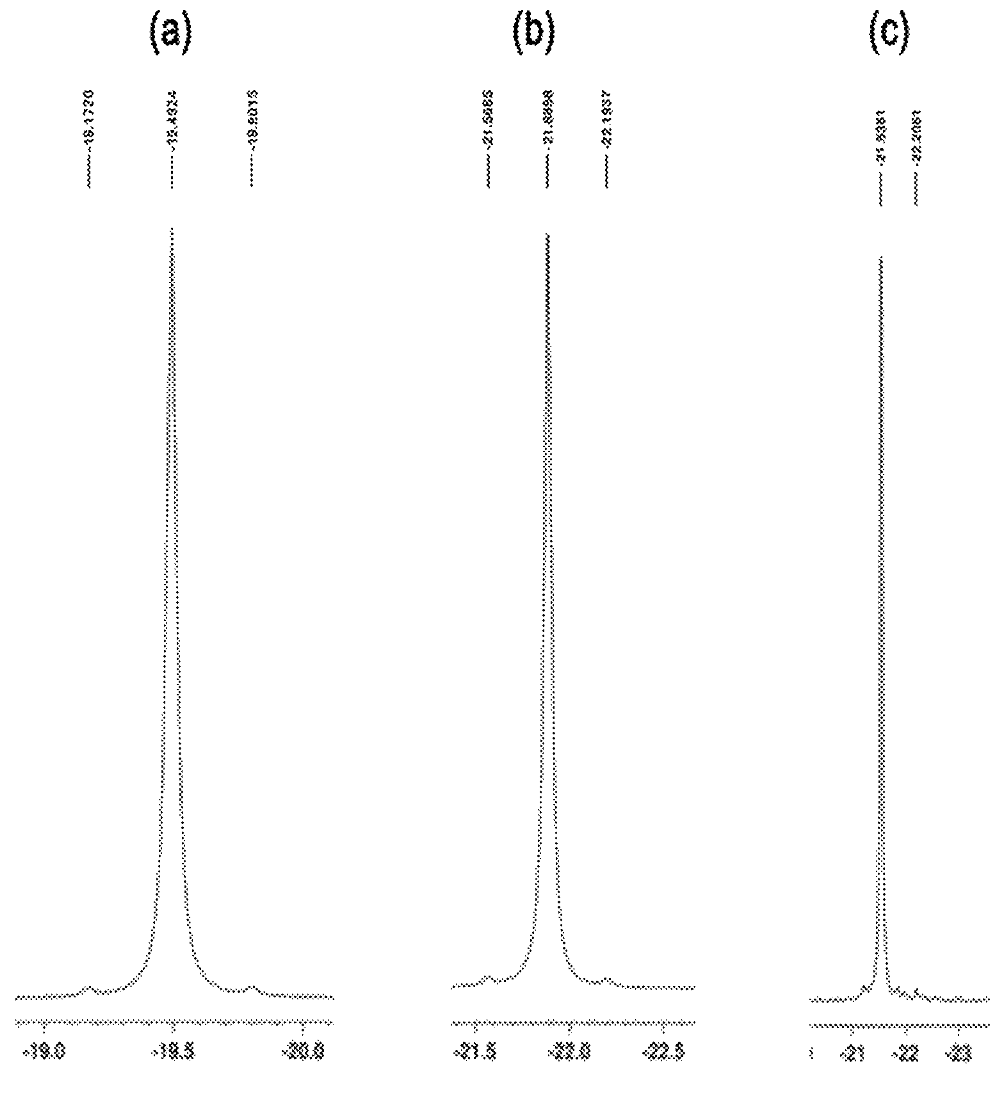
FIG. 8 *a* to *c* are $^{29}$Si-NMR results for a solvent used for synthesis according to an embodiment of the present invention and $^{29}$Si-NMR results for a purified perovskite light-emitting composition after synthesis.

Referring to FIG. 8, it was confirmed that an inherent $^{29}$Si peak for each material was near chemical shift −20 ppm. The organic siloxane solvent has a very large molecular weight, and may not be washed off even after the purification process, and may remain with weak electrostatic attraction between the perovskite light-emitting particles. Alternatively, a small amount of the amine ligand of the surfactant may remain on the surface of the particles, and may chemically react with an organic siloxane solvent to form a small amount of a polymer film (polyorgnosiloxane) on the surface of the perovskite light-emitting particles. When the amine ligand chemically reacts with the organic siloxane solvent, the organic siloxane solvent has a ring structure destroyed and a (−) charge, and thus may be bound to the amine ligand having a base. That is, since the $^{29}$Si peak is confirmed even after purifying the perovskite light-emitting particles, it can be seen that the heavy organic siloxane solvent remains on the surface of the perovskite light-emitting particles even after washing (i.e., purification) using centrifugation. Alternatively, it may be seen that the amine ligand remaining on the surface of the perovskite nanocrystal and the organic siloxane solvent are chemically reacted, and thus the polymerized polyorganosiloxane polymer may exist on the surface of the perovskite nanocrystal.

Figure 9:
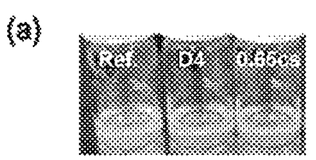
FIG. 9 *a* to *c* are absorption spectrum and photoluminescence spectrum (PL) of the perovskite light-emitting composition synthesized using the organic siloxane solvent alone.
Figure 9:
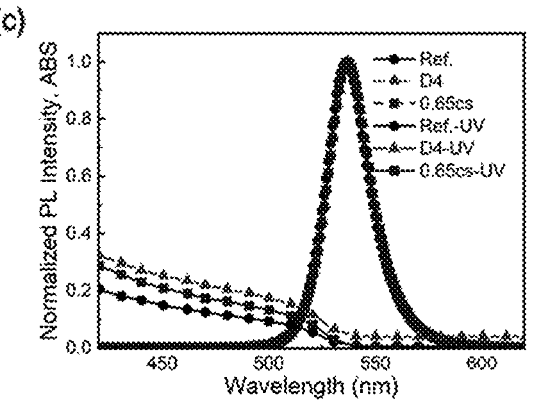

FIG. 9*a* to 9*c* are absorption spectra and photoluminescence spectra (PL) for a perovskite nanocrystal material synthesized using an organic siloxane solvent alone. Referring to FIGS. 9*a* and 9*c*, the perovskite nanocrystal material of the present invention does not change the difference between the valence band (VB) and the conduction band (CB) even if it absorbs light as much as the energy difference between VB and CB, and as a result, a band-edge emission, in which light is re-emitted by the band gap, is observed. Referring to FIG. 9*b*, synthesis was performed using organic siloxane solvents having various molecular structures. As a result, it can be seen that it has similar absorption and photoluminescence spectra. This means that the perovskite nanocrystal particles synthesized using an organic siloxane solvent are similar to a synthesized material according to a conventional synthesis method. Accordingly, based on the above results, the method of synthesizing perovskite light-emitting particles using an organic siloxane solvent of the present invention is safer than that of using a generally-used toxic non-polar organic solvent such as toluene and may stably replace the solvent.

Figure 10:
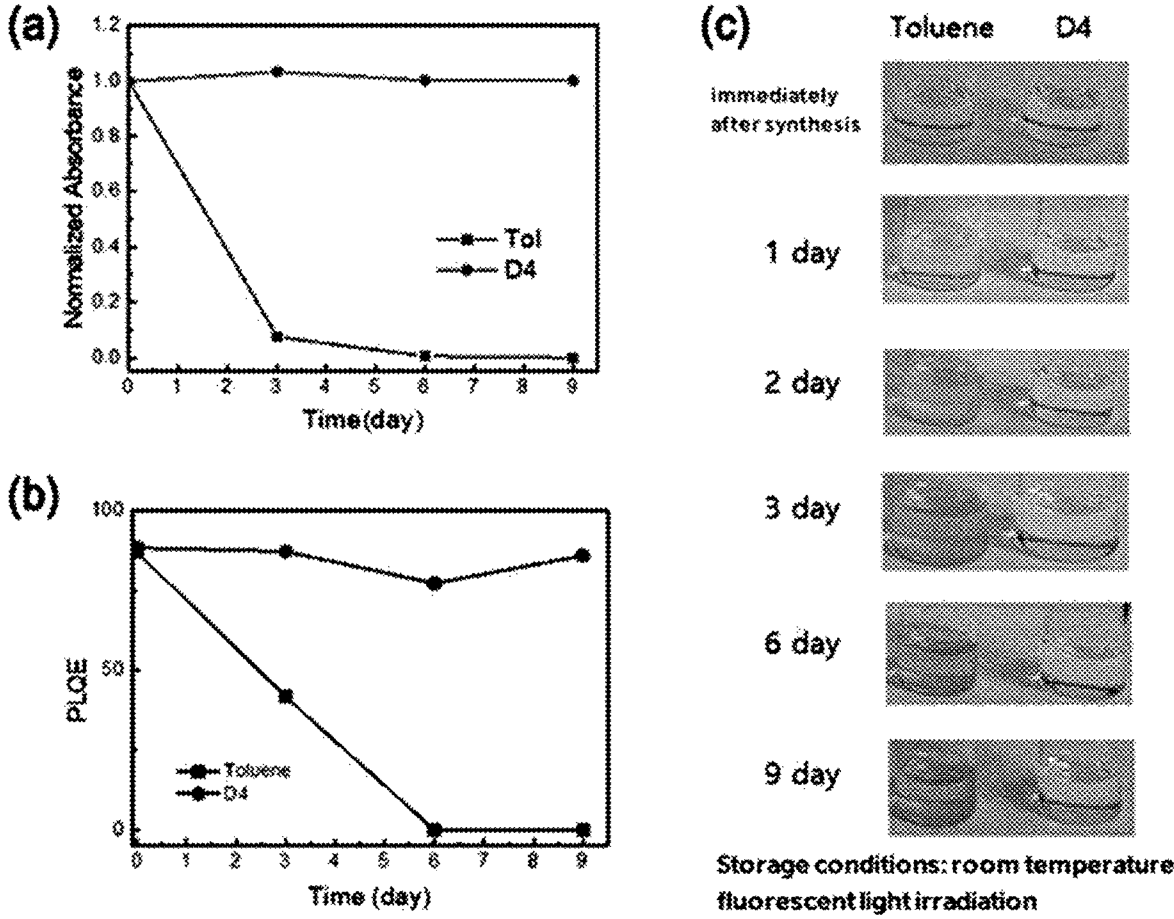
FIG. 10 *a* to *c* are results of confirming the dispersion stability and luminescence stability according to the solvent of the perovskite light-emitting composition according to an embodiment of the present invention.

FIG. 10*a* to FIG. 10*c* are results of confirming dispersion stability and light-emitting stability according to a solvent in a method of synthesizing perovskite light-emitting particles according to an embodiment of the present invention. Referring to FIG. 10*a* to *c*, absorbance analysis was carried out using perovskite light-emitting particles synthesized using toluene and an organic siloxane solvent (D4). The dispersion stability of the particles was confirmed through absorbance analysis. It was confirmed that nanoparticles synthesized using toluene solvents were easily aggregated and had poor dispersibility, and the photoluminescence full-width-at-half-maximum (PL FWHM) and photoluminescence efficiency (PLQE) of the particles decreased rapidly according to storage time. On the other hand, it was confirmed that the perovskite light-emitting particles synthesized using the organic siloxane solvent of the present invention maintain a constant emission width and photoluminescence efficiency of the particles above a predetermined level even when up to 9 days elapse. That is, it can be seen that the perovskite light-emitting particles synthesized using an organic siloxane solvent have a large amount of organic ligands attached to the surface of the particles during the synthesis process, so that passivation of the perovskite nanocrystal particles is possible, thereby improving long-term stability of the light-emitting particles.

Figure 11:
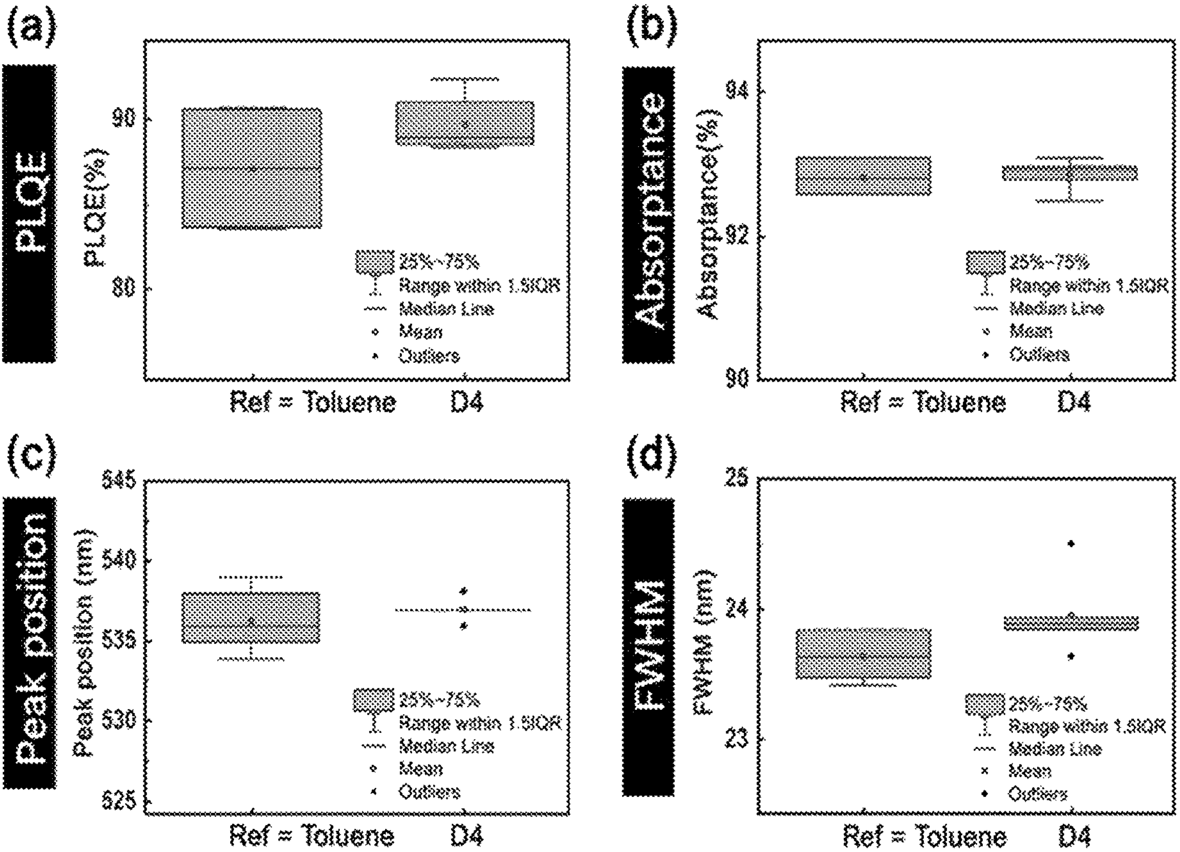
FIG. 11 is a graph showing the reproducibility of the experiment in the preparation of the perovskite light-emitting composition according to an embodiment of the present invention.

FIG. 11 is a graph showing reproducibility of experiments in the synthesis of perovskite nanocrystal particles according to an embodiment of the present invention. Referring to FIG. 11, in an experiment for synthesizing perovskite nanocrystal particles using toluene and an organic siloxane solvent (D4), the same experiment was performed three times, and the results are shown for each physical properties. In all physical properties, it can be seen that the perovskite nanocrystal particles synthesized with toluene as a solvent have rather large differences between the experiments. On the other hand, it can be seen that the perovskite nanocrystal particles synthesized using the organic siloxane solvent of the present invention have excellent reproducibility of experiments and can provide excellent quality.

FIGS. 12*a* and 12*b* are photographs and photoluminescence spectrum (PL) results of large-scale synthesis of perovskite nanocrystal particles using an organic siloxane solvent according to an embodiment of the present invention.

Figure 12:
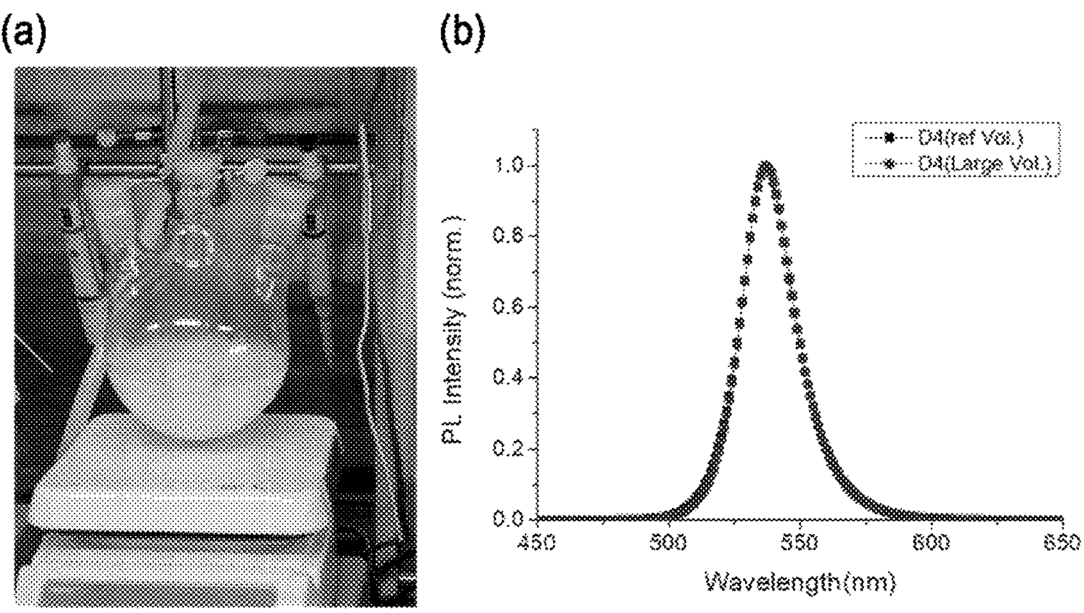
FIGS. 12*a* and 12*b* are photographs and photoluminescence spectrum (PL) results for large-capacity synthesis of the perovskite light-emitting composition according to an embodiment of the present invention.

Referring to FIG. 12, when the reaction is performed in a flask having a volume of 1000 mL using the synthesis method of the present invention, it was confirmed that there is no difference in photoluminescence spectrum (PL) results from the material synthesized with a small scale. That is, it may be seen that the method of synthesizing the perovskite nanocrystal particles using the organic siloxane solvent of the present invention may be synthesized in a high capacity.

Embodiment Example 1: Preparation of $FAPbBr_3$ Perovskite Light-Emitting Particles Using Siloxane Solvent The $FAPbBr_3$ perovskite nanocrystal particles that used a siloxane solvent were produced using the LARP method. First, 0.2 mmol of formamidinium bromide (FABr) and 0.1 mmol of lead bromide ($PbBr_2$) were added as precursors to 0.5 ml of dimethylformamide (DMF) as an organic solvent and stirred for 30 minutes to produce a precursor solution (a first solution). The precursor solution was produced in a clean room and hood, and static electricity was removed before measuring the sample. Separately, 5 ml of octamethylcyclotetrasiloxane (D4) as a siloxane solvent, 300 μL of oleic acid (OA), 24.2 μL of decylamine, and 2 ml of 1-butanol were mixed and followed by stirring at 1200 rpm for 1 minute using a stirrer to obtain a mixed solution (a second solution). In this case, the prepared second solution was stored in a refrigerator at a temperature of 0 to 10° C. for 1 hour. Thereafter, 150 μL of the precursor solution (first solution) was quickly injected into the mixed solution (second solution) and stirred at room temperature for 10 minutes to synthesize perovskite nanocrystal particles. Then, the solution including the synthesized perovskite nanocrystal particles was put in a conical tube and centrifuged at 12,000 rpm for 10 minutes. After centrifugation, the supernatant was discarded, and 1 mL of toluene was added to the remaining precipitate and redispersed. The redispersed solution was centrifuged at 3,750 rpm for 10 minutes, and only the supernatant was extracted with syringe and filtered through a PTFE filter. At this time, during the filtering, the first two transparent drops were not taken, and the filtered solution was taken on vials. However, when non-transparent droplets were being filtered through the filter from the beginning of the filtration, another filter was used after replacement. Accordingly, $FAPbBr_3$ perovskite light-emitting particles using a siloxane solvent were prepared.

Control Example 1: Production of Perovskite Light-Emitting Particles without Siloxane Solvents $FAPbBr_3$ perovskite light-emitting particles were prepared in the same method as in Example 1, except that 5 ml of toluene was used instead of octamethylcyclotetrasiloxane (D4) as a siloxane solvent in the preparation of the second solution.

Control Example 2: Preparation of $MAPbBr_3$ Perovskite Light-Emitting Particles Using Siloxane Solvent The $MAPbBr_3$ perovskite nanocrystal particles using a siloxane solvent were prepared by using an emulsion method. First, 17 mL vial in which the precursor will be dissolved was washed sequentially with dimethylformamide (DMF), isopropyl alcohol (IPA), and acetone, and then dried and prepared. 280 mg of MABr, 2,019 mg of $PbBr_2$, and 347 mg of didodecyldimethylammonium bromide (DDAB) were added as precursors to the washed vial, and then dissolved with 14 mL of DMF to prepare a precursor solution. Separately, 5 mL of oleic acid and 0.313 mL of octylamine were added to 62.5 ml of octamethylcyclotetrasiloxane (D4), a siloxane solvent contained in a 3 neck-round flask, and stirred at 1,400 rpm to prepare a antisolvent solution. Thereafter, when the precursor solution is added to the antisolvent solution while stirring, synthesis does not proceed and instead an emulsion is formed, and the emulsion is stabilized by stirring for an additional 10 minutes.

Next, 37.7 mL of tert-butanol was introduced as a demulsifier using a glass funnel to an emulsion under stirring to perform a perovskite synthesis reaction. In this case, the glass funnel was prevented from contacting the antisolvent solution, and the glass funnel was removed after the introduction of the anti-emulsifier was completed. Thereafter, stirring was additionally performed at 1,400 rpm for 10 minutes with a stirrer, thereby preparing $MAPbBr_3$ perovskite light-emitting particles, which were used for analysis after washing and drying.

Control Example 3: Preparation of $CsPbBr_3$ Perovskite Light-Emitting Particles Using Siloxane Solvents The $CsPbBr_3$ perovskite nanocrystal particles using a siloxane solvent were prepared using a hot injection method. First, 0.9 g of $Cs_2CO_3$, 9.3 μmL of D5 (decamethylcyclopentasiloxane), and 4.5 mL of oleic acid (OA) were put into a three-necked flask, mixed at a temperature of 120° C. for 1 hour, and maintained in a nitrogen atmosphere to prepare Cs-oleate. Separately, 0.22 g of $PbBr_2$, 0.5 g of $ZnBr_2$, 7 mL of oleic acid (OA), 7 mL of oleylamine (OLA), and 20 mL of 1-octadecene (ODE) were placed in a three-necked flask, mixed at a temperature of 120° C. for 1 hour, and maintained at 200° C. in a nitrogen atmosphere. Here, 1.5 mL of the prepared Cs-oleate was injected for 5 seconds and quickly cooled in an ice batch. Then, the solution including the prepared crude $CsPbBr_3$ perovskite nanocrystal particles was put in a conical tube and centrifuged at 10,000 rpm for 10 minutes. After centrifugation, the supernatant was discarded, and 3 mL of toluene was added to the remaining precipitate and redispersed. The redispersed solution was centrifuged at 10,000 rpm for 10 minutes, and only the supernatant was extracted with syringe and filtered. Accordingly, $CsPbBr_3$ perovskite light-emitting particles using a siloxane solvent were prepared.

Figure 13:
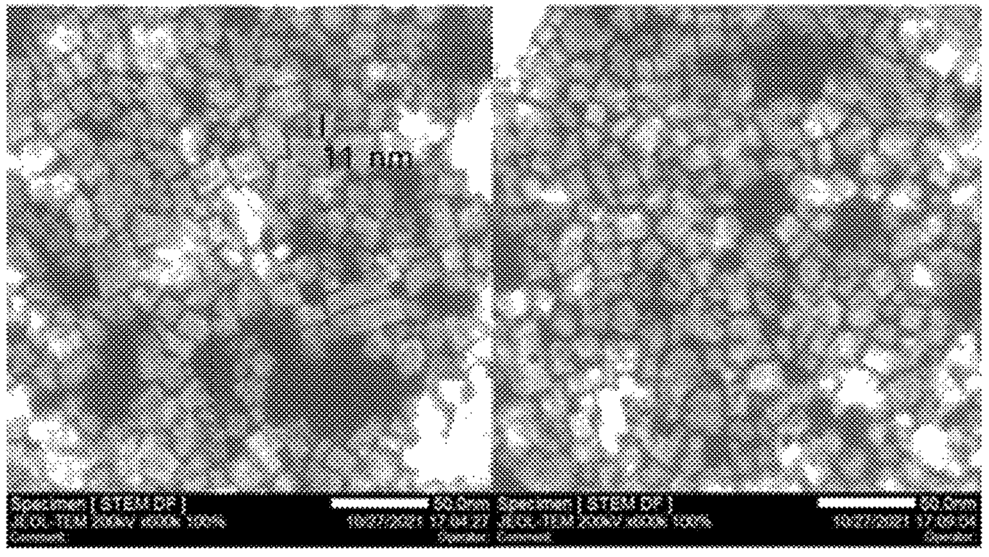
FIG. 13 is a transmission electron microscope (TEM) photograph of the perovskite light-emitting particles according to Comparative Example 1 of the present invention.

FIG. 13 is a transmission electron microscope (TEM) photograph of perovskite light-emitting particles according to Comparative Example 1 of the present invention.

Figure 14:
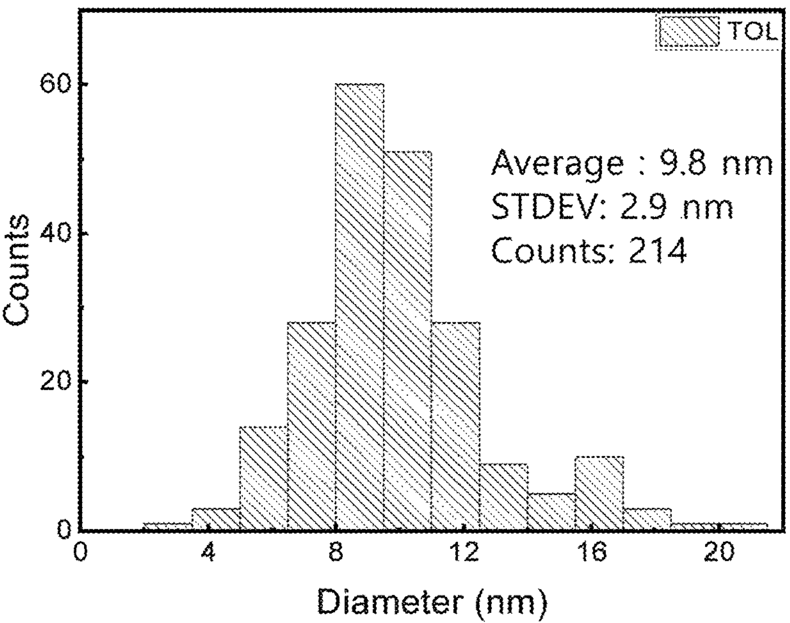
FIG. 14 is a graph showing the particle size distribution of the perovskite light-emitting particles according to Comparative Example 1 of the present invention.

FIG. 14 is a graph illustrating a particle size distribution of perovskite light-emitting particles according to Comparative Example 1 of the present invention.

Figure 15:
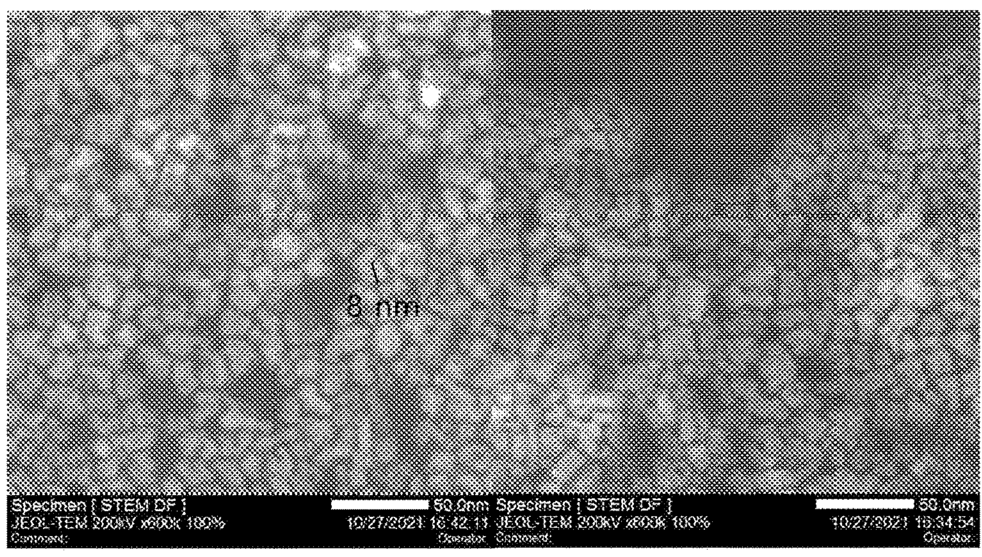
FIG. 15 is a transmission electron microscope (TEM) photograph of the perovskite light-emitting particles according to Embodiment Example 1 of the present invention.

FIG. 15 is a transmission electron microscope (TEM) photograph of perovskite light-emitting particles according to Example 1 of the present invention.

Figure 16:
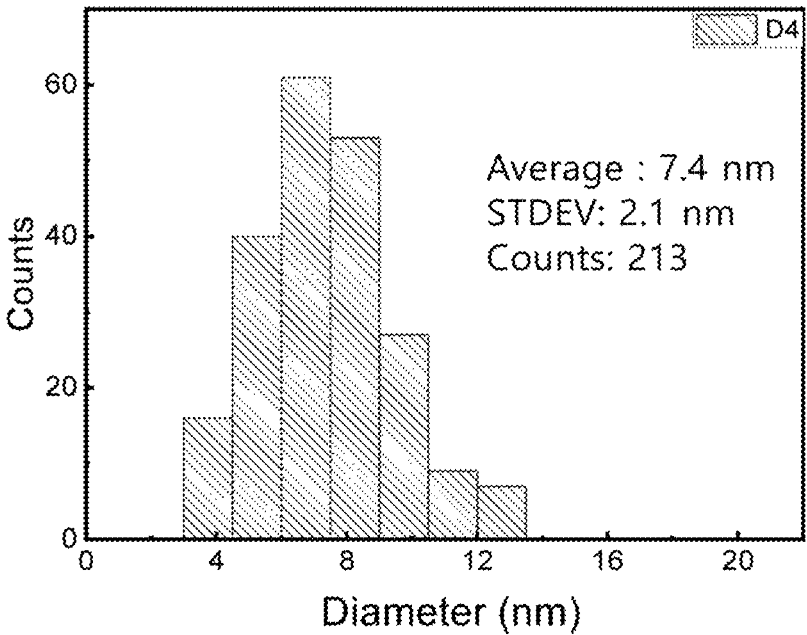
FIG. 16 is a graph showing the particle size distribution of the perovskite light-emitting particles according to Embodiment Example 1 of the present invention.

FIG. 16 is a graph illustrating a particle size distribution of perovskite light-emitting particles according to Example 1 of the present invention.

According to FIG. 13 to 16, it was confirmed that in Embodiment 1 using the siloxane solvent (D4) in preparing the second solution, the average size of the perovskite light-emitting particles was 7.4 nm, and in Control Example 1 using toluene instead of the siloxane solvent, the particle size was 9.8 nm, which was prepared. Since the size distribution was also smaller in the case of Embodiment 1, it was found that the perovskite light-emitting particles according to Embodiment 1 had a more even particle distribution, and smaller-sized particles were produced. Accordingly, in Example 1 of the perovskite light-emitting particles synthesized using a siloxane solvent, it was confirmed that particles having a smaller and uniform size were uniformly dispersed than Comparative Example 1 using a toluene solvent. That is, the perovskite light-emitting particles synthesized using a siloxane solvent can quickly attach a large amount of organic ligands to the surface of the particles during the synthesis process, indicating that small and uniform-sized particles are synthesized.

Figure 17:
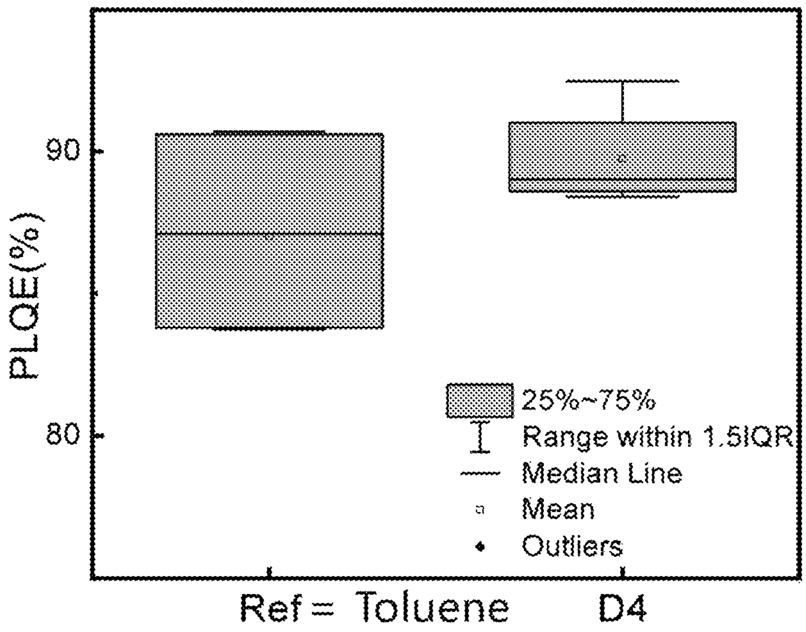
FIG. 17 is a graph showing the photoluminescent efficiency (PLQE) of the perovskite light-emitting particles according to an embodiment of the present invention.

FIG. 17 is a graph illustrating photoluminescence quantum efficiency (PLQE) of perovskite light-emitting particles according to an embodiment of the present invention.

Figure 18:
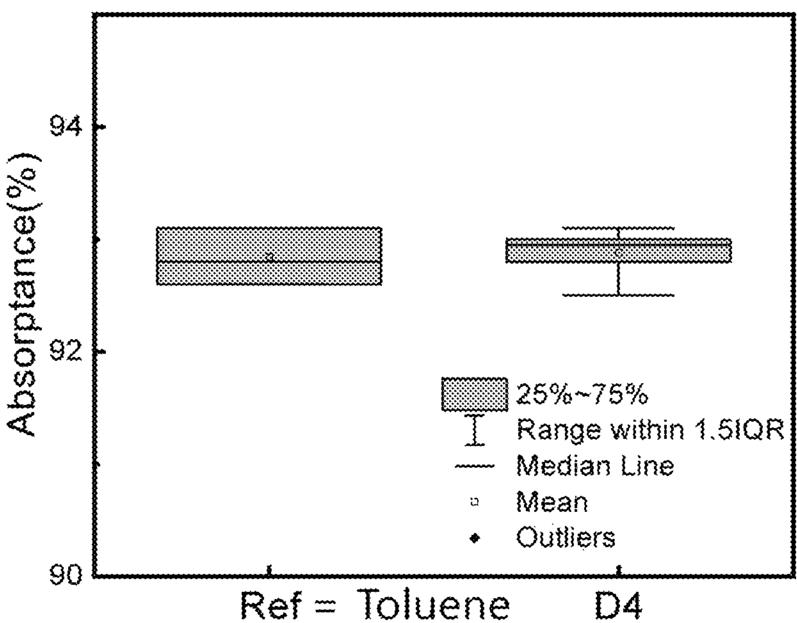
FIG. 18 is a graph showing the absorption spectrum (absorbance) of the perovskite light-emitting particles according to an embodiment of the present invention.

FIG. 18 is a graph illustrating an absorption spectrum of perovskite light-emitting particles according to an embodiment of the present invention.

Figure 19:
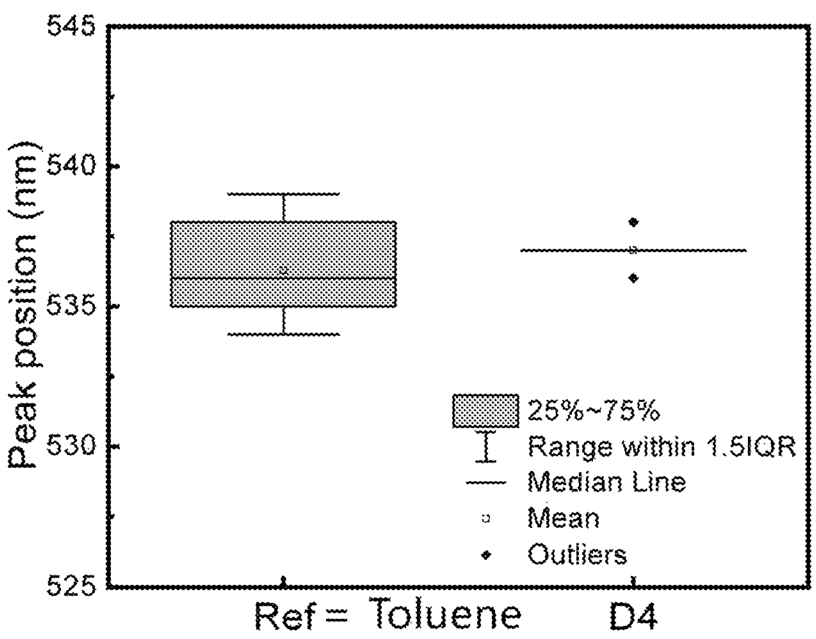
FIG. 19 is a graph showing the peak position of the perovskite light-emitting particles according to an embodiment of the present invention.

FIG. 19 is a graph illustrating a peak position of perovskite light-emitting particles according to an embodiment of the present invention.

Figure 20:
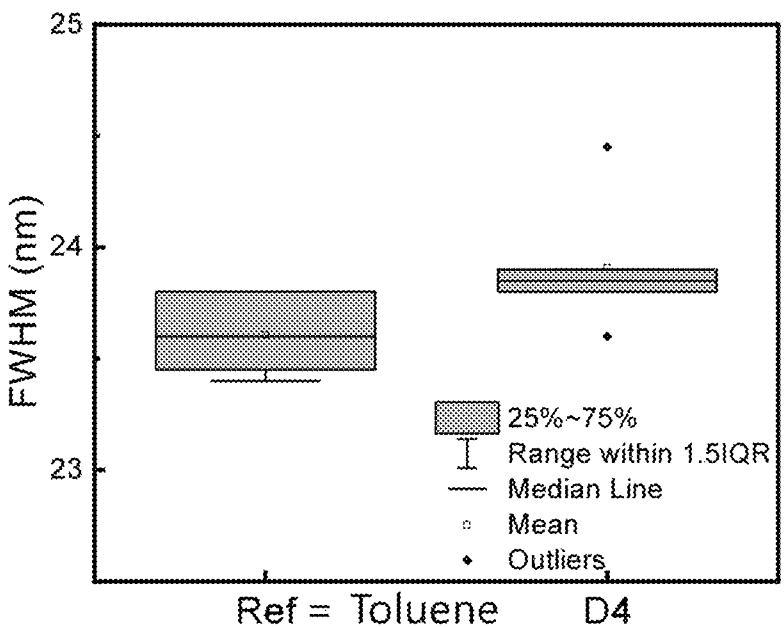
FIG. 20 is a graph showing the Full Width at Half Maximum (FWHM) of the perovskite light-emitting particles according to an embodiment of the present invention.
Figure 21:
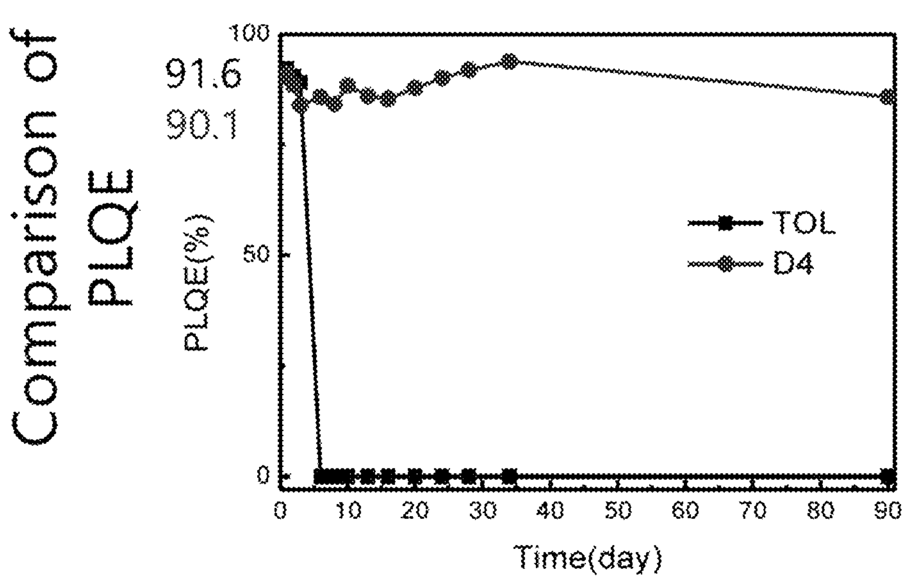
FIGS. 21 to 26 are graphs showing the results of testing the storage stability of the perovskite light-emitting particles and a diluted solution thereof according to an embodiment of the present invention.
Figure 22:
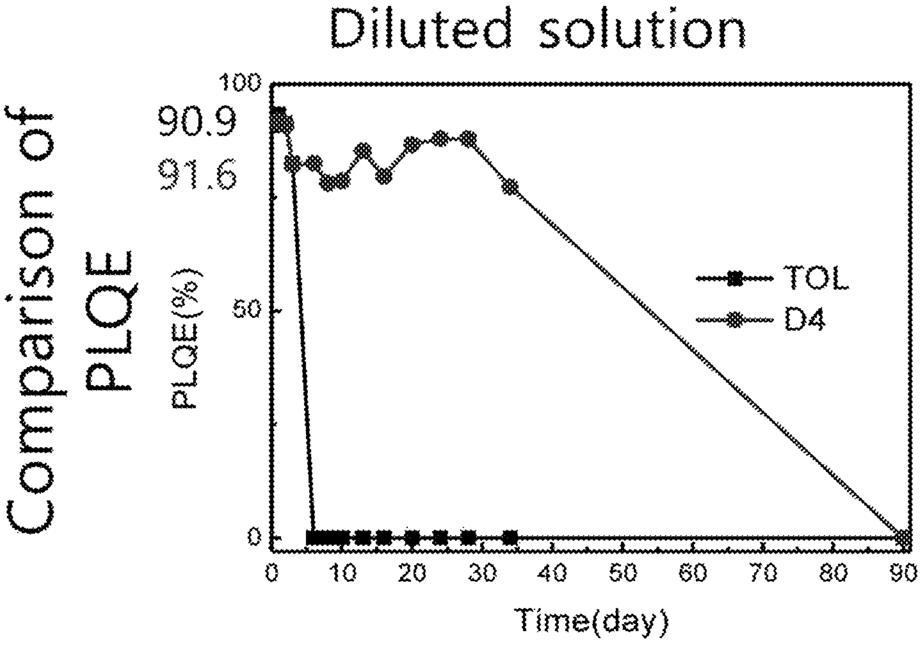
Figure 23:
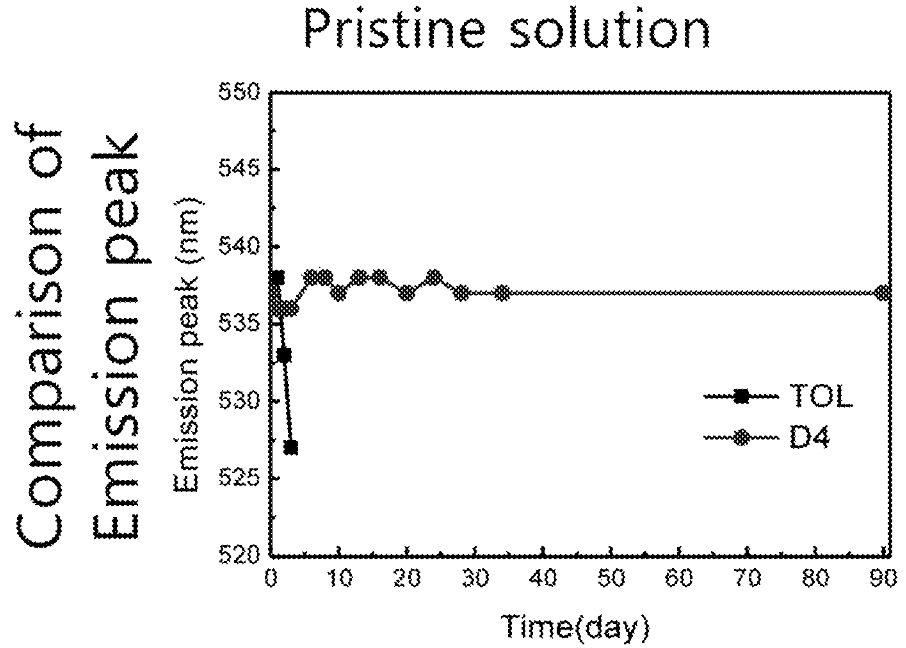

FIG. 20 is a graph illustrating a FWHM of perovskite light-emitting particles according to an embodiment of the present invention.

Referring to FIG. 17 to 20, the perovskite light-emitting particles according to Example 1 of the present invention were better than the light-emitting particles according to Control Example 1 and showed less deviation in terms of photoluminescence efficiency (PLQE). This is because the surface defects of the perovskite light-emitting particles according to Example 1 are smaller than those of Control Example 1. In addition, the results of the absorption spectrum and peak position showed similar results in both cases, and the FWHM was smaller in the case of Example 1.

TABLE 7

| | Perovskite Nanocrystal | Synthesis Method | PWL (nm) | FWHM (nm) | PLQY (%) |
|---|---|---|---|---|---|
| Embodiment Example 1 | $FAPbBr_3$ | LARP | 531 | 22.1 | 95 |
| Control Example 2 | $MAPbB_3$ | Emulsion | 521 | 24.3 | 85 |
| Control Example 3 | $CsPbBr_3$ | Hot injection | 520 | 27.4 | 92 |

Table 7 is a result of comparing the characteristics of perovskite light-emitting particles according to the types and synthesis method of the perovskite nanocrystal particles according to Embodiment Example 1, Control Example 2, and Control Example 3 of the present invention.

Referring to Table 7, D4 was used as a siloxane solvent in Embodiment Example 1, Control Example 2, and Control Example 3, but it may be seen that the $FAPbBr_3$ perovskite nanocrystal particles prepared by the LARP method had better luminescence properties.

FIG. 21 to 26 are graphs that show results of testing the storage stability of perovskite light-emitting particles and their diluted solution according to an embodiment of the present invention.

Referring to FIGS. 21 to 26, the high photoluminescence efficiency (PLQE) value was maintained for 90 days in the non-diluted sample of Embodiment Example 1 (D4), whereas the photoluminescence efficiency was reduced to an extent that it was impossible to measure in about 5 days in the sample of Control Example 1. Accordingly, it was confirmed that in all cases that the light-emitting particles were diluted or not, the light-emitting characteristics of Embodiment Example 1 (D4) having a high ligand density were better. In addition, it was confirmed that the emission peak was continuously maintained at about 537 nm in the undiluted sample of Embodiment Example 1 (D4), but the color changed to about 526 nm in about 4 days in the sample of Toluene (TOL). Therefore, it was confirmed that the emission peak was maintained for a long period of time in the case of Embodiment Example 1 (D4) having a high ligand density of the light-emitting particles. On the other hand, when the light-emitting particles were diluted (diluted solution), it was observed that the emission peak continuously shifted to red from about 6 days in the sample of Embodiment Example 1 (D4). This indicates that when the concentration of the light-emitting particles is diluted, the growth rate of the light-emitting particles increases, and it can be seen that the growth rate of the light-emitting particles is affected according to the concentration of the light-emitting particles. On the other hand, in the case of Embodiment Example 1 (D4) that was not diluted, the emission peak did not show red shift, but it was rather precipitated slowly, and thus the average particle size of the supernatant could be maintained. Furthermore, in the undiluted sample of Embodiment Example 1 (D4), it was confirmed that the FWHM value was constantly maintained at about 24 nm for 90 days, while the FWHM value was increased in toluene (TOL) in about 3 days. Therefore, it was confirmed that in the case of Embodiment Example 1 (D4) having a high ligand density of the light-emitting particles, the FWHMFWHM was not widened and the narrow FWHM was maintained for a long period of time.

FIG. 27 to FIG. 30 are graphs showing light-emitting characteristic test results for perovskite light-emitting particles and the diluted solution thereof according to an embodiment of the present invention.

Referring to FIG. 27 to 30, the samples of Control Example 1 (toluene, TOL) and Embodiment Example 1 (D4) were both diluted at the same concentration, which showed that the absorbance of both the diluted samples was 0.5 at a wavelength of 365 nm, as shown in the absorbance graph. The diluted sample of Example 1 (D4) was slowly precipitated until 90 days were reached, and in the case of Control Example 1 (toluene, TOL), absorbance was hardly detected after about 5 days. Therefore, it was confirmed that the dispersion stability was better in the case of Embodiment Example 1 (D4) having a high ligand density and capable of passivation of perovskite nanocrystal particles.

Figure 31:
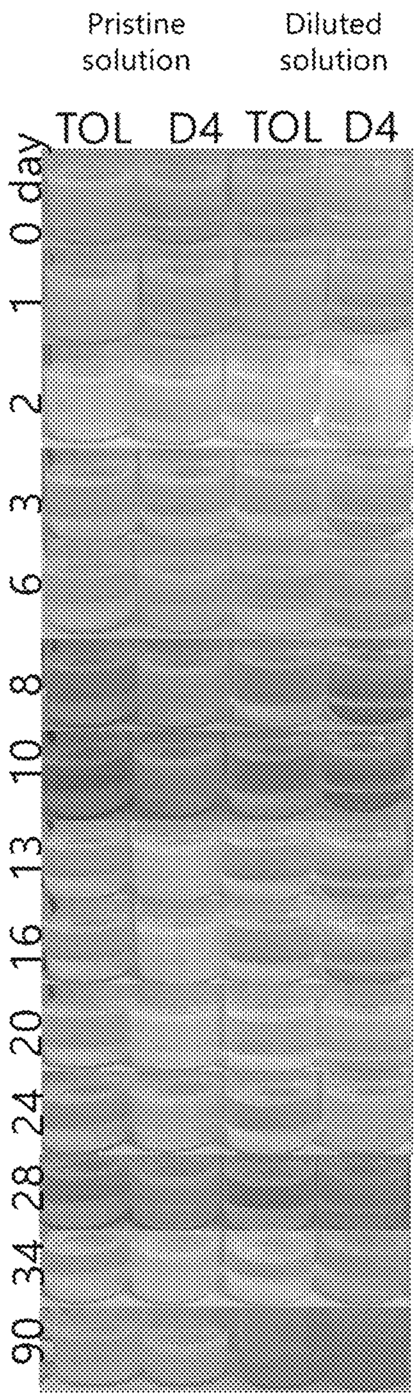
FIG. 31 is a photograph of testing the storage stability of perovskite light-emitting particles and a diluted solution thereof according to an embodiment of the present invention.
Figure 32:
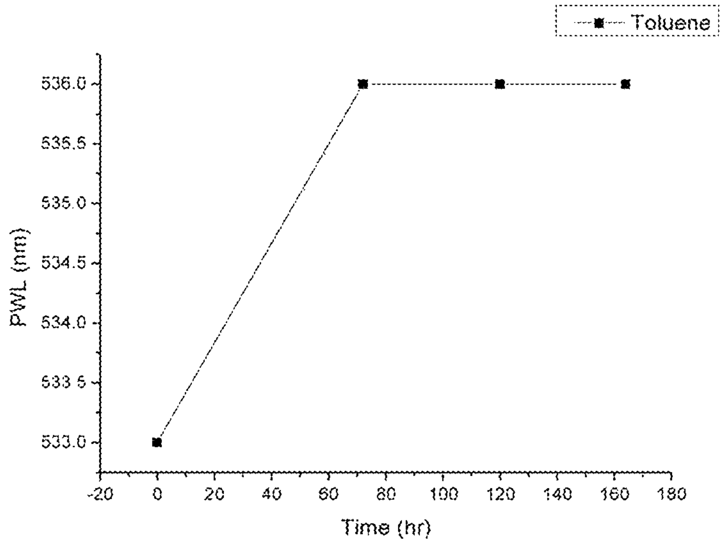
FIG. 32 to 39 are graphs showing the luminescence characteristics test results according to the lapse of time of the perovskite light-emitting particles according to Comparative Examples 1 and Embodiment Example 1 of the present invention.
Figure 33:
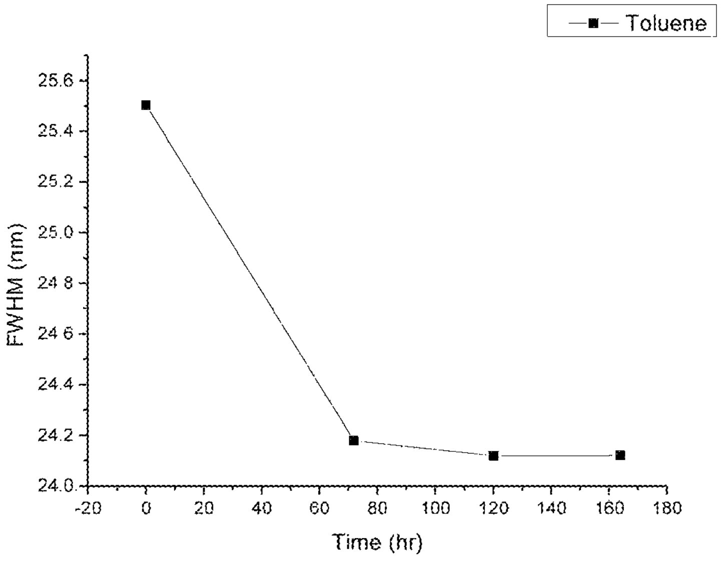
Figure 34:
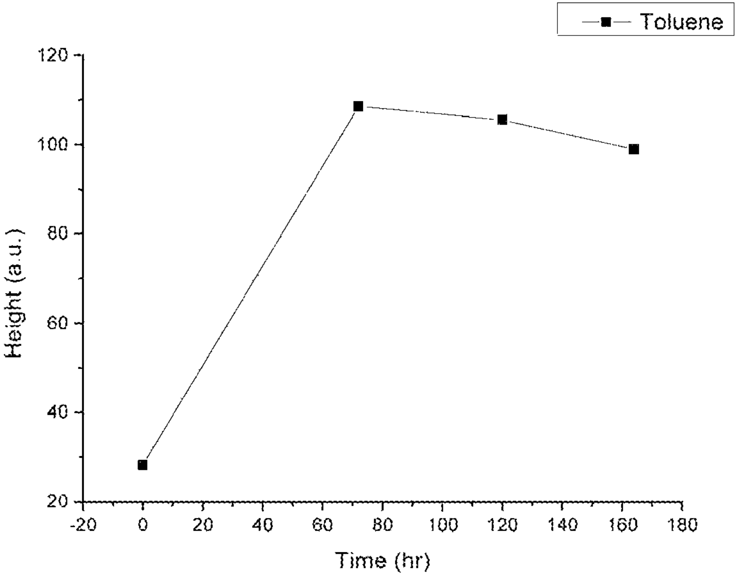
Figure 35:
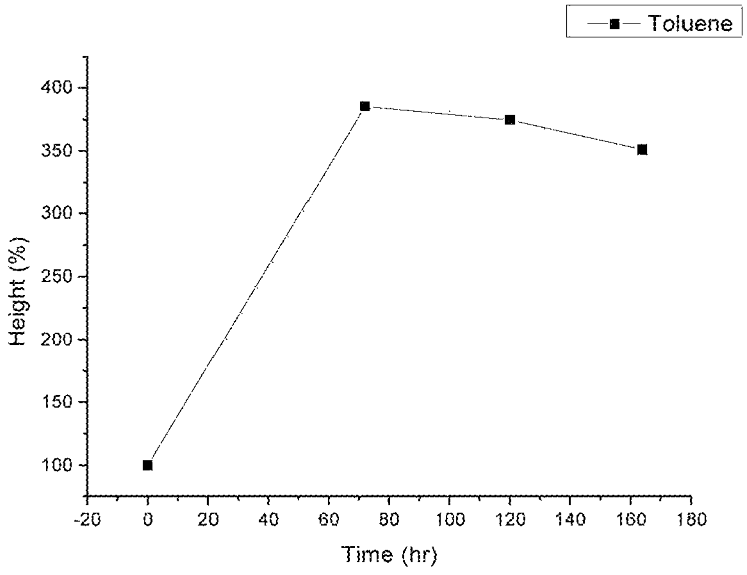
Figure 36:
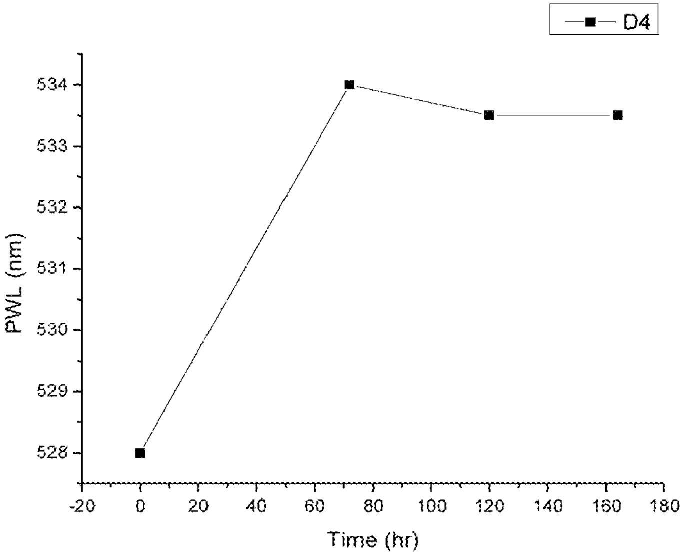
Figure 37:
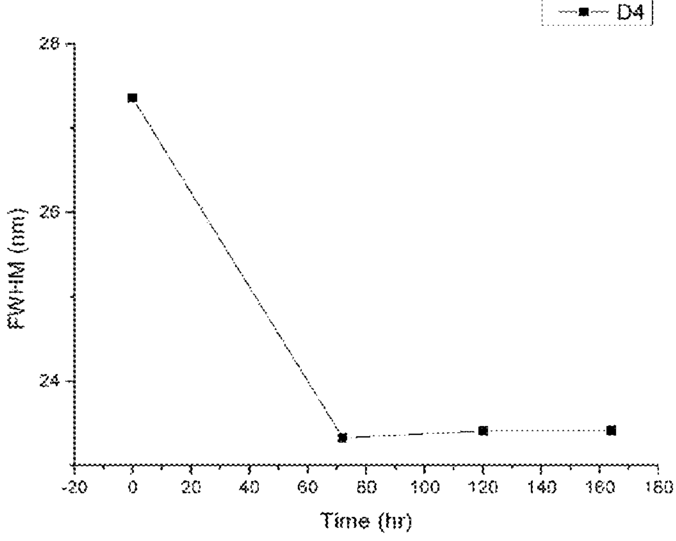
Figure 38:
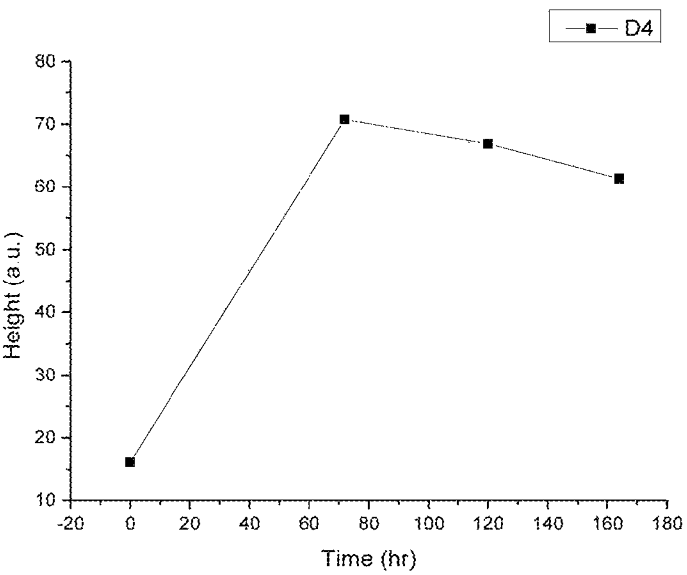
Figure 39:
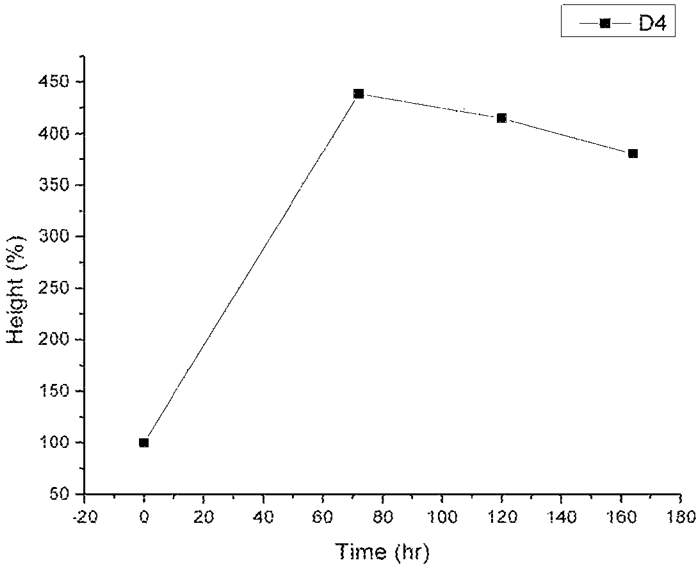
Figure 40:
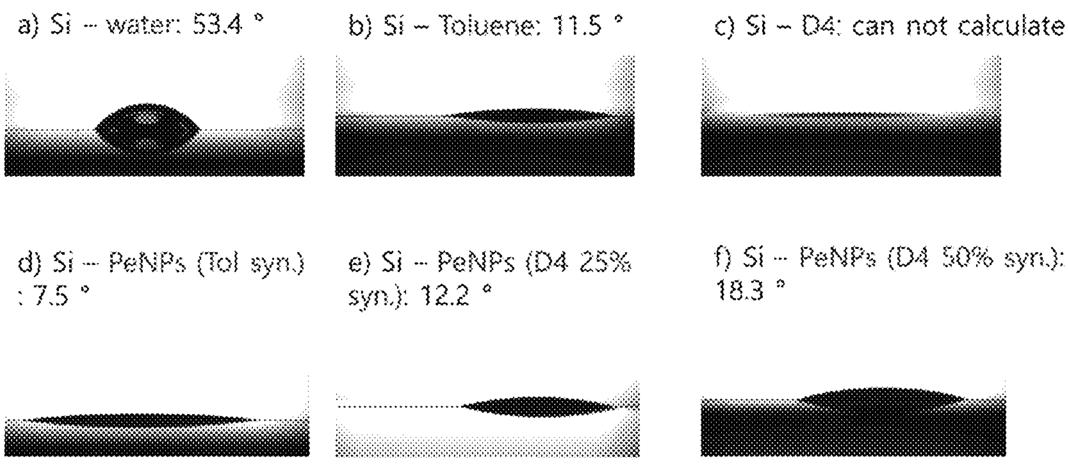
FIG. 40*a* to 40*f* is a photograph showing the measurement result of the contact angle of the perovskite light-emitting particles according to an embodiment of the present invention.

FIG. 31 is a photograph of a perovskite light-emitting particle and the diluted solution thereof tested for storage stability according to an embodiment of the present invention.

Referring to FIG. 31, it may be visually confirmed that an undiluted high concentration solution (pristine solution, two left rows) is not precipitated and is dispersed without a color change even after 90 days. On the other hand, in the diluted solution (two rows on the right) obtained by diluting the high concentration solution with a concentration of 1/10, the color of the solution changed within a faster time compared to the non-diluted high concentration solution. In addition, it was confirmed that even in the case of a high-concentration solution, the solution in which the light-emitting particles prepared from the light-emitting particles (D4, second row from the left) including the siloxane solvent are dispersed does not change color for a long time, and thus has the most excellent dispersion stability.

FIGS. 32 to 39 are graphs that show the results of the photoluminescence characteristics test of the perovskite light-emitting particles according to Comparative Example 1 and Embodiment Example 1 of the present invention over time.

Figure 24:
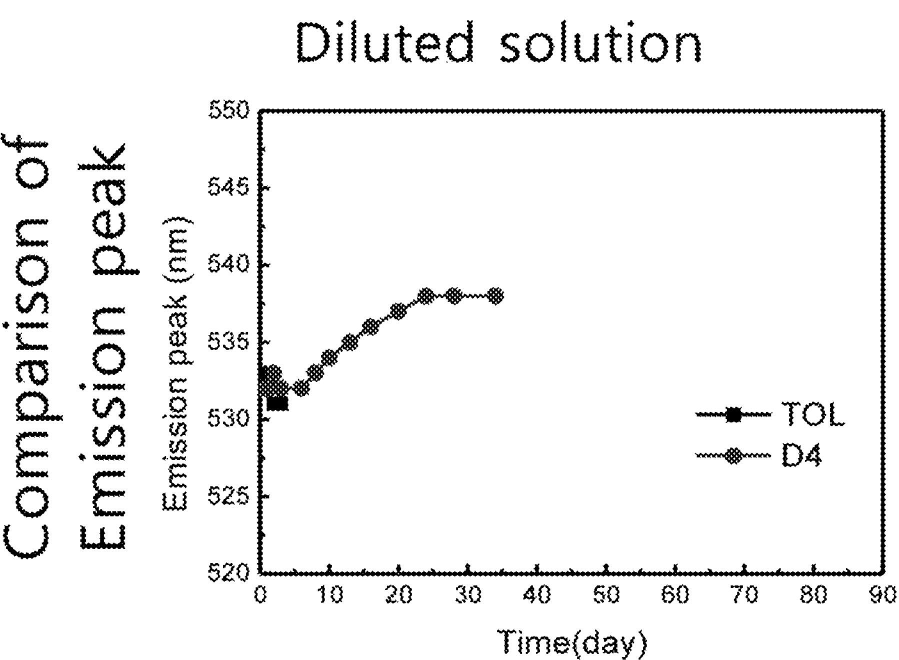
Figure 25:
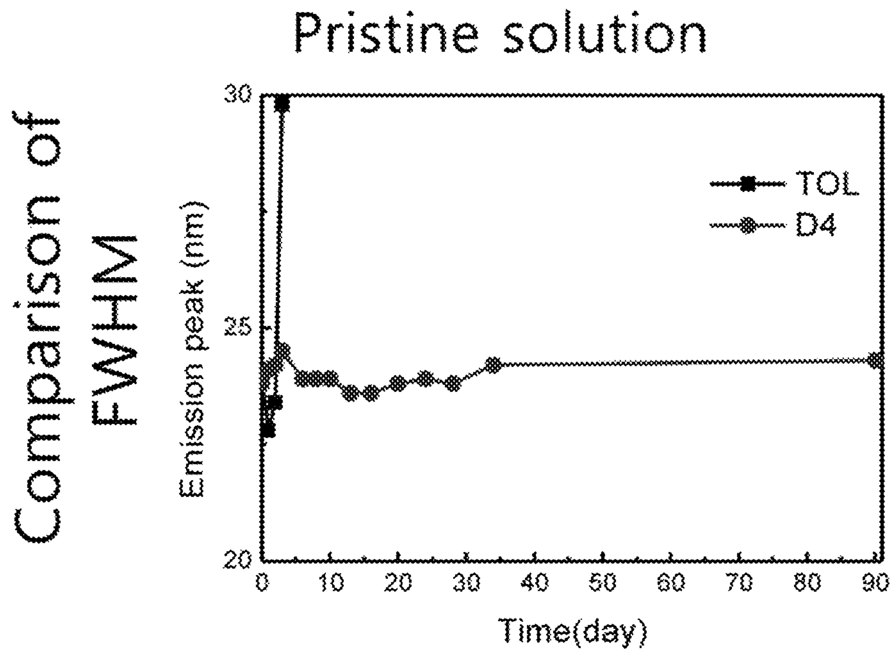
Figure 26:
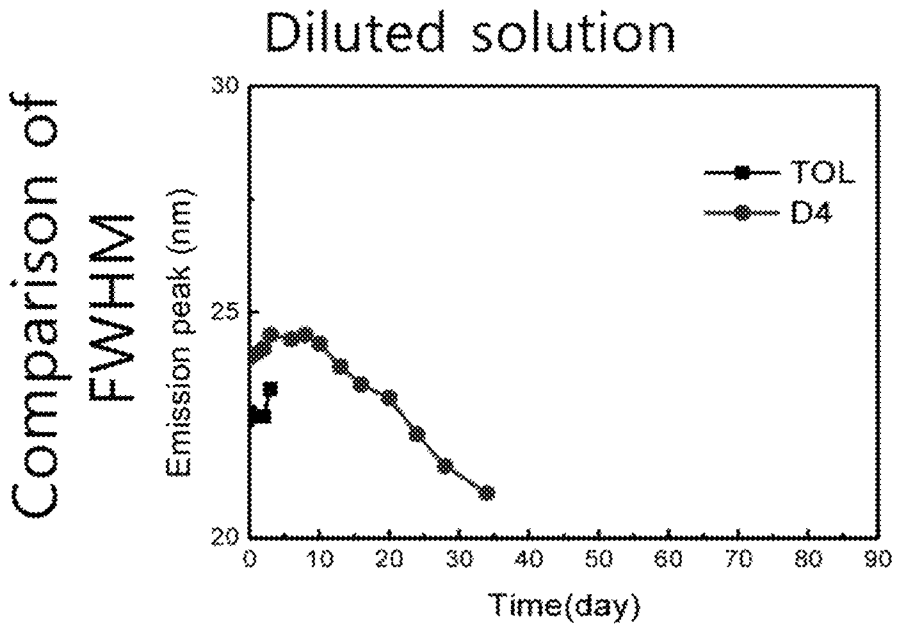
Figure 27:
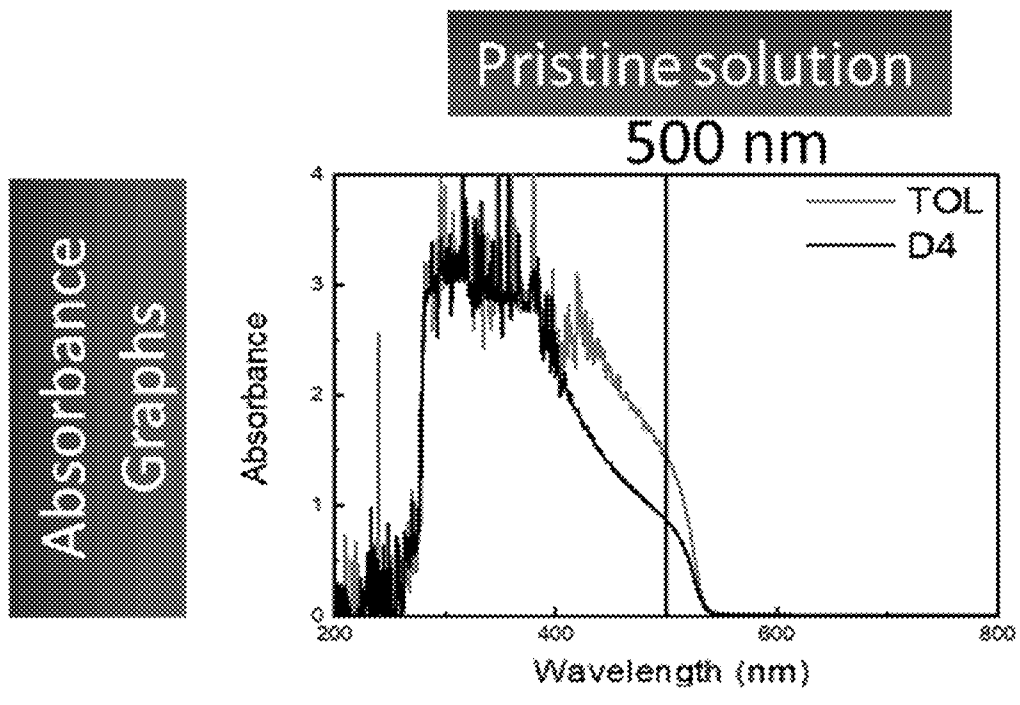
FIGS. 27 to 30 are graphs showing luminescence characteristics test results for perovskite light-emitting particles and a diluted solution thereof according to an embodiment of the present invention.
Figure 28:
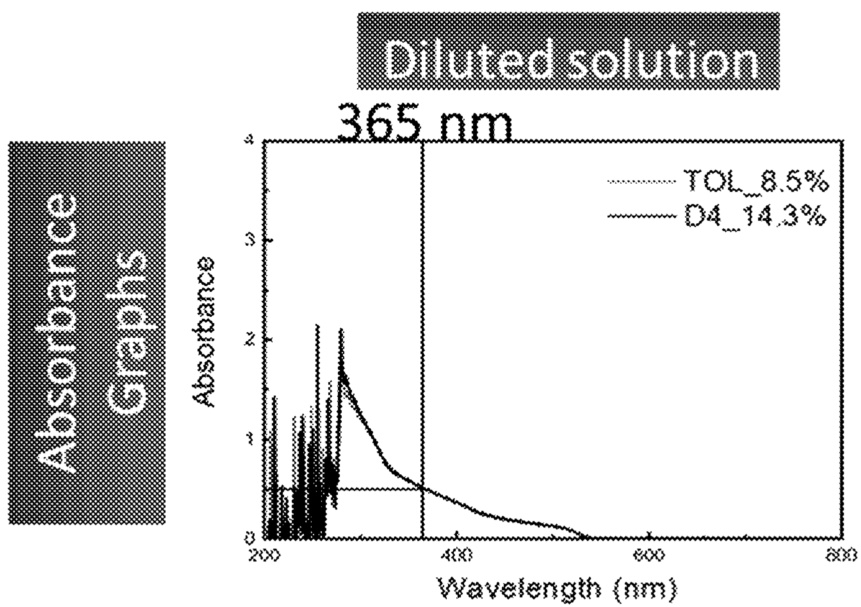

Referring to FIGS. 32 to 35, FIGS. 24 to 25 derived values of the peak position (PWL), full width at half maximum (FHWM), intensity (height), and the normalized values of the intensity (height) of the photoluminescence spectrum for the specimen in which the perovskite light emitting particles are synthesized from toluene (TOL) and dispersed in toluene (TOL) according to Control Example 1 of the present invention. Specifically, FIG. 24 is a graph of measuring the peak position (PWL) of the emission spectrum over time, and it may be seen that the wavelength of the perovskite light-emitting particles was shifted from 533 nm to 536 nm after about 70 hours in the measurement performed for 164 hours. In addition, it may be seen from FIG. 24 that the FWHM of the perovskite light-emitting particles initially shows about 25.5 nm, and then decreases over time, and converges to a value of about 24.1 to 24.2 nm after 164 hours. FIG. 26 is a measurement of the spectral intensity (Height) of the perovskite light-emitting particles, and FIG. 27 is a spectral intensity (Height) value normalized based on the initial measurement value. From this, it can be seen that the perovskite light-emitting particles of the present invention rapidly increase the light-emitting intensity for an initial period up to about 60 hours to exhibit up to about 110 a.u. (about 390%) and gradually decrease the light-emitting intensity over time up to 164 hours to about 100 a.u. (about 350%).

Figure 29:
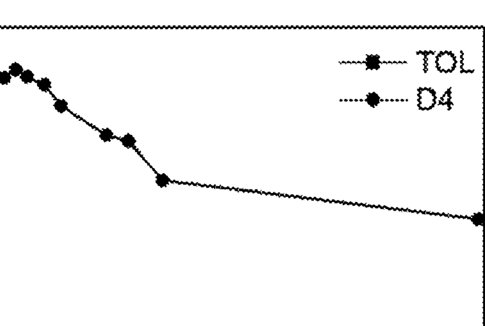
Figure 30:
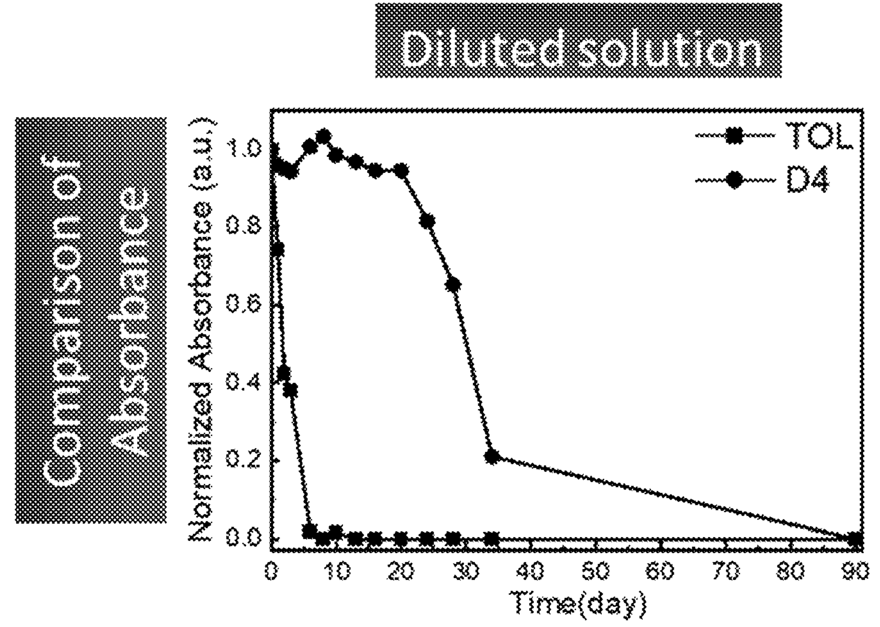

Referring to FIGS. 36 to 39, peak position (PWL), full width at half maximum size (FHWM), intensity (height), and the normalized intensity (height) of the photoluminescence spectrum were derived for the specimen dispersed with D4 as a siloxane solvent according to Embodiment Example 1 of the present invention. Like Control Example 1 described above, it may be seen that the light-emitting wavelength of the perovskite light-emitting particles is red-shifted over time, and more particularly, the light emission wavelength was changed from 528 nm to about 533.5 nm after 164 hours. In addition, FIG. 29 shows that the FWHM of the perovskite light-emitting particles initially shows about 27.5 nm, then decreases over time, and converges to a value of about 23.5 nm after 164 hours. FIG. 30 is a measurement of the spectral intensity (Height) of the perovskite light-emitting particles, and FIG. 31 is a spectral intensity (Height) value normalized based on the measurement start value. From this, it can be seen that the perovskite light-emitting particles of the present invention rapidly increase the light-emitting intensity for an initial period up to about 70 hours to exhibit up to about 70 a.u. (about 430%) and gradually decrease the light-emitting intensity over time up to 164 hours to about 60 a.u. (about 400%)

FIGS. 40A to 40F are photographs showing a result of measuring a contact angle of perovskite light-emitting particles according to an embodiment of the present invention.

Referring to FIGS. 40A to 40F, it can be seen that contact angles of water and toluene on the silicon substrate are 53.4° and 11.5°, respectively, but the siloxane solvent octamethylcyclotetrasiloxane (D4) contacts with the silicon substrate so as not to measure the contact angle and shows strong hydrophobicity. Referring to FIG. 32D, in Control Example 1, when toluene was used as a synthesis solvent, a contact angle of the solution including the perovskite light-emitting particles was 7.5°. On the other hand, when a D4 solvent having a concentration of 25% and 50% was used as the synthesis solvent, contact angles of 12.2° and 18.3° were shown, respectively, and as the concentration of the synthesis solvent D4 increased, the surface tension increased. Therefore, when the concentration of the siloxane solvent increases, the ligand density of the perovskite light-emitting particles increases as van der Waals attraction of the organic ligand with the surface of the perovskite nanocrystal particles increases, which is confirmed by an increase in contact angle.

Figure 41:
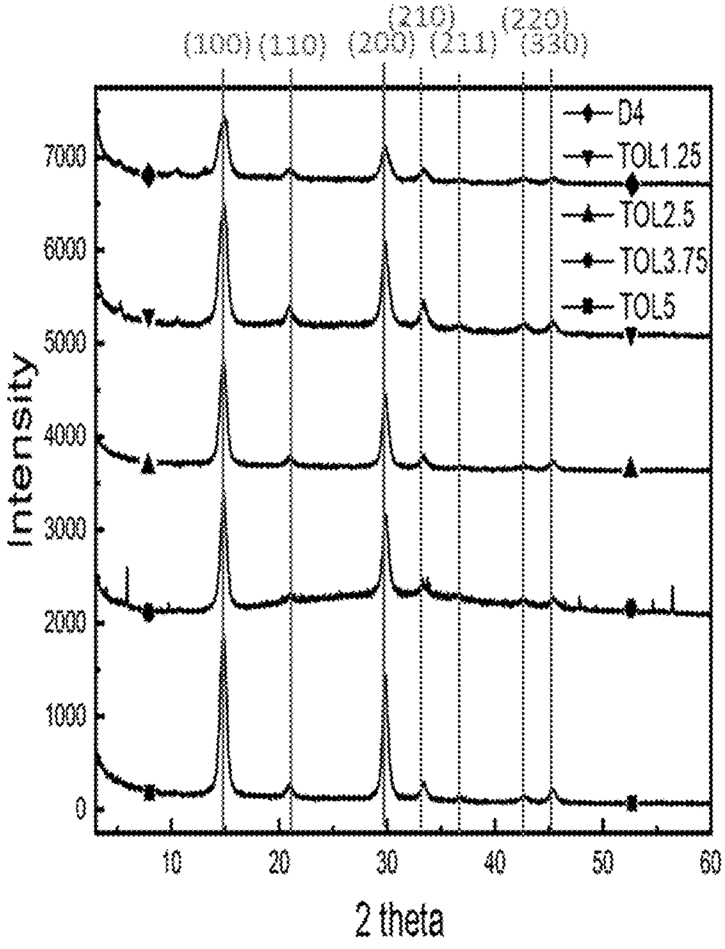
FIG. 41 is a graph showing the XRD results of the perovskite light-emitting particles according to an embodiment of the present invention.

FIG. 41 is a graph illustrating XRD results of perovskite light-emitting particles according to an embodiment of the present invention.

Referring to FIG. 41, it was confirmed that when toluene in various concentrations was used as the synthesis solvent and Embodiment Example 1 (D4) of the present invention, the crystal structure of the perovskite light-emitting particles was not different.

Figure 42:
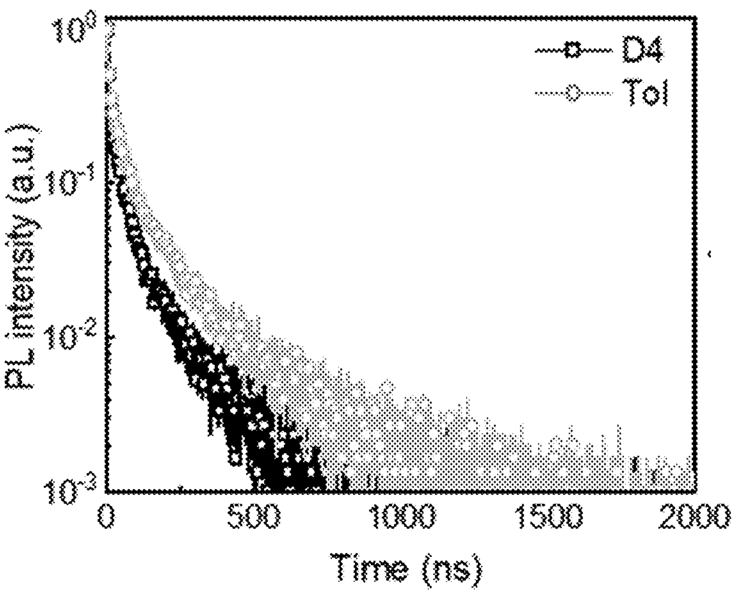
FIG. 42 is a graph showing the results of photoluminescence (PL) lifetime of the perovskite light-emitting particles according to an embodiment of the present invention.

FIG. 42 is a graph showing a result of a photoluminescence (PL) lifetime of perovskite light-emitting particles according to an embodiment of the present invention.

Referring to FIG. 42, it may be seen that the perovskite light-emitting particles of Embodiment Example 1 (D4) of the present invention have a smaller particle size than the case of Control Example 1 (toluene, TOL), and thus have a shorter lifetime of photoluminescence (PL).

Figure 43:
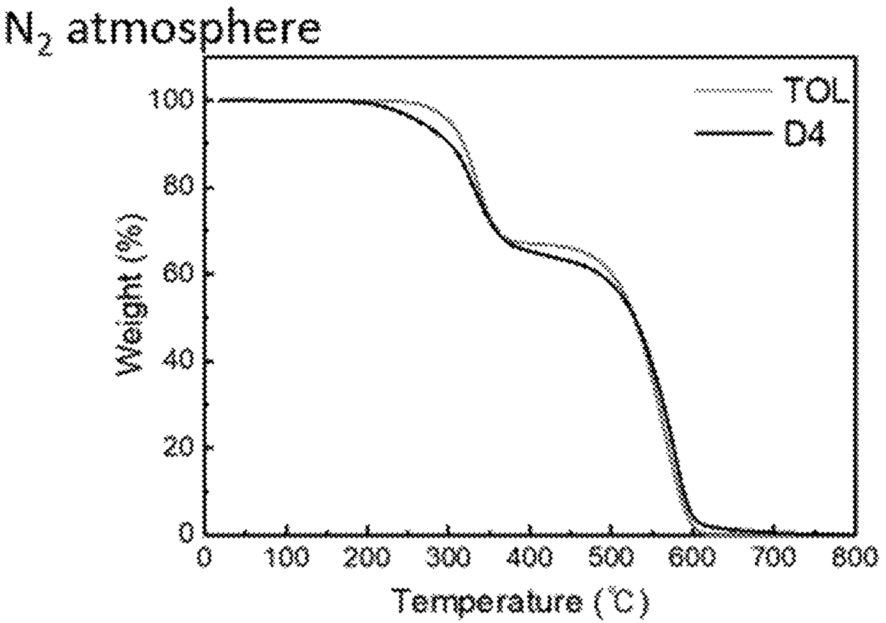
FIG. 43 to 44 are graphs showing TGA and DTA results of perovskite light-emitting particles according to an embodiment of the present invention.
Figure 44:
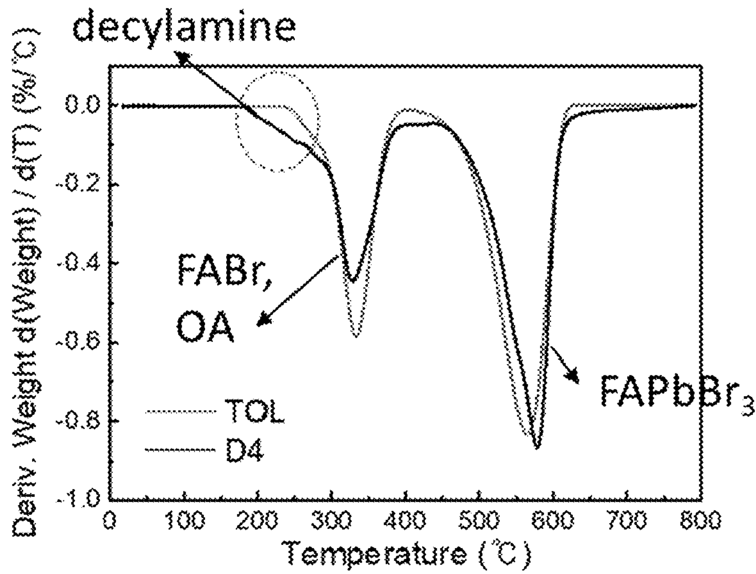
Figure 45:
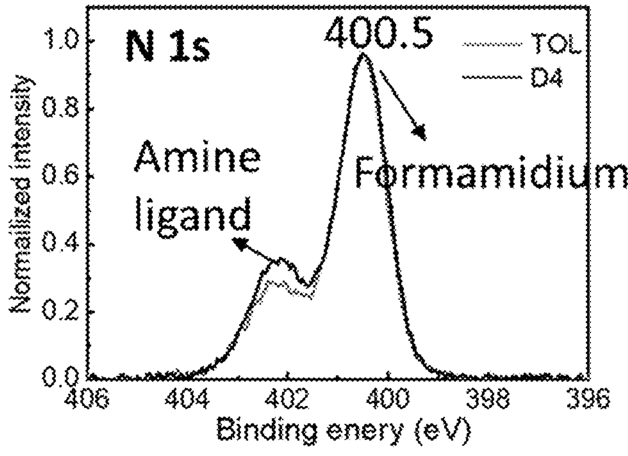
FIGS. 45 to 48 are graphs showing XPS results of perovskite light-emitting particles according to an embodiment of the present invention.
Figure 46:
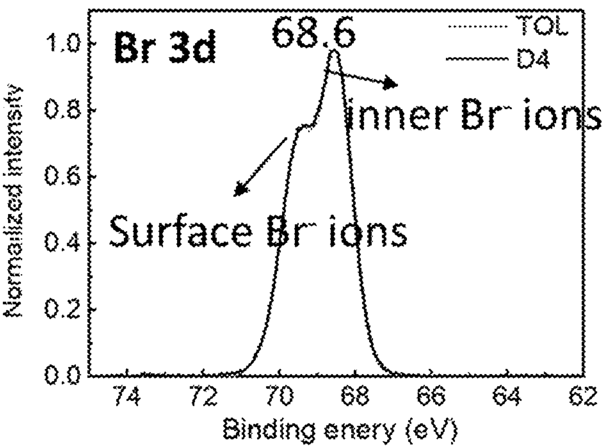
Figure 47:
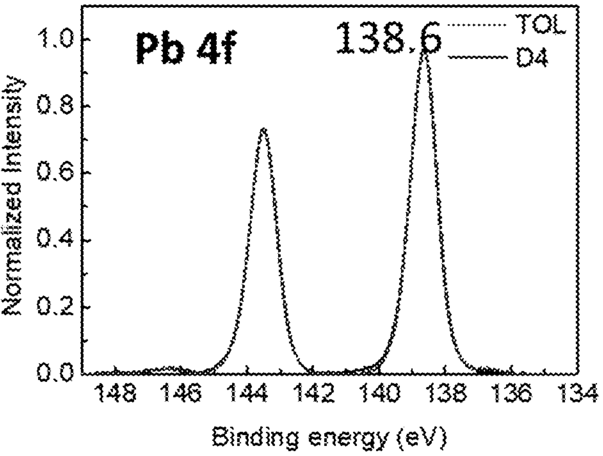
Figure 48:
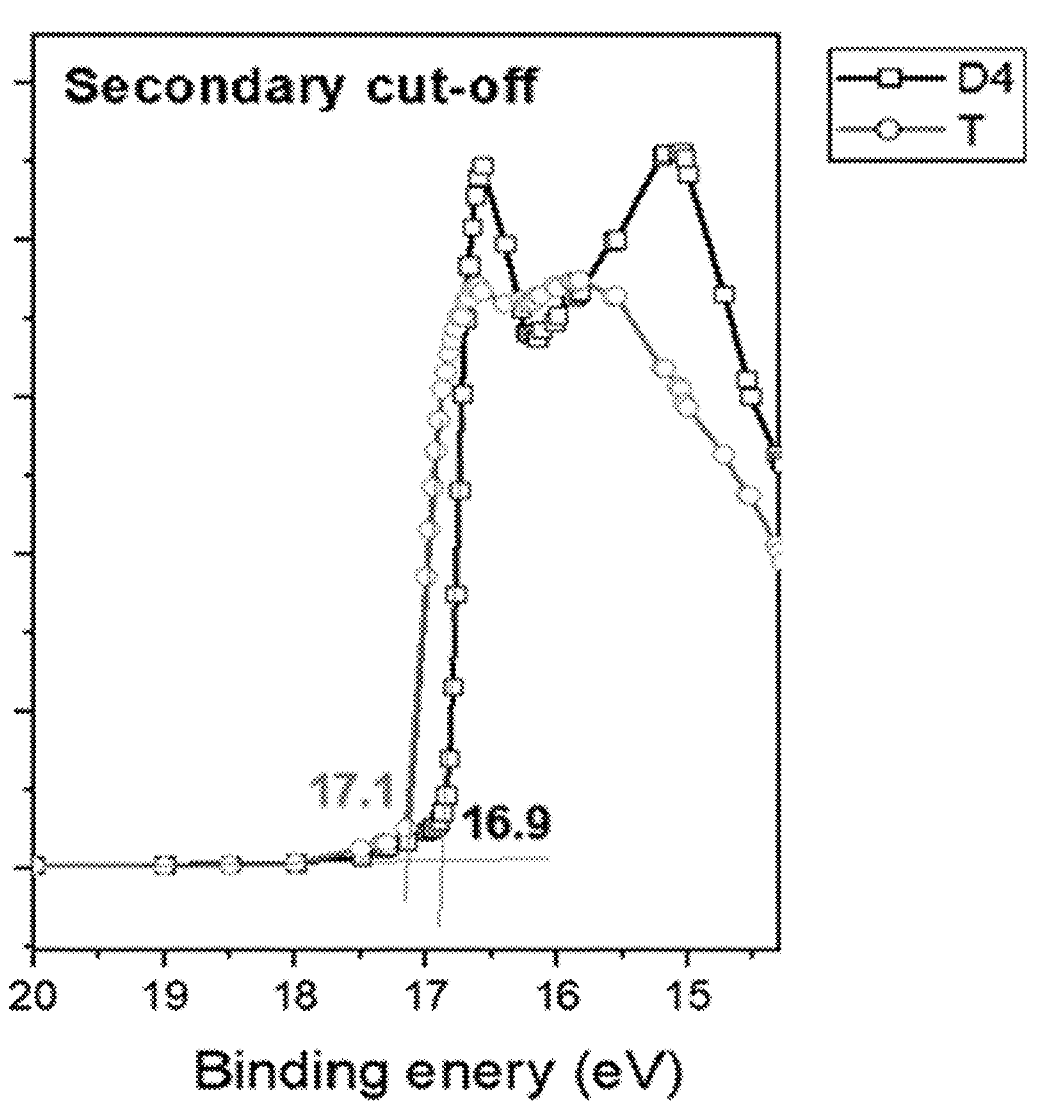

FIG. 43 to 44 are graphs showing TGA and DTA results of perovskite light-emitting particles according to an embodiment of the present invention.

The perovskite light-emitting particles of Embodiment Example 1 (D4) and Control Example 1 (toluene, TOL) of the present invention were sufficiently dried in a vacuum oven at 100° C. temperature for 48 hours before the TGA/DTA test. Referring to FIG. 42, it was confirmed that in the perovskite light-emitting particles of Embodiment Example 1 (D4) and Control Example 1 (toluene), the pyrolysis graph of Embodiment Example 1 (D4) was slightly steeper than that of Control Example 1 (toluene), but the pyrolysis temperatures were similar in both cases. Referring to FIG. 44, it was confirmed that the sample of Embodiment 1 (D4) showed a higher peak of decylamine showing a boiling point of about 216° C. in a temperature range of about 200° C. to 300° C. This may mean that the amount of decylamine, which is an organic ligand attached to the surface of the perovskite light-emitting particle of Embodiment Example 1 (D4), is higher. In addition, it may be seen that $FAPbBr_3$ of Embodiment Example 1 (D4) is slightly more thermally stable than that of Control Example 1 (toluene).

FIG. 45 to 48 are graphs showing XPS results of perovskite light-emitting particles according to an embodiment of the present invention Referring to FIG. 45 to 48, it may be seen that the perovskite light-emitting particles of Embodiment Example 1 D4 of the present invention have a peak (about 402 eV) of an amine ligand significantly higher than that of Control Example 1 (toluene).

Figure 49:
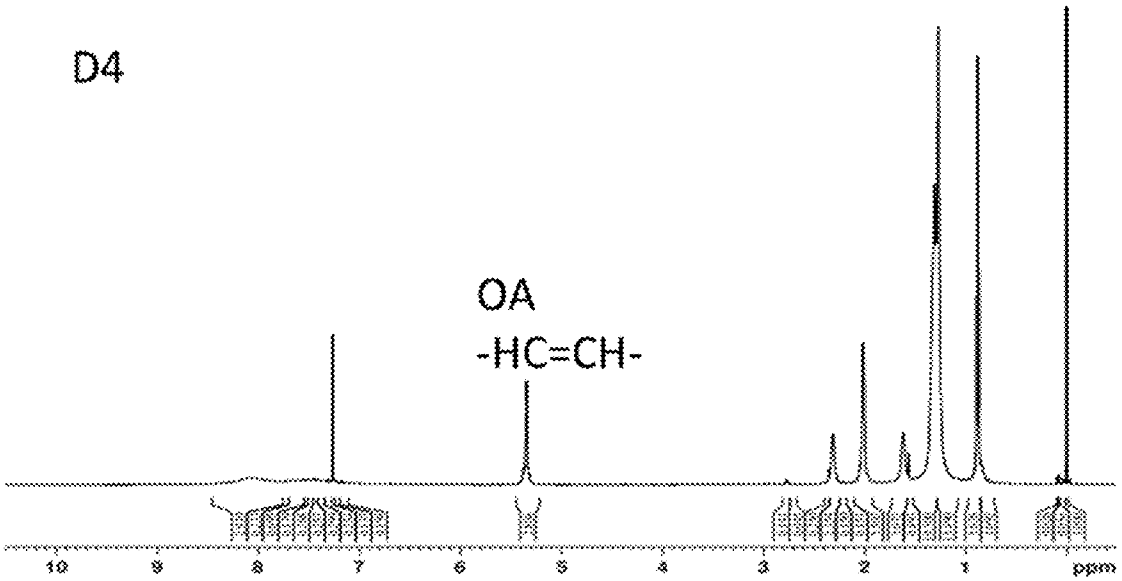
FIGS. 49 to 50 are graphs showing the results of $^{1}$H-NMR analysis of the perovskite light-emitting particles according to Embodiment Example 1 and Comparative Example 1 of the present invention.
Figure 50:
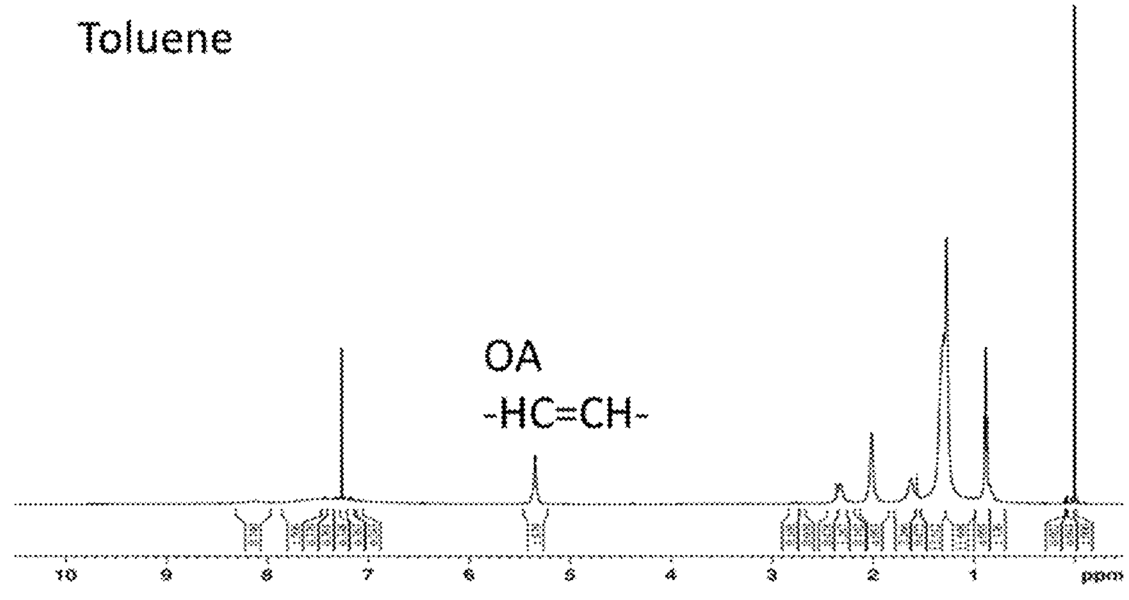

FIGS. 49 and 50 are graphs showing $^1$H-NMR analysis results of perovskite light-emitting particles according to Embodiment Example 1 and Control Example 1 of the present invention.

Referring to FIGS. 49 and 50, perovskite light-emitting particles produced by the method of Embodiment Example 1 (D4) and Control Example 1 (toluene, TOL) were included, 4.4 mL of a solution dispersed in toluene as a dispersion solvent was dried for 24 hours in a vacuum at room temperature, and 500 μL of deuterated chloroform ($CDCl_3$) and trimethoxysilane (TMS) were analyzed. The measured results were calibrated with the TMS peak.

As a result, it was confirmed that the perovskite light-emitting particles of Embodiment Example 1 (D4) showed a significantly higher intensity of an OA ligand peak, specifically, a peak present at 5 to 5.5 ppm, appearing from a C═C double bond of oleic acid (OA), which is an organic ligand. Therefore, through $^1$H-NMR analysis, it can be seen that $^1$H-NMR intensity increases as the number of ligands bound to the surface of the perovskite light-emitting particle increases, and OA concentration to be described later may be derived.

TABLE 8

| | Solvent | Weight (g) | Pb concen -tration (mg/kg) | Pb average concen -tration (mg/kg) | $FAPbBr_3$ average concen-tration (mg/kg) |
|---|---|---|---|---|---|
| Embodiment Example 1 | D4 | 2.452588 | 1066.34 | 1067 | 1840 |
| | | 2.399022 | 1066.23 | | (0.18%) |
| | | 2.406998 | 1069.78 | | |
| Control Example 1 | Toluene | 4.668709 | 1905.6 | 1913 | 3300 |
| | | 4.381525 | 1947.34 | | (0.33%) |
| | | 4.15226 | 1887.39 | | |

Table 8 is a table showing ICP-OES analysis results of perovskite light-emitting particles according to an embodiment of the present invention.

Referring to Table 8, ICP-OES analysis is performed to measure the amount of lead (Pb) contained in the perovskite light-emitting particles of the present invention. Through the ICP-OES results, the concentration of lead (Pb) was derived for 4.4 mL of the solution dispersed in toluene in Embodiment Example 1 (D4) and Control Example 1 (toluene, TOL) as a dispersion solvent, and used to calculate the concentration of perovskite nanocrystal particles ($FAPbBr_3$). For ICP-OES analysis, samples were pretreated by dissolving them with nitric acid, and each was measured after the pretreatment of 3 times. As a result, it was confirmed that the perovskite light-emitting particles of Control Example 1 (toluene, TOL) were about 1.8 times higher than those of Embodiment Example 1 (D4) in terms of the $FAPbBr_3$ concentration.

TABLE 9

| | Embodiment Example 1 (D4) | Control Example 1 (toluene, TOL) |
|---|---|---|
| perovskite size (diameter, nm) | 6.7 | 8.8 |
| weight of a perovskite particle (g) | $1.20069 \times 10^{-18}$ | $272053 \times 10^{-18}$ |
| $FAPbBr_3$ weight (g) in 4.4 mL solution | 0.009668113 | 0.017330447 |
| weight of perovskite particles (g) | $8.05216 \times 10^{+15}$ | $6.37026 \times 10^{+15}$ |
| surface area of a perovskite particle ($nm^2$) | 269.34 | 464.64 |
| total surface area of perovskite particles($nm^2$) | $2.16877 \times 10^{+18}$ | $295988 \times 10^{+18}$ |
| Molar concentration of colloidal quantum dot (CQD) (mM) | 4.427 | 8.014 |
| OA concentration (NMR Intensity) (a.u.) | 2.804 | 1.879 |
| OA concentration/total surface area of perovskite particles (a.u./$nm^2$) | $1.2929 \times 10^{-18}$ | $6.34824 \times 10^{-19}$ |
| density of ligand (a.u./$nm^2$) | 2.352 | 0.505 |

TABLE 10

| Chemical | Molecular weight (g/mol) |
|---|---|
| $FAPbBr_3$ | 491.94 |
| Pb | 207.2 |
| $FAPbBr_3$/Pb | 2.374228 |
| Br | 79.9 |
| FA | 45.04 |

Table 9 is a table showing physical properties for calculating the ligand density of perovskite light-emitting particles according to an embodiment of the present invention, and Table 10 is a table showing the molecular weight of a material for calculating the ligand density of the present invention.

The ligand density of the perovskite light-emitting particles of the present invention may be calculated by Equation 3 below.

$$\text{Ligand Density}=(\text{Organic Ligand Concentration})/\{6\times(\text{Concentration of Metal Material (B)})\times(\text{Perovskite Nanocrystal Particles (PNPs) Size})^2\} \quad \text{Equation 3}$$

In Equation 3, the organic ligand concentration may be derived through a peak intensity of 5 to 5.5 ppm appearing from a C=C double bond of oleic acid (OA) in 1H-NMR analysis, the Pb concentration may be derived through the ICP-OES analysis, and the size of the colloidal quantum dot (CQDs) may be obtained by transmission electron microscope (TEM).

First, the size of the perovskite light-emitting particles can be derived through transmission electron microscope (TEM) analysis, and the measured diameter value of the perovskite light-emitting particles can be used. Specifically, in the above-described TEM analysis, the diameters of the perovskite light-emitting particles of the present invention may be 6.7 nm and 8.8 nm in Embodiment Example 1 and Control Example 1, respectively In addition, assuming that the perovskite light-emitting particles have a cube shape, the number of unit cells in the particles may be divided by the total volume of the light-emitting particles by the volume of the unit cell. The molecular weight of the light-emitting particle can be calculated by multiplying the number of unit cells derived here by the molecular weight (491.94 g/mol) of $FAPbBr_3$, and the mass of one perovskite light-emitting particle can be calculated by dividing the molecular weight of the derived particle by the Avogadro number. Specifically, the mass of one perovskite light-emitting particle may be $1.20069\times10^{-18}$ g and $2.72053\times10^{-18}$ g, respectively for Embodiment Example 1 and Control Example 1.

Next, the Pb concentration may be derived by the ICP-OES analysis described above. Specifically, in the above-described ICP-OES analysis, the Pb average concentration may be 1,067 mg/kg and 1,913 mg/kg in Embodiment Example 1 and Control Example 1, respectively.

Meanwhile, through the above-described ICP-OES analysis, the total mass of particles of the perovskite light-emitting particles contained in a solution of 4.4 mL may be calculated. The total mass of $FAPbBr_3$ particles in 4.4 ml may be calculated through the average concentration of $FAPbBr_3$ derived from the ICP-OES analysis results. Specifically, the total mass of the $FAPbBr_3$ particles may be 0.009668113 g and 0.017330447 g for Embodiment Example 1 and Control Example 1, respectively. As a value obtained by dividing this by the mass of one perovskite light-emitting particle, the number of particles of perovskite light-emitting particles contained in a solution of 4.4 mL may be calculated. Therefore, the number of particles of perovskite light-emitting particles may be $8.05216\times10^{15}$ g and $6.37026\times10^{+15}$ g for Embodiment Example 1 and Control Example 1, respectively.

Furthermore, the total particle surface area of the perovskite light-emitting particles may be derived as a value obtained by multiplying the derived number of particles by the surface area of one particle. In this case, assuming that the perovskite light-emitting particle has a cube shape, the surface area of one particle may be derived as a value obtained by multiplying the square value of the diameter of the perovskite light-emitting particle by 6. Specifically, one surface part of the perovskite light-emitting particles may be 269.34 $nm^2$ and 464.64 $nm^2$ based on Embodiment Example 1 and Control Example 1, respectively, and the total particle surface part thereof may be $2.16877\times10+^{18}$ $nm^2$ and $2.95988\times10+^{18}$ $nm^2$ based on Embodiment Example 1. Next, the OA concentration may be derived through an OA ligand peak appearing from a C═C double bond of oleic acid (OA), an organic ligand, specifically, a peak intensity in a range of 5 to 5.5 ppm in the $^1$H-NMR analysis result. In addition, the concentration of OA ligand per surface area of perovskite light-emitting particles may be derived as a value obtained by dividing the OA peak intensity by the total particle surface area in the $^1$H-NMR analysis. Specifically, the OA concentration may be 2.804 a.u. (arbitrary unit) and 1.879 a.u., respectively, based on Embodiment Example 1 and Control Example 1, and the concentration of OA ligands per surface part may be $1.2929\times10^{-18}$ a.u./$nm^2$ and $6.34824\times10^{-19}$a.u./nm2, respectively.

On the other hand, the embodiments of the present invention disclosed in the present specification and drawings are merely examples provided to aid understanding, and are not intended to limit the scope of the present invention. In addition to the embodiments disclosed herein, it is obvious to those skilled in the art that other modified examples based on the technical idea of the present invention may be implemented.

DESCRIPTION OF SYMBOLS

500: perovskite light-emitting particles, 510: perovskite nanocrystal particles, 520: organic ligands

The invention claimed is:

1. A manufacturing method of a perovskite light-emitting composition comprising:

preparing a first solution containing a perovskite precursor and an organic solvent;

preparing a second solution containing an organic siloxane solvent, a surfactant and optionally an organic solvent;

forming perovskite light-emitting particles by injecting the first solution into the second solution and then mixing; and purifying the perovskite light-emitting particles, wherein the perovskite light-emitting particles synthesized using an organic siloxane solvent have organic ligands attached to the surface of the particles during the synthesis process, wherein the organic solvent used in the second solution is for dissolving and dispersing the siloxane solvent and the surfactant, and wherein the organic siloxane solvent exhibits repulsion against the organic ligand.

2. The manufacturing method of the perovskite light-emitting composition of claim 1, wherein a difference in surface energy between an organic ligand of the perovskite light-emitting particle and the organic siloxane solvent is 7 to 15 dyne/cm.

3. The manufacturing method of the perovskite light-emitting particle composition of claim 1, wherein the organic siloxane solvent includes the following Chemical Formula 1, Chemical Formula 2, Chemical Formula 3, Chemical Formula 4 or a combination thereof

[Chemical Formula 1]

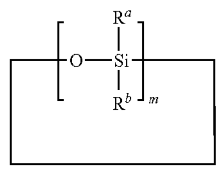

in Chemical Formula 1, Ra and Rb are each independently hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m is an integer of 3 to 6,

[Chemical Formula 2]

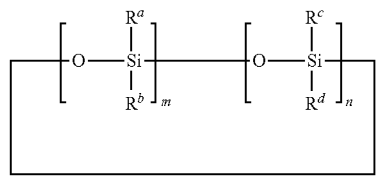

in Chemical Formula 2, Ra to Rd are each independently hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n is independently an integer of 3 to 10,

[Chemical Formula 3]

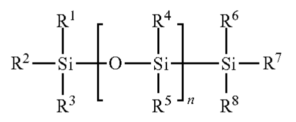

in Chemical Formula 3, $R^1$ to $R^8$ are each independently hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and n is an integer of 3 to 100,

[Chemical Formula 4]

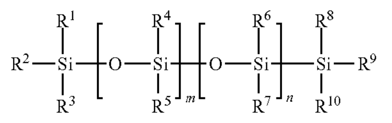

in Chemical Formula 4, $R^1$ to $R^{10}$ are each independently hydrogen, an alkyl group having 1 to 20 carbon atoms, an alkenyl group having 2 to 20 carbon atoms, an alkynyl group having 2 to 20 carbon atoms or an aryl group having 6 to 25 carbon atoms, and m or n is independently an integer of 3 to 10.

4. The manufacturing method of the perovskite light-emitting composition of claim 1, wherein the organic siloxane solvent comprises at least one selected from hexamethylcyclotrisiloxane, octamethylcyclotetrasiloxane, decamethylcyclopentasiloxane, dodecamethylcyclohexasiloxane, 1,3,5,7-tetramethylcyclotetrasiloxane, phenylhydrocyclosiloxanes, hexaphenylcyclotrisiloxane, 1,3,5,7-Tetramethyl-1,3,5,7-tetramethoxycyclotetrasiloxane, 1,3,5,7-Tetravinyl-1,3,5,7-tetramethylcyclotetrasiloxane, and derivatives thereof.

5. The manufacturing method of the perovskite light-emitting composition of claim 1, wherein the organic siloxane solvent has a viscosity of 0.5 to 2,000 cps at 25° C.

6. The manufacturing method of the perovskite light-emitting composition of claim 1, wherein the organic siloxane solvent has a surface tension of 15 to 23 dyne/cm.

7. The manufacturing method of the perovskite light-emitting composition of claim 1, wherein the surfactant is at least one selected from an amine surfactant, an organic acid surfactant, and an organic ammonium surfactant.

8. The manufacturing method of the perovskite light-emitting composition of claim 7, wherein the amine surfactant is at least one selected from hexylamine, octylamine, decylamine, oleylamine, N,N-diisopropylethylamine, ethylenediamine, hexamethylenetetramine, methylamine, N,N, N, N-tetramethyethylene diamine, triethylamine, diethanolamine, 2,2-(ethylenedioxyl)bis-(ethylamine), 2-methyl-1,5-pentanediamine, 3-methoxytriphenyl-amine, 1,4-phenylenediamine, N,N,N,N-pentamethyl diethylenetriamine, triethylenetetramine, rhodamine, and diethylamine.

9. The manufacturing method of the perovskite light-emitting composition of claim 7, wherein the organic acid surfactant is a carboxylic acid surfactant or a phosphonic acid surfactant.

10. The manufacturing method of the perovskite light-emitting composition of claim 9, wherein the carboxylic acid surfactant is at least one selected from 4,4'-Azobis (4-cyanovaleric acid), Acetic acid, 5-Aminosalicylic acid, acrylic acid, L-aspartic acid, 6-bromohexanoic acid, bromoacetic acid, dichloroacetic acid, ethylenediaminetetraacetic acid, isobutyric acid, itaconic acid, maleic acid, 4-maleimidobutyric acid, L-malic acid, 4-nitrobenzoic acid, 1-pyrenecarboxylic acid and oleic acid.

11. The manufacturing method of the perovskite light-emitting composition of claim 9, wherein the phosphonic acid surfactant is at least one selected from n-hexylphosphonic acid, n-octylphosphonic acid, n-decylphosphonic acid, n-dodecylphosphonic acid, n-tetradecylphosphonic acid, n-hexadecylphosphonic acid, n-octadecyl phosphonic acid, benzyl phosphonic acid, and benzhydryl phosphonic acid.

* * * * *